(12) United States Patent
Maatta et al.

(10) Patent No.: US 7,512,426 B2
(45) Date of Patent: Mar. 31, 2009

(54) MOBILE COMMUNICATIONS DEVICE WITH SYNCHRONISING HINGE

(75) Inventors: Esa-Sakari Maatta, Farnborough (GB); Herman Scherling, Kokkedal (DK); Ilpo Kauhaniemi, Vantaa (FI); Mads Stefansen, Copenhagen (DK); Matti Kosonen, Jarvenpaa (FI); Mikko Ukonaho, Nokia (FI); Nikolaj Bestle, Copenhagen (DK)

(73) Assignee: Nokia Corporation, Espoo, FL (US)

( * ) Notice: Subject to any disclaimer, the term of this patent is extended or adjusted under 35 U.S.C. 154(b) by 587 days.

(21) Appl. No.: 11/111,485

(22) Filed: Apr. 21, 2005

(65) Prior Publication Data

US 2006/0238968 A1  Oct. 26, 2006

(51) Int. Cl.
*H04Q 7/20* (2006.01)

(52) U.S. Cl. .................. 455/575.1; 16/354; 361/681

(58) Field of Classification Search .......... 455/445; 16/330, 303, 227, 354; 361/681
See application file for complete search history.

(56) References Cited

U.S. PATENT DOCUMENTS

| | | |
|---|---|---|
| 4,825,395 A | 4/1989 | Kinser, Jr. et al. |
| 5,363,089 A | 11/1994 | Goldenberg |
| 5,494,447 A | 2/1996 | Zaidan |
| 5,666,694 A | 9/1997 | Slow et al. |
| 5,983,073 A | 11/1999 | Ditzik |
| 5,987,704 A | 11/1999 | Tang .......................... 16/354 |
| 6,009,568 A | 1/2000 | Miyazaki |
| 6,191,937 B1 | 2/2001 | Bang |
| 6,259,897 B1 | 7/2001 | Kim |
| 6,304,431 B1 | 10/2001 | Kim |
| 6,344,977 B1 | 2/2002 | Takagi |
| 6,374,089 B1 | 4/2002 | Till |
| 6,445,574 B1 | 9/2002 | Saw et al. |
| 6,456,487 B1 | 9/2002 | Hetterick |
| 6,459,887 B2 | 10/2002 | Okuda |
| 6,493,216 B1 | 12/2002 | Lin ............................ 361/681 |
| 6,519,141 B2 | 2/2003 | Tseng et al. |
| 6,519,812 B2 | 2/2003 | Ko et al. ...................... 16/354 |
| 6,574,837 B2 * | 6/2003 | Jantschek .................... 16/371 |
| 6,708,046 B1 * | 3/2004 | Takagi .................... 455/575.3 |
| 6,785,935 B2 | 9/2004 | Ahn et al. |
| 6,788,527 B2 | 9/2004 | Doczy et al. |
| 6,885,849 B1 | 4/2005 | Kim et al. |

(Continued)

FOREIGN PATENT DOCUMENTS

JP  2003-309756  10/2003

(Continued)

*Primary Examiner*—Lisa Lea-Edmonds
*Assistant Examiner*—Ingrid Wright
(74) *Attorney, Agent, or Firm*—Perman & Green, LLP

(57) ABSTRACT

The invention relates to a mobile communications device comprising a housing, a transceiver in the housing, a keypad connected to the housing, and a display connected to the housing, wherein the housing comprises a first section movably connected to a second section of the housing by a multi-axis hinge, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees. The invention further relates to a hinge for use therein.

48 Claims, 24 Drawing Sheets

U.S. PATENT DOCUMENTS

| | | | |
|---|---|---|---|
| 6,900,981 B2 * | 5/2005 | Kuivas et al. | 361/683 |
| 6,925,684 B2 | 8/2005 | Kang et al. | |
| 7,140,074 B2 * | 11/2006 | Han et al. | 16/366 |
| 2002/0154475 A1 | 10/2002 | Lammintaus et al. | 361/683 |
| 2003/0172495 A1 | 9/2003 | Pan | 16/292 |
| 2004/0064919 A1 | 4/2004 | Lu | |
| 2004/0080667 A1 | 4/2004 | Jeong et al. | |
| 2004/0203535 A1 | 10/2004 | Kim et al. | |
| 2004/0207568 A1 | 10/2004 | Ooshima et al. | |
| 2005/0050686 A1 | 3/2005 | Kurokawa | 16/354 |
| 2005/0155182 A1 | 7/2005 | Han et al. | 16/336 |
| 2005/0155184 A1 | 7/2005 | Kayl | |

FOREIGN PATENT DOCUMENTS

| | | |
|---|---|---|
| JP | 2002-171324 | 4/2008 |
| KR | 2002-0033239 | 5/2002 |
| WO | 2004/095808 A2 | 5/2008 |

* cited by examiner

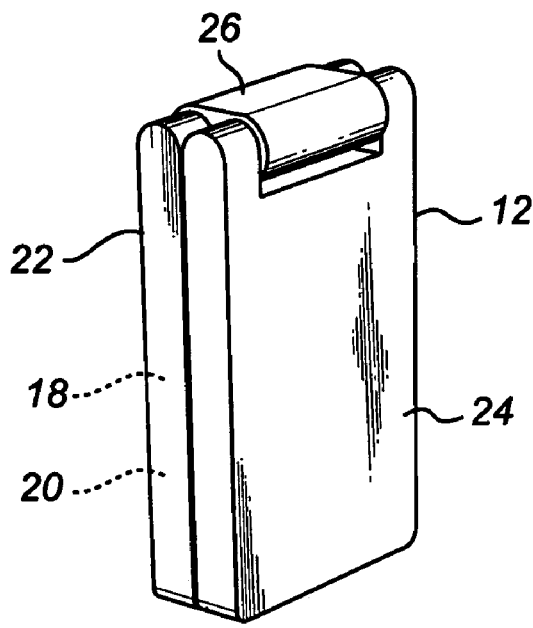
Fig. 1
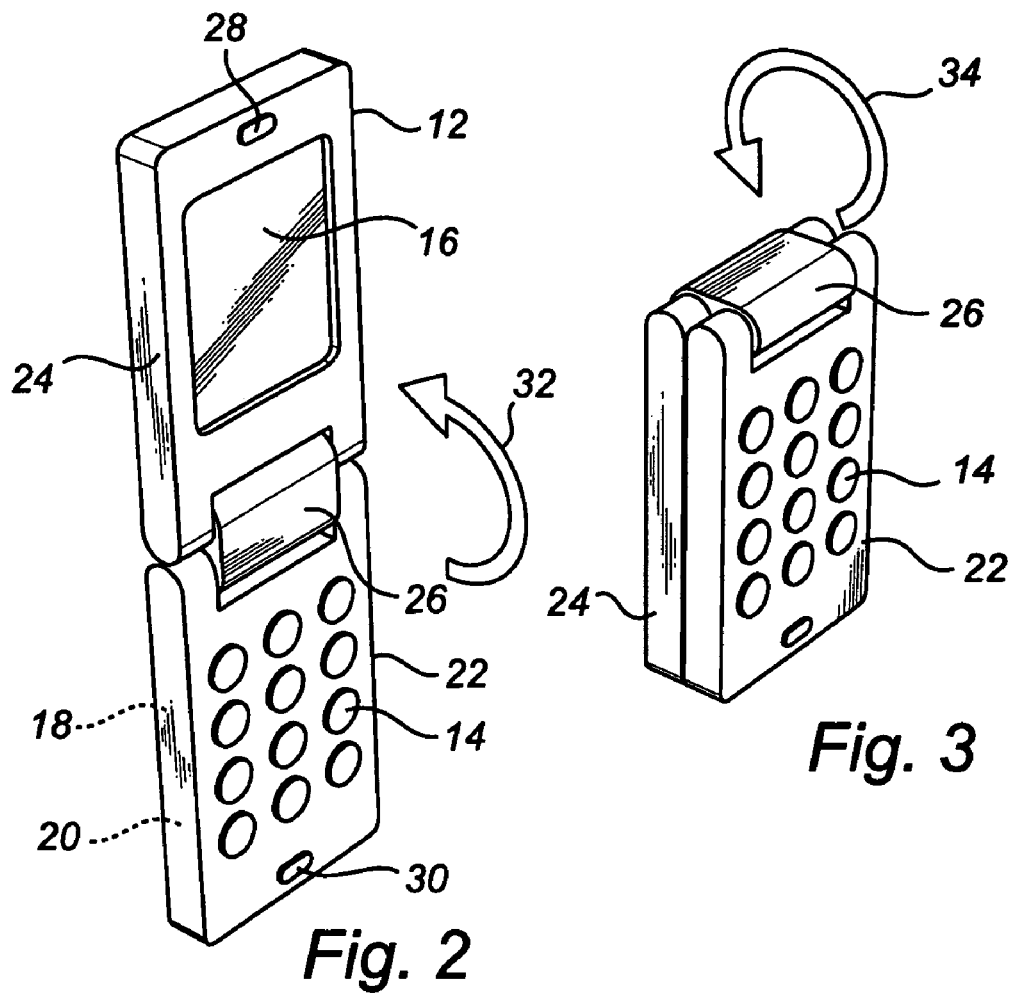
Fig. 2
Fig. 3

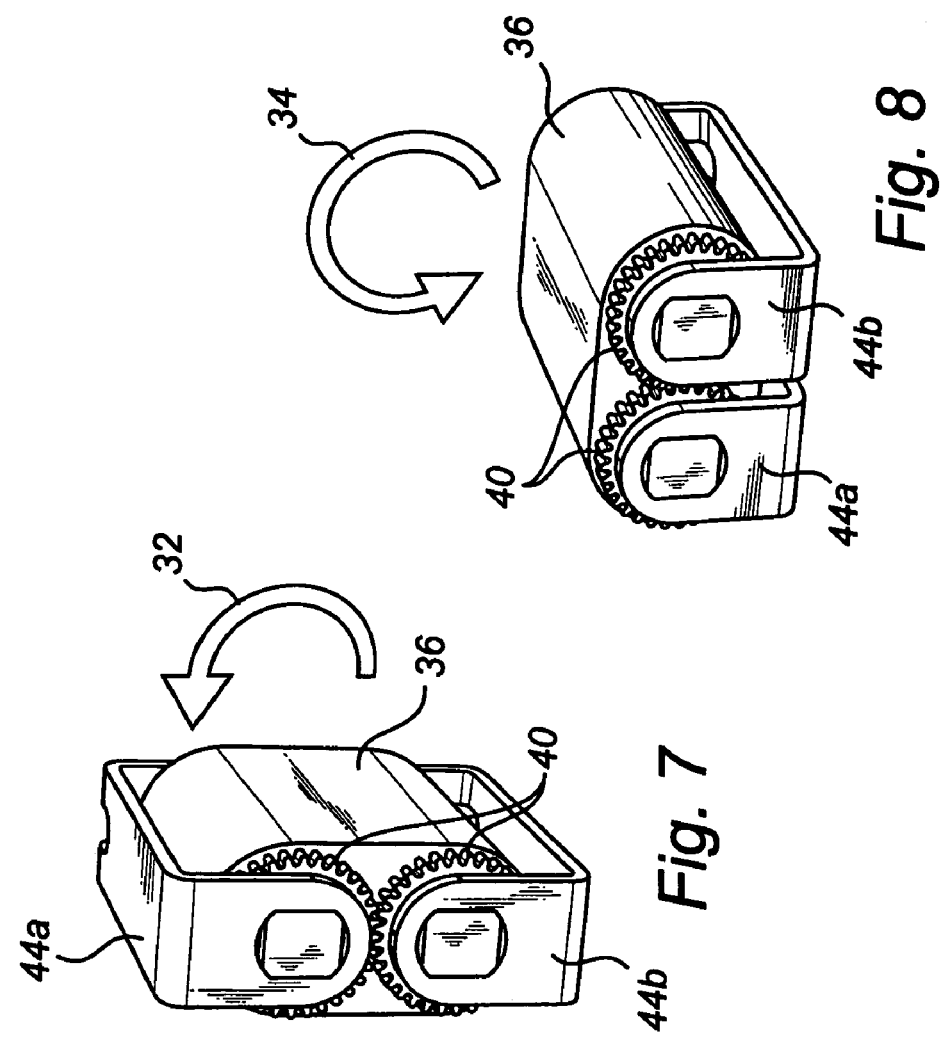
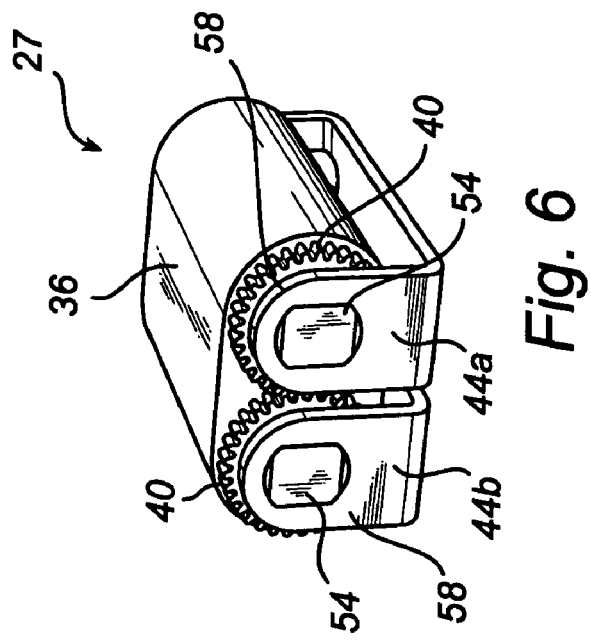

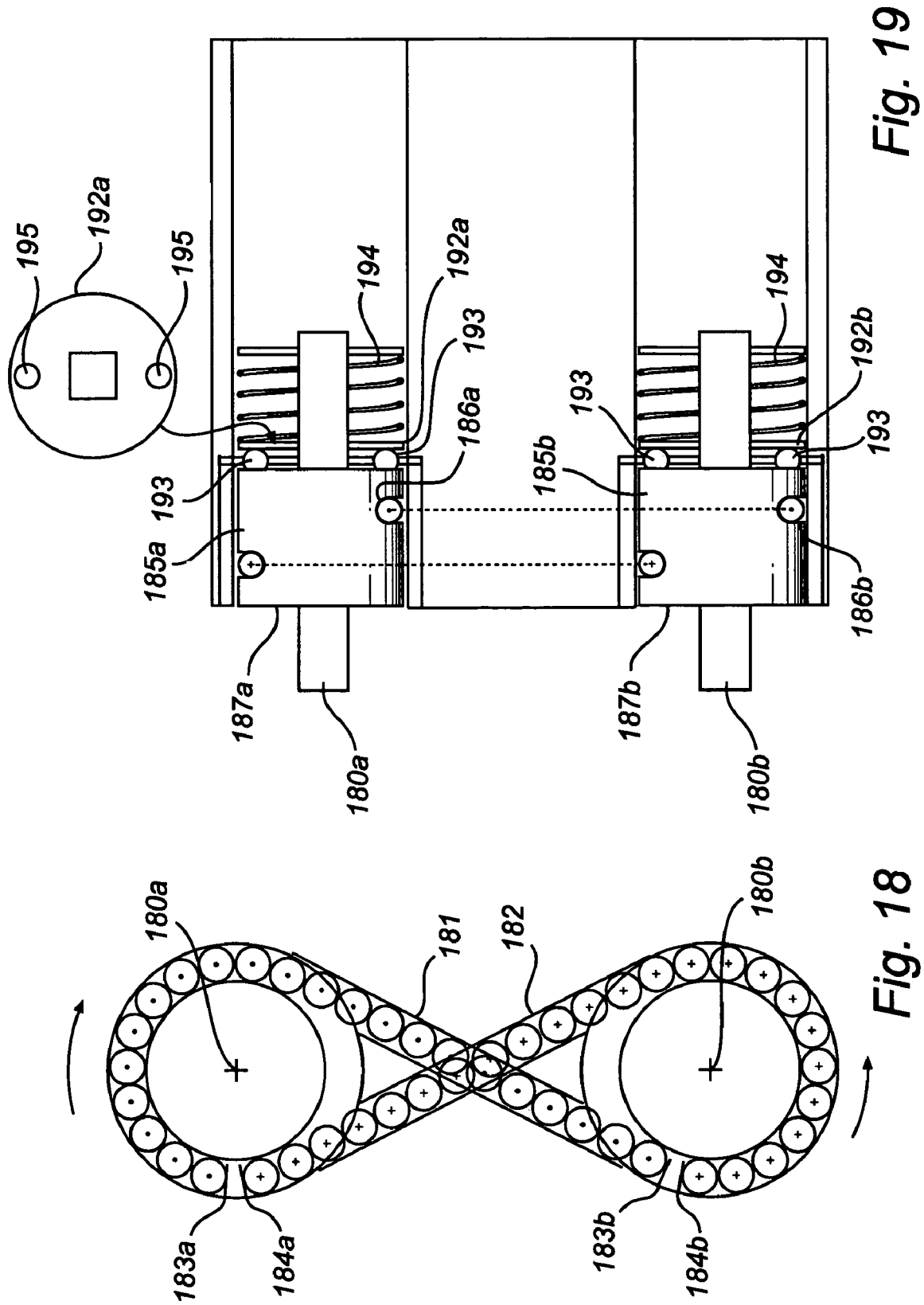

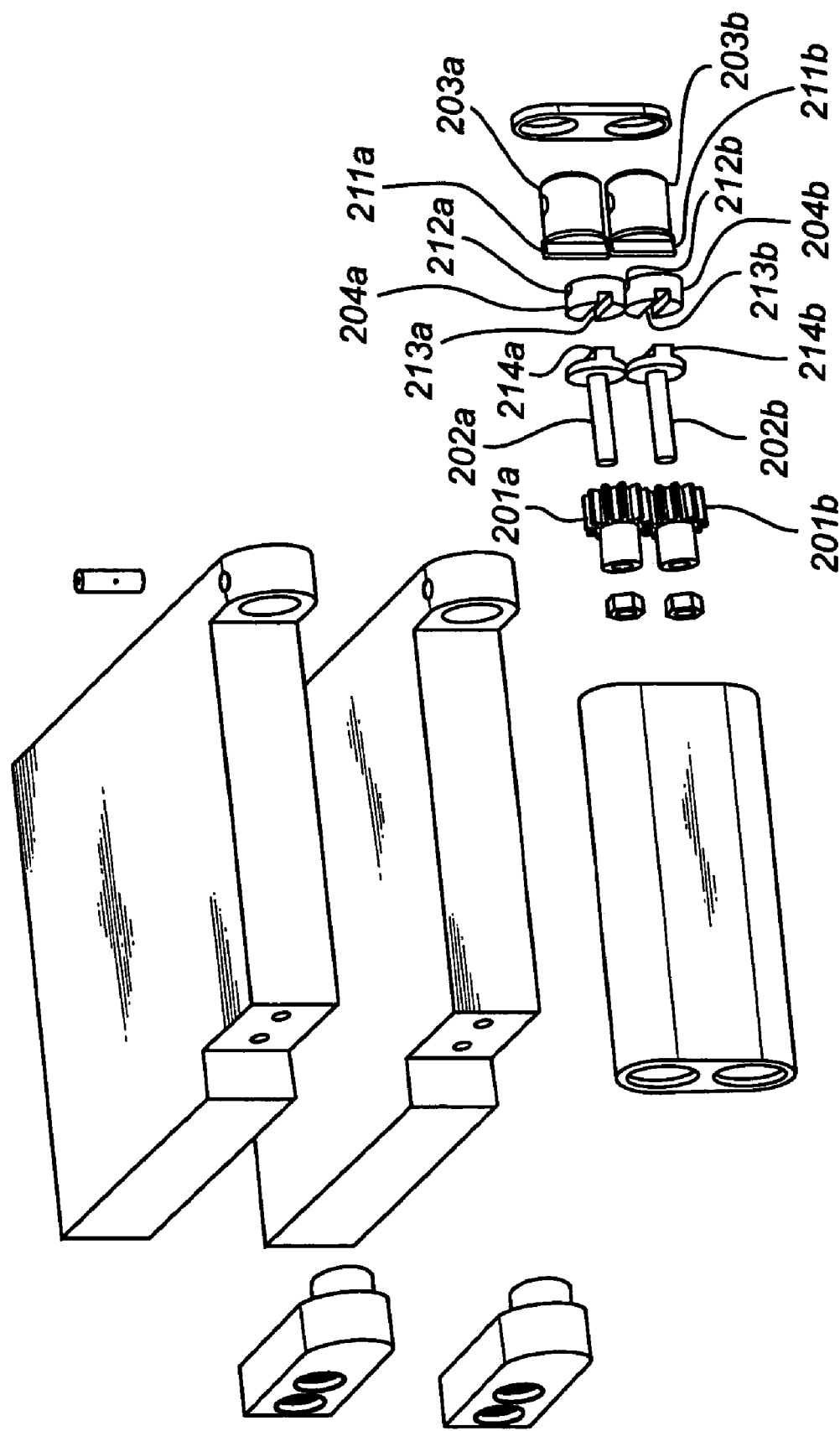

MOBILE COMMUNICATIONS DEVICE WITH SYNCHRONISING HINGE

CROSS-REFERENCE TO RELATED APPLICATIONS

This application claims priority to and the benefit of U.S. patent application Ser. No. 10/829,415, filed on Apr. 21, 2004, now U.S. Pat. No. 7,155,266, issued Dec. 26, 2006; which claims priority to and the benefit of U.S. patent application Ser. No. 10/421,278, filed Apr. 23, 2003, now U.S. Pat. No. 6,900,981, issued May 31, 2005, the disclosures of which are each incorporated herein by reference in their entirety.

FIELD OF INVENTION

The invention relates to a mobile communications device, and more particularly to foldable mobile communications device and a hinge for use therein.

TECHNICAL BACKGROUND

U.S. Patent Publication No. US 2002/0154475 A1 discloses a folding electronic device. The device has a first part with a keyboard and a second part with a display. The second part is connected to the first part by a two-joint mechanical hinge. The second part can be moved between a first position against a first side of the first part and a second position against an opposite second side of the first part.

Fold mobile phones, also known as a flip phone or a clamshell phone, are becoming more and more popular in today's mobile telephone market, especially in Asia. In normal fold mobile phones, the phones have a lid with a display which pivots about 160-180 degrees relative to the portion of the telephone having the keypad. The fold phone has two positions of the lid; either a closed position or an open position.

There is a desire for a new type of reconfigurable mobile telephone which can be configured similar to a conventional flip phone, and which also can be reconfigured with the lid pivoted more than 180 degrees, such as 360 degrees. However, for such a multi-open position fold mobile telephone, there is a desire to provide a robust and compact design which can provide a smooth opening and closing motion for the user. This type of motion will prevent the user from erroneously perceiving the mobile telephone as having a flimsy construction (which might be perceived from a flip phone which opens and closes too easily or with a hinge that does not move in a consistent repetitive fashion).

The Japanese patent document JP2003-309756 discloses a foldable mobile telephone, wherein a display portion is pivotable 180 degrees around a first axis relative a keyboard portion. The display portion is moreover pivotable 90 degrees around a second axis perpendicular to the first axis. A user of the mobile telephone may hence more freely turn the display portion to a desired direction. However, the structure of the hinge according to JP 2003-309756 does not allow a 360 degree folding of the two portions forming the mobile telephone.

U.S. 2003/0172495 A1 discloses a flip phone having a hinge mechanism with an auto-lock function. The flip phone includes a main body and a flipper connected by means of the hinge. The hinge is arranged to rotatably connect the flipper to the main body so as to provide an opened position or a closed position for the flipper. In the open position, the flipper is positioned at an angle approximately 160 degrees relative the main body.

SUMMARY OF INVENTION

In accordance with one aspect of the invention a hinge is provided. The hinge comprises a first hinge member defining a first axis of rotation with a first element connected to the hinge; a second hinge member defining an offset second axis of rotation with a second element connected to the hinge; and synchronizing members which transfer rotational movement of the first element relative to the hinge to rotational movement of the second element relative to the hinge through a path of about 360 degrees of rotational movement of the first element in relation to the second element.

When the user of the mobile communications device being provided with the hinge moves the two elements towards or away from each other the synchronizing members will force the rotation of the first element in relation to the hinge to be synchronized with the rotation of the second element in relation to the hinge. It is contemplated that in most embodiments the desired synchronization will force the two elements to rotate the same amount but in opposite directions in relation to the hinge. The result is that the relative rotation between the two elements connected to the hinge is divided into two equal rotations; one half being the rotation of the first element relative to the hinge and the second half being the rotation of the second element relative to the hinge. Thus when a user opens the two elements of the mobile communications device, each of the two elements will experience a rotation in relation to the hinge being half the rotation experienced between the two elements. Due to the synchronized movements of the first and second elements, the two elements will fold and unfold smoothly without the risk of jamming the hinge, i.e. the case where one element unfolds in relation to the hinge while the second element remains immovable relative to the hinge. The second element of the hinge is adapted to rotate about 360 degrees relative to the first element of the hinge.

The hinge body may be adapted to maintain a fixed offset distance between the first and second axes of rotation.

The hinge may be arranged in a mobile communications device comprising a first and a second section, wherein the first section of the mobile communications device comprises the first element of the hinge and the second section of the mobile communications device comprises the second element of the hinge.

The first and second elements of the hinge may be frame members rigidly attached or attachable to a first and second section of a mobile communications device. This way the hinge may be formed as a separate unit which fixed or detachably carry the first and second sections of a mobile communications device.

The hinge has preferably a thickness smaller than the thickness of the first and second section. With a hinge having a thickness smaller than the first and second section the hinge will be within the outer perimeter of the sections. This way the user will not experience that the hinge is inconveniently large. A hinge will e.g. be considered inconveniently large if it interferes with flat-laying of a mobile communications device on a table, or if it extends past the outer perimeter of a mobile communications device being closed for storage in a pocket or the like. It will also be considered inconveniently large if it get entangled with straps for other electronic devices, the headset of the mobile communications device or a string of a hood or the like on a jacket. The designs disclosed in more detail below make it possible to form a hinge with a thickness (in a direction being perpendicular both to a line extending between the first and second axis of rotation and to the first and second axis of rotation) being smaller than the distance between the first and the second axis of rotation. The designs disclosed in more detail below also makes it possible to form a hinge having a thickness (in a direction along the distance between the first and second axis of rotation) being smaller than twice the distance between the first and second axis of rotation. Dependent upon the kind of mobile communications device different aspects of being thin may be contemplated.

The hinge may comprise a hinge frame having a generally oval side profile and two parallel pin receiving holes. The thickness of the hinge may hence be reduced providing a slender but still durable hinge. As briefly mentioned above a slender design will minimize the risk that the mobile communications device get stuck in the pocket or get entangled with straps for other electronic devices, the headset of the mobile communications device or a string of a hood or the like on a jacket.

It is also contemplated that the hinge may comprise a hinge frame having a generally rectangular shape. This may e.g. be convenient when it is desired to provide a mobile communications device with stable stand up properties.

The hinge frame may comprise a recess for receiving the synchronizing members. The synchronizing members will then be protected from dust which could imperil the function of the hinge.

The hinge may comprise a hinge lock for locking the position of the second section relative to the first section at an intermediate position between a fully closed position and a 360 degree fully open position. A user of a device equipped with a hinge according to the present invention may hence unfold the device to specific, predetermined positions for e.g. viewing a screen on the device.

The synchronizing members of the hinge may comprise four conical or truncated conical gears connected to each other. More specifically the hinge may comprise a first and second hinge pin rotatably mounted in the pin receiving holes, wherein each of the first and second hinge pins may have one conical or truncated conical gear connected thereto, and each of the first or second hinge pins may be rigidly connected to a respective one of the first and second sections. A third, transverse hinge pin may have two conical or truncated conical gears connected thereto and may be rotatably mounted in connection to the conical or truncated conical gears of the first and second hinge pins so that rotational movement of the first hinge pin is transferred to the second hinge pin via the conical or truncated conical gears. The hinge hence provides a compact arrangement for transferring rotational movement from a first axis of rotation to a second axis of rotation. Since the gears on the third hinge pin may be separated along the third pin it is possible to bridge the distance between the first and second axis of rotation even if the gears are small. Thus, it will be possible to form the hinge with small gears not interfering with the aim of making the hinge with a smaller thickness than the sections it is attached to.

The hinge may comprise a hinge lock which comprises planar cut-outs on a partially cylindrical surface arranged between the two conical or truncated conical gears on the third hinge pin, wherein the partial cylindrical surface is arranged in contact with a spring-loaded lock control part. A very compact but still robust and flexible locking system is provided by the invention.

In accordance with an aspect of the inventive hinge the first hinge member comprises a first screw gear extending along the first axis of rotation, the second hinge member comprises a second screw gear extending along the second axis of rotation; and the synchronizing members comprises a moving member in engagement with the first screw gear and the second screw gear. Since the moving member bridges the distance between the first and second axis of rotation it will be possible to form the hinge with small gears not interfering with the aim of making the hinge with a smaller thickness than the sections it is attached to.

The moving member may be a block with openings which are provided with an internal thread and through which the screw gears extend. The block resembles two nuts attached in parallel with each other. In this case the screw gears are preferably provided with one or more threads extending along a screw line about respective screw gear. The threads of the screws (or of the block) may also be substituted by a pin or the like being adapted to follow a groove forming a thread in the block (or vice versa). The latter implies that the relative movement is limited by the extension, along the axes of rotation, of the threads of the component engaging the pin.

The moving member may be one or more members shaped as a sphere. In this case the screw gears are preferably provided with one or more recesses or grooves extending along a screw line about the envelope surface of respective screw gear. The one or more sphere shaped members are caught between the screw gears and rests partly in a groove of the first screw gear and partly in a recess of the second screw gear.

Preferably the first screw gear is adapted to rotate with the first element and the second screw gear is adapted to rotate with the second element, whereby the moving member is in engagement with the first screw gear such that rotational movement of the first element relative to the hinge causes the moving member to move along the screw gears in a direction being the same as caused by rotational movement of the second element relative to the hinge in an direction opposite the rotational movement of the first element. The moving member will thus be forced in one and the same direction when the two elements are imposed a rotational movement in opposite directions, i.e. when two elements are moved towards or away from each other. This movement of the moving member may be formed by two threaded screw-like elements extending along each other in the same direction, one being provided with left handed threads or grooves and the other being provided with right handed threads or grooves. With the two screw gears being provided with the same pitch, the moving member (e.g. the block or the sphere) a given amount of movement will give rise to the same amount of rotation of each of the two screw gears relative to the hinge body.

In accordance with an aspect of the inventive hinge the first hinge member comprises a first and a second reel-up surface extending about the first axis of rotation, the second hinge member comprises a third and a fourth reel-up surface extending about the second axis of rotation; and the synchronizing members comprises two belts, the first belt being wound about the first reel-up surface in a first direction and about the third reel-up surface in the first direction, and the second belt being wound about the second reel-up surface in a second direction, opposite the first direction, and about the fourth reel-up surface in the second direction.

With this arrangement the first and second hinge elements will be synchronized since any rotation of the first hinge member in relation to the hinge body will cause the other hinge member to experience the same amount of rotation in relation to the hinge body but in the opposite direction, i.e. the rotation of the hinge members in relation to each other will result in a rotation of the first hinge member in relation to the hinge and a rotation of the second hinge member in relation to the hinge where two latter will be half the total rotation.

When the first-hinge member is rotated in a first direction about the hinge body one of the belts will be further wound up on its reel-up surface and the other will be wound of its reel-up surface. The belt being further wound up about the first axis of rotation will transfer a pulling force through the belt which will cause the belt being wound off its reel-up surface about the second axis of rotation. The belt being wound off its reel-up surface about the first axis of rotation will be wound up on its reel-up surface about the second axis of rotation, since this reel-up surface will be rotated by the belt being wound up about the first axis of rotation. When the hinge members are rotated about the axes of rotation in the opposite direction the opposite phenomena will occur.

Consequently, when an user pulls apart the two elements connected via the hinge or push them towards each other, the total mutual rotation will be divided in two equal halves so that half the rotation will occur between the first hinge member and the hinge body and the other half will occur between the second hinge member and the hinge body.

Since the belts bridge the distance between the first and second axis of rotation it will be possible to form the hinge with small reel-up surfaces not interfering with the aim of making the hinge with a smaller thickness than the sections it is attached to.

The hinge may comprise at least one tensioning element applying a torque on at least one of the reel-up surfaces in relation to the hinge member associated with said at least one reel-up surface in the wound up direction of said at least on reel-up surface. With this configuration it is possible to avoid that the belts will slack. Any slack of the belts will be experienced by the user as looseness in the hinge performance. In technical terms the slack will be a play or allowance in the synchronizing mechanism. The wound up direction is the first direction for the first belt about the first reel-up surface or about the third reel-up surface, or the second direction for the second belt about the third reel-up surface or about the fourth reel-up surface.

The hinge may hinge comprise at least one tensioning element applying a torque on the first reel-up surface in relation to the first hinge member in the first direction or on the third reel-up surface in relation to the second hinge member in the first direction, and at least one tensioning element applying a torque on the second reel-up surface in relation to the first hinge member in the second direction or on the fourth reel-up surface in relation to the second hinge member in the second direction. This will in a relatively simple manner, in both directions of the movement of the hinge, prevent any play from occurring. By applying a torque in the wound up direction for each of the belts both belts will be tensioned such that a pulling force is always present on the belts. A belt always experiencing a pulling force will not give rise to any slack. Since both belts are tensioned in this manner, there will not be any slack in any direction of movement of the hinge.

The first and second reel-up surfaces may be formed on members being non-rotatably connected to each other or on portions of one member. This way the two belts will act as a continuous belt trained about the first axis of rotation.

The tensioning element may be connected to a member being provided with the third reel-up surface and is adapted to apply a torque in the first direction in relation to said member. By connecting the first and second reel-up surfaces and tensioning member being provided with the third reel-up surface it is possible to tension both belts in a simple manner. The member being provided with the fourth reel-up surface will be non-rotatably connected with the second hinge member. The second hinge member and the third reel-up surface will be tensioned to rotate in opposite directions in relation to each other. If the first and second reel-up surfaces are fixed the second hinge member will rotate until the second belt is stretched and the third reel-up surface will rotate in relation to the second hinge member until the first belt is stretched. Thus, the second hinge member will rotate an amount corresponding to the slack of the second belt and the third reel-up surface will rotate in relation to the second hinge member an amount corresponding to the total slack of the two belts (rotation of the third reel-up surface corresponding to the slack of the first belt, i.e. to the nominal position of the second hinge member, plus the rotation of the second hinge member due to the slack of the second belt).

It should be noted that the tensioning need not result in any significant geometrical change but may only result in that the different plays of the different parts of the synchronizing mechanism will all be tensioned in the same end position all the time, which by a user will be perceived as if there is no play or looseness at all.

In accordance with an aspect of the inventive hinge the synchronizing members define a first synchronizing axis on the first hinge member, a second synchronizing axis on the second hinge member, and further comprises a connecting link adapted to connect the first and second synchronizing axes with each other, wherein the first synchronizing axis is offset the first axis of rotation in a first direction and the second synchronizing axis is offset the second axis of rotation in a second, opposite the first, direction.

Since the connecting link bridges the distance between the first and second synchronizing axis it will be possible to form the hinge with small synchronizing members not interfering with the aim of making the hinge with a smaller thickness than the sections it is attached to.

The connecting link may be adapted to maintain a fixed offset distance between the first and second synchronizing axes. The hinge body may be adapted to maintain a fixed offset distance between the first and second axes of rotation. The offset distance between the first axis of rotation and the first synchronizing axis may be equal to the offset distance between the second axis of rotation and the second synchronizing axis.

Since any rotation of any of the hinge members (e.g. the first hinge member) will give a translation of the synchronizing axis (i.e. the first synchronizing axis,) the link will force the other synchronizing axis (i.e. the second synchronizing axis) to translate the same distance and in the same direction. The link will assure a fixed distance between the synchronizing axes and since the translation is produced by rotation about two offset axis and since the offset distance of each section is the same the translation of the synchronizing axis is forced to the same amount and in the same direction. Since the synchronizing axes are offset in opposite directions in relation to respective axis of rotation the translation of the latter synchronizing axis (i.e. the second synchronizing axis) will force the associated hinge member (i.e. the second hinge member) to rotate in the direction opposite the direction compared to the first hinge member.

In accordance with an aspect of the inventive hinge it further comprises a flex circuit extending across the hinge being adapted to electrically connecting electronic circuitry in a first section attached to the first hinge member to electronic circuitry in a second section attached to the second hinge member. With this flex circuit it is possible to electrically connect the electronic circuitry in the first section to electronic circuitry in the second section and still allowing the two sections to be folded about each other in a complete path of 360° in relation to each other.

The flex circuit may be partly wound about the first axis of rotation in a first direction and about the second axis of rotation also in the first direction. With this design the flex circuit will act as a belt being wound about the first and second axis of rotation such that it will be fully or partly transferred from one of the axis of rotation to the other as the hinge members are rotated.

The flex circuit may be wound about the first and second axis of rotation in a total winding angle of at least 180°. With this design there will always be enough circuit to allow a total mutual rotation of 360° of the hinge members and the axes of rotation. When the first axis rotates 180° and wound off 180° flex circuit, the second axis will rotate 180° and wound up the corresponding amount of flex circuit, thus allowing a total of 360° mutual rotation of the hinge members.

In accordance with an aspect of the inventive hinge a first synchronizing member extends or a first set of synchronizing members are arranged along a first path extending about the first axis in a first direction, between the first and second axes and about the second axis in a second, opposite the first direction, and a second synchronizing member extends or a second set of synchronizing members are arranged along a second path extending about the first axis in the second direction, between the first and second axis and about the second axis in the first direction.

In accordance with one embodiment the synchronizing members comprises a plurality of sphere shaped members arranged in a first queue along the first path and a second queue along the second path. The first hinge member is provided with a first stop engaging the first sphere in the first queue and the second hinge member is provided with a first stop engaging the last sphere in the first queue. The first hinge member is further provided with a second stop engaging the first sphere in the second queue and the second hinge member is provided with a second stop engaging the last sphere in the second queue. Respective queue essentially follows a line a thread or wire would follow if wound onto the envelope surfaces a first and second axis of the hinge members.

Since the two queues of spheres bridges the distance between the first and second rotation axis it will be possible to form the hinge with synchronizing members not interfering with the aim of making the hinge with a smaller thickness than the sections it is attached to.

In accordance with another embodiment the synchronizing members are formed by two non-collapsible belts extending along said first and second path. In this respect non-collapsible refers to belts being able to transfer a pressing power along its length. The first belt is connected to the first and second hinge members and is wound in opposite directions about respective axis of rotation. The second belt is connected to the first and second hinge members and is wound in opposite directions about respective axis of rotation and is wound in opposite direction compared to the first belt about respective axis of rotation. The non-collapsibility may be strengthened by forcing the belt to run in a channel limiting the belts possibility to be bent.

Since each of the two belts bridge the distance between the first and second rotation axis it will be possible to form the hinge with synchronizing members not interfering with the aim of making the hinge with a smaller thickness than the sections it is attached to.

The first synchronizing member or the first set of synchronizing members may be arranged to transfer a pressing power along the first path to synchronize a rotation of the first hinge member in the first direction with a rotation of the second hinge member in the second direction, and wherein the second member or the first set of synchronizing members may be arranged to transfer a pressing power along the second path to synchronize a rotation of the first hinge member in the second direction with a rotation of the second hinge member in the first direction.

In accordance with an aspect of the inventive hinge it further comprises a locking mechanism comprising a first locking member being non-rotatably connected to the first hinge member and provided with one or more indentations positioned at predetermined angular positions in relation to the first axis of rotation and a second locking member being non-rotatably connected to the hinge frame and provided with one or more protuberances positioned at predetermined angular positions in relation to the first axis of rotation.

With this design the user will experience a number of distinct positions where the hinge will be experienced as a fixed and stable unit. By introducing a number of indentations or protuberances at different angular positions it is possible to for the hinge to be locked into a number of different positions.

Respective protuberance may be formed by a sphere shaped member positioned at a predetermined angular position in relation to the first axis of rotation. With this design it is possible to achieve a locking mechanism which exert a minimum of resistance when not in a locking position. The sphere may be rotatably retained by the locking mechanism and thereby only exert a rolling friction when the sphere is not accommodated in any indentation. Moreover, the sphere shape makes it possible to achieve centering of the protuberance (the sphere) in the indentation since the sphere always engages an indentation with a wedge-like surface.

The first locking member may be movable in a direction allowing the indentations and protuberances to engage and disengage each other and is biased against the second locking member, or vice versa.

In accordance with an aspect of the inventive hinge the synchronizing members comprises a first gear rotatable with first hinge member about an third axis of rotation offset the first axis of rotation, a second gear rotatable with the second hinge member about a fourth axis of rotation offset the second axis of rotation and in engagement with the first gear, and a first intermediate member connecting the first hinge member with the first gear and a second intermediate member connecting the second hinge member with the second gear.

Since the axes of rotation of the first and second hinge members are not the same as the axes of rotation the gears, the axes of rotation of the gears may positioned such they need not bridge the distance between the axes of rotation of the hinge members but instead bridge a smaller distance. Thereby the gears may be smaller and the thickness of the hinge frame may be smaller than the thickness of the sections connected to the hinge.

The first and second hinge members may each be provided with a first guide member extending transversely to the first and second axis of rotation, respectively, the first and second intermediate members may on a first side each be provided with a second guide member extending transversely to the first and second axis of rotation and on a second side each be provided with a third guide member extending transversely to the first and second axis of rotation and transversely to the second guide member, and the gears may each be non-rotatably connected to a fourth guide member extending transversely to the third and fourth axis of rotation, respectively, whereby the two first guide members each engage a second guide member and the two third guide members each engage a fourth guide member.

With this design the intermediate members will slide along the first and fourth guide members depending on the orientation of the hinge members and still be able to transmit the rotation from the hinge members to the gears with an offset of the axes of rotation of the hinge members and the axes of rotation of the gears.

In accordance with an aspect of the inventive hinge it further comprises a locking mechanism comprising a first locking member being non-rotatably connected to the first hinge member and provided with one or more indentations positioned at predetermined angular positions in relation to the first axis of rotation and a second locking member being non-rotatably connected to the hinge frame and provided with one or more protuberances positioned at predetermined angular positions in relation to the first axis of rotation.

With this design the user will experience a number of distinct positions where the hinge will be experienced as a fixed and stable unit. By introducing a number of indentations or protuberances at different angular positions it is possible to for the hinge to be locked into a number of different positions.

The first locking member may comprise a disc non-rotatable attached to the hinge member as a wheel about the first axis of rotation and provided with indentation on at least one side surface, and the second locking member may comprise an elastically deformable plate provided with protuberances.

This makes it possible to form the locking mechanism in a simple and space effective manner. The design may further be robust and reliable in use. The plate may be formed from sheet metal and be provided with the protuberances by simply pressing or deep drawing a bulge in the metallic plate.

The first locking member may comprise a disc non-rotatable attached to the hinge member as a wheel about the first axis of rotation and provided with indentation on at least one side surface, and the second locking member may alternatively comprise an intermediate member provided with protuberances, wherein the intermediate member being biased against the disc by an elastically deformable plate.

This makes it possible to form the locking mechanism in a simple and space effective manner. The design may further be robust and reliable in use. The use of an intermediate member makes it possible to design the shape of the protuberances without any limitations imposed by the choice of material for the flexible plate. The intermediate member may e.g. be a block of a polymeric material and the plate may e.g. be made of sheet metal.

In accordance with an aspect of the inventive hinge the synchronizing member comprises a flexible shaft being able to transfer a rotation and being able to be bent into a U-shape, wherein a first end of the flexible shaft is connected to the first hinge member and a second end of the flexible shaft is connected to the second hinge member, and wherein the shaft is bent into a U-shape.

Since the flexible shaft is bent into a U-shape the ends will face in the same direction. Thus, a rotation of a first member connected to the first end will result in a rotation of a second member connected to the second end in the opposite direction.

Since the U-shape of the flexible shaft bridges the distance between the first and second synchronizing axis it will be possible to form the hinge with small synchronizing members not interfering with the aim of making the hinge with a smaller thickness than the sections it is attached to.

In accordance with one embodiment the flexible shaft is basically formed of a screw spring, wherein the wire forming the spring is wound along a screw line about an axis of rotation. The axis of rotation is bent into a U-shape.

In accordance with another embodiment the flexible shaft is basically formed a flexible shaft of a polymeric material or the like. The torsional stiffness may be increased by winding threads or wires diagonally about the shaft.

In accordance with an aspect of the inventive hinge the synchronizing members comprise a first gear rotatable with the first hinge member about the first axis of rotation, a second gear rotatable with the second hinge member about the second axis of rotation, a third gear being rotatable about a third axis of rotation offset the first axis of rotation and being via its inner surface in engagement with the first gear, a fourth gear being rotatable about a fourth axis of rotation offset the second axis of rotation and being via its inner surface in engagement with the second gear, wherein the outer surface of the third gear is in engagement with the outer surface of the fourth gear.

Since the gears on the third and fourth axes of rotation only need to be large enough to bridge the distance between the third and fourth axes of rotation and since the third and fourth axes of rotation may be closer to each other than the first and second axes of rotation, due to the contact of the inner surface of the gears on the third and fourth axes with the outside surfaces of the gears on the first and second axes, the gears may be smaller and the thickness of the hinge frame may be smaller than the thickness of the sections connected to the hinge.

The third axis of rotation and the fourth axis of rotation may, along the direction defined by the distance between the first and second axis of rotation, be positioned between the first and second axis of rotation.

As long as the distance between the third and fourth axis small enough it is conceivable that the third and fourth axes of rotation are offset in the transverse direction in relation to a line between the first and second axes of rotation.

It should also be noted that the gears may be provided with teeth meshing into each other or with relatively smooth surfaces contacting each other with friction being high enough to transmit the torque required for the synchronizing mechanism to be experienced as stable.

In accordance with another aspect of the present invention, a mobile communications device is provided comprising a housing; a transceiver in the housing; a keypad connected to the housing; and a display connected to the housing. The housing comprises a first section movably connected to a second section of the housing by a multi-axis hinge. A first axis of rotation of the hinge is provided at the first section of the housing. A second offset axis of rotation of the hinge is provided at the second section of the housing. The hinge comprises means for synchronizing rotation of the first and second sections relative to the hinge through a path of about 360 degrees. The second section of the housing is adapted to rotate about 360 degrees relative to the first section of the housing.

In accordance with another aspect of the present invention, a mobile communications device is provided comprising a housing having a first section, a second section, and a synchronized rotation multi-axis hinge connection connecting the first section with the second section; a transceiver located in the housing; a keypad connected to the housing; a display connected to the housing; and a flex conductor extending across the hinge connection and coupling electronic circuitry in the first section of the housing with electronic circuitry in the second section of the housing. The synchronized rotation multi-axis hinge connection comprises a hinge frame; two hinge pins rotatably mounted in the hinge frame; synchronizing gears connecting the hinge pins to each other; a first frame member fixedly connecting a first one of the hinge pins to the first section of the housing; and a second frame member fixedly connecting a second one of the hinge pins to the second section of the housing. The second section of the housing is adapted to rotate about 360 degrees relative to the first section of the housing.

When the user of the mobile communications device being provided with the synchronized hinge moves the two elements towards or away from each other the synchronizing members will force the rotation of the first element in relation to the hinge to be synchronized with the rotation of the second element in relation to the hinge. It is contemplated that in most embodiments the desired synchronization will force the two elements to rotate the same amount but in opposite directions in relation to the hinge. The result is that the relative rotation between the two elements connected to the hinge is divided into two equal rotations; one half being the rotation of the first element relative to the hinge and the second half being the rotation of the second element relative to the hinge. Thus when a user opens the two elements of the mobile communications device, each of the two elements will experience a rotation in relation to the hinge being half the rotation experienced between the two elements.

The hinge of the mobile communications device may have a thickness smaller than the thickness of the first and second section. With a hinge having a thickness smaller than the first and second section the hinge will be within the outer perimeter of the sections. This way the user will not experience that the hinge is inconveniently large. A hinge will e.g. be considered inconveniently large if it interferes with flat-laying of an electronic device on a table, or if it extends past the outer perimeter of an electronic device being closed for storage in a pocket or the like. It will also be considered inconveniently large if it get entangled with straps for other electronic devices, the headset of the mobile communications device or a string of a hood or the like on a jacket. The designs disclosed in more detail below make it possible to form a hinge with a thickness (in a direction being perpendicular both to a line extending between the first and second axis of rotation and to the first and second axis of rotation) being smaller than the distance between the first and the second axis of rotation. The designs disclosed in more detail below also makes it possible to form a hinge having a thickness (in a direction along the distance between the first and second axis of rotation) being smaller than twice the distance between the first and second axis of rotation. Dependent upon the kind of electronic device different aspects of being thin may be contemplated.

The first and second sections of the mobile communications device may comprise a first position with the keypad and display being closed by the first and second sections, a second position with the second section rotated about 180 degrees relative to the first section such that the first section is substantially inline with the second section and a hinge frame of the hinge, and a third position with the second section rotated about 360 degrees relative to the first section and having the keypad and display located on opposite exterior facing sides of the mobile communications device. With this design it is possible to provide the mobile communications device with dedicated functionality relating to the different positions.

The hinge body may be adapted to maintain a fixed offset distance between the first and second axes of rotation.

The hinge may comprise a hinge frame having a general oval side profile and two parallel pin receiving holes. The thickness of the hinge may hence be reduced providing a slender but still durable hinge. As briefly mentioned above a slender design will minimize the risk that the mobile communications device get stuck in the pocket or get entangled with straps for other electronic devices, the headset of the mobile communications device or a string of a hood or the like on a jacket.

It is also contemplated that the hinge may comprise a hinge frame having a generally rectangular shape. This may e.g. be convenient when it is desired to provide a mobile communications device with stable stand up properties.

The connection may comprise a detent locating system for locking position of the second section relative to the first section at an intermediate position between a fully closed position and a 360 degree fully open position. The hinge may comprise a hinge lock for locking the position of the second section relative to the first section at an intermediate position between a fully closed position and a 360 degree fully open position. A user of a device equipped with a hinge according to the present invention may hence unfold the device to specific, predetermined positions for e.g. viewing a screen on the device.

In accordance with an aspect of the inventive mobile communications device the means for synchronizing rotation of the first and second sections of the mobile communications device relative to the hinge comprise gears connected to each other. The means for synchronizing the rotation of the first and second sections relative to the hinge may comprise four conical or truncated conical gears connected to each other. The hinge may comprise a first and second hinge pin rotatably mounted in the pin receiving holes, each of the first and second hinge pin having one conical or truncated conical gear connected thereto, and each of the first or second hinge pin being rigidly connected to a respective one of the first and second sections; a third, transverse hinge pin having two conical or truncated conical gears connected thereto and rotatably mounted in juxtaposition to the first and second hinge pins so that rotational motion of the first hinge pin is transferred to the second hinge pin via the conical or truncated conical gears. The hinge hence provides a compact arrangement for transferring rotational movement from a first axis of rotation to a second axis of rotation. Since the gears on the third hinge pin may be separated along the third pin it is possible to bridge the distance between the first and second axis of rotation even if the gears are small. Thus, it will be possible to form the hinge with small gears not interfering with the aim of making the hinge with a smaller thickness than the sections it is attached to.

In accordance with an aspect of the inventive mobile communications device, the first hinge member comprises a first screw gear extending along the first axis of rotation, the second hinge member comprises a second screw gear extending along the second axis of rotation; and the synchronizing members comprises a moving member in engagement with the first screw gear and the second screw gear. Since the moving member bridges the distance between the first and second axis of rotation it will be possible to form the hinge with small gears not interfering with the aim of making the hinge with a smaller thickness than the sections it is attached to.

The moving member may be a block with openings which are provided with an internal thread and through which the screw gears extend. The block resembles two nuts attached in parallel with each other. In this case the screw gears are preferably provided with one or more threads extending along a screw line about respective screw gear. The threads of the screws (or of the block) may also be substituted by a pin or the like being adapted to follow a groove forming a thread in the block (or vice versa). The latter implies that the relative movement is limited by the extension, along the axes of rotation, of the threads of the component engaging the pin.

The moving member may be one or more members shaped as a sphere. In this case the screw gears are preferably provided with one or more recesses or grooves extending along a screw line about the envelope surface of respective screw gear. The one or more sphere shaped members are caught between the screw gears and rest partly in a groove of the first screw gear and partly in a groove of the second screw gear.

Preferably the first screw gear is adapted to rotate with the first element and the second screw gear is adapted to rotate with the second element, whereby the moving member is in engagement with the first screw gear such that rotational movement of the first element relative to the hinge causes the moving member to move along the screw gears in a direction being the same as caused by rotational movement of the second element relative to the hinge in an direction opposite the rotational movement of the first element. The moving member will thus be forced in one and the same direction when the two elements are imposed a rotational movement in opposite directions, i.e. when two elements are moved towards or away from each other. This movement of the moving member may be formed by two threaded screw-like elements extending along each other in the same direction, one being provided with left handed threads or grooves and the other being provided with right handed threads or grooves. With the two screw gears being provided with the same pitch, the moving member (e.g. the block or the sphere) a given amount of movement will give rise to the same amount of rotation of each of the two screw gears relative to the hinge body.

In accordance with an aspect of the inventive mobile communications device the first section comprises a first and a second reel-up surface extending about the first axis of rotation, the second section comprises a third and a fourth reel-up surface extending about the second axis of rotation; and the means for synchronizing the rotation of the first and second section comprises two belts, the first belt being wound about the first reel-up surface in a first direction and about the third reel-up surface in the first direction, and the second belt being wound about the second reel-up surface in a second, opposite the first, direction and about the fourth reel-up surface in the second direction.

With this arrangement the first and second hinge elements will be synchronized since any rotation of the first hinge member in relation to the hinge body will cause the other hinge member to experience the same amount of rotation in relation to the hinge body but in the opposite direction, i.e. the rotation of the hinge members in relation to each other will result in a rotation of the first hinge member in relation to the hinge and a rotation of the second hinge member in relation to the hinge where two latter will be half the total rotation.

When the first hinge member is rotated in a first direction about the hinge body one of the belts will be further wound up on its reel-up surface and the other will be wound of its reel-up surface. The belt being further wound up about the first axis of rotation will transfer a pulling force through the belt which will cause the belt being wound off its reel-up surface about the second axis of rotation. The belt being wound off its reel-up surface about the first axis of rotation will be wound up on its reel-up surface about the second axis of rotation, since this reel-up surface will be rotated by the belt being wound up about the first axis of rotation. When the hinge members are rotated about the axes of rotation in the opposite direction the opposite phenomena will occur.

Consequently, when an user pulls apart the two elements connected via the hinge or push them towards each other, the total mutual rotation will be divided in two equal halves so that half the rotation will occur between the first hinge member and the hinge body and the other half will occur between the second hinge member and the hinge body.

Since the belts bridge the distance between the first and second axis of rotation it will be possible to form the hinge with small reel-up surfaces not interfering with the aim of making the hinge with a smaller thickness than the sections it is attached to.

The hinge of the mobile communication may comprise at least one tensioning element applying a torque on at least one of the reel-up surfaces in relation to the section associated with said at least one reel-up surface in the wound up direction of said at least on reel-up surface.

With this configuration it is possible to avoid that the belts will slack. Any slack of the belts will be experienced by the user as looseness in the hinge performance. In technical terms the slack will be a play or allowance in the synchronizing mechanism. The wound up direction is the first direction for the first belt about the first reel-up surface or about the third reel-up surface, or the second direction for the second belt about the third reel-up surface or about the fourth reel-up surface.

The hinge of the mobile communications device may comprise at least one tensioning element applying a torque on the first reel-up surface in relation to the first section in the first direction or on the third reel-up surface in relation to the second section in the first direction, and at least one tensioning element applying a torque on the second reel-up surface in relation to the first section in the second direction or on the fourth reel-up surface in relation to the second section in the second direction.

This will in a relatively simple manner, in both directions of the movement of the hinge, prevent any play from occurring. By applying a torque in the wound up direction for each of the belts both belts will be tensioned such that a pulling force is always present on the belts. A belt always experiencing a pulling force will not give rise to any slack. Since both belts are tensioned in this manner, there will not be any slack in any direction of movement of the hinge.

The first and second reel-up surfaces may be formed on members being non-rotatably connected to each other or on portions of one member. This way the two belts will act as a continuous belt trained about the first axis of rotation.

The tensioning element may be connected to a member being provided with the third reel-up surface and is adapted to apply a torque in the first direction in relation to said member. By connecting the first and second reel-up surfaces and tensioning member being provided with the third reel-up surface it is possible to tension both belts in a simple manner. The member being provided with the fourth reel-up surface will be non-rotatably connected with the second hinge member. The second hinge member and the third reel-up surface will be tensioned to rotate in opposite directions in relation to each other. If the first and second reel-up surfaces are fixed the second hinge member will rotate until the second belt is stretched and the third reel-up surface will rotate in relation to the second hinge member until the first belt is stretched. Thus, the second hinge member will rotate an amount corresponding to the slack of the second belt and the third reel-up surface will rotate in relation to the second hinge member an amount corresponding to the total slack of the two belts (rotation of the third reel-up surface corresponding to the slack of the first belt, i.e. to the nominal position of the second hinge member, plus the rotation of the second hinge member due to the slack of the second belt).

In accordance with an aspect of the inventive mobile communications device the synchronizing means define a first synchronizing axis at the first section, a second synchronizing axis at the second section, and further comprise a connecting link adapted to connect the first and second synchronizing axes with each other, wherein the first synchronizing axis is offset the first axis of rotation in a first direction and the second synchronizing axis is offset the second axis of rotation in a second, opposite the first, direction.

Since the connecting link bridges the distance between the first and second synchronizing axis it will be possible to form the mobile communications device with a hinge with small synchronizing members not interfering with the aim of making the hinge with a smaller thickness than the sections it is attached to.

The connecting link may be adapted to maintain a fixed offset distance between the first and second synchronizing axes. The hinge body may be adapted to maintain a fixed offset distance between the first and second axes of rotation. The offset distance between the first axis of rotation and the first synchronizing axis may be equal to the offset distance between the second axis of rotation and the second synchronizing axis.

Since any rotation of any of the sections (e.g. the first section) will give a translation of the synchronizing axis (i.e. the first synchronizing axis) the link will force the other synchronizing axis (i.e. the second synchronizing axis) to translate the same distance and in the same direction. The link will assure a fixed distance between the synchronizing axes and since the translation is produced by rotation about two offset axis and since the offset distance of each section is the same the translation of the synchronizing axis is forced to the same amount and in the same direction. Since the synchronizing axes are offset in opposite directions in relation to respective axis of rotation the translation of the latter synchronizing axis (i.e. the second synchronizing axis) will force the associated section (i.e. the second section) to rotate in the direction opposite the direction compared to the first section.

In accordance with an aspect of the inventive mobile communications device it further comprises a flex circuit extending across the hinge and electrically connecting electronic circuitry in the first section to electronic circuitry in the second section. With this flex circuit it is possible to electrically connect the electronic circuitry in the first section to electronic circuitry in the second section and still allowing the two sections to be folded about each other in a complete path of 360° in relation to each other.

The flex circuit may be partly wound about the first axis of rotation in a first direction and about the second axis of rotation also in the first direction. With this design the flex circuit will act as a belt being wound about the first and second axis of rotation such that it will be fully or partly transferred from one of the axis of rotation to the other as the hinge members are rotated.

The flex circuit may be wound about the first and second axis of rotation in a total winding angle of at least 180°. With this design there will always be enough circuit to allow a total mutual rotation of 360° of the hinge members and the axes of rotation. When the first axis rotates 180° and wound off 180° flex circuit, the second axis will rotate 180° and wound up the corresponding amount of flex circuit, thus allowing a total of 360° mutual rotation of the hinge members.

In accordance with an aspect of the inventive mobile communications device a first synchronizing member extends or a first set of synchronizing members are arranged along a first path extending about the first axis in a first direction, between the first and second axes and about the second axis in a second, opposite the first, direction, and a second synchronizing member extends or a second set of synchronizing members are arranged along a second path extending about the first axis in the second direction, between the first and second axis and about the second axis in the first direction.

In accordance with one embodiment the synchronizing members comprises a plurality of sphere shaped members arranged in a first queue along the first path and a second queue along the second path. The hinge member of the first section is provided with a first stop engaging the first sphere in the first queue and the hinge member of the second section is provided with a first stop engaging the last sphere in the first queue. The hinge member of the first section is further provided with a second stop engaging the first sphere in the second queue and the hinge member of the second section is provided with a second stop engaging the last sphere in the second queue. Respective queue essentially follows a line a thread or wire would follow if wound onto the envelope surfaces a first and second axis of the hinge members.

Since the two queues of spheres bridges the distance between the first and second rotation axis it will be possible to form the hinge with synchronizing members not interfering with the aim of making the hinge with a smaller thickness than the sections it is attached to.

In accordance with another embodiment the synchronizing members are formed by two non-collapsible belts extending along said first and second path. In this respect non-collapsible refers to belts being able to transfer a pressing power along its length. The first belt is connected to the first and second hinge members and is wound in opposite directions about respective axis of rotation. The second belt is connected to the first and second hinge members and is wound in opposite directions about respective axis of rotation and is wound in opposite direction compared to the first belt about respective axis of rotation. The non-collapsibility may be strengthened by forcing the belt to run in a channel limiting the belts possibility to be bent.

Since each of the two belts bridge the distance between the first and second rotation axis it will be possible to form the hinge with synchronizing members not interfering with the aim of making the hinge with a smaller thickness than the sections it is attached to.

The first synchronizing member or the first set of synchronizing members may be arranged to transfer a pressing power along the first path to synchronize a rotation of the first section in the first direction with a rotation of the second section in the second direction, and the second member or the first set of synchronizing members may be arranged to transfer a pressing power along the second path to synchronize a rotation of the first section in the second direction with a rotation of the second section in the first direction.

In accordance with an aspect of the inventive mobile communications device it further comprises a locking mechanism comprising a first locking member being non-rotatably connected to the first section and provided with one or more indentations positioned at predetermined angular positions in relation to the first axis of rotation and a second locking member being non-rotatably connected to the hinge and provided with one or more protuberances positioned at predetermined angular positions in relation to the first axis of rotation.

With this design the user will experience a number of distinct positions where the mobile communications device will be experienced as a fixed and stable unit. By introducing a number of indentations or protuberances at different angular positions it is possible to for the hinge of the device to be locked into a number of different positions.

Respective protuberance may be formed by a sphere shaped member positioned at a predetermined angular position in relation to the first axis of rotation. With this design it is possible to achieve a locking mechanism which exert a minimum of resistance when not in a locking position. The sphere may be rotatably retained by the locking mechanism and thereby only exert a rolling friction when the sphere is not accommodated in any indentation. Moreover, the sphere shape makes it possible to achieve centering of the protuberance (the sphere) in the indentation since the sphere always engages an indentation with a wedge-like surface.

The first locking member may be movable in a direction allowing the indentations and protuberances to engage and disengage each other and is biased against the second locking member, or vice versa.

In accordance with an aspect of the inventive mobile communications device the synchronizing members comprises a first gear rotatable with first section about an third axis of rotation offset the first axis of rotation, a second gear rotatable with the second section about a fourth axis of rotation offset the second axis of rotation and in engagement with the first gear and a first intermediate member connecting the first section with the first gear and a second intermediate member connecting the second section with the second gear.

Since the axes of rotation of the first and second sections are not the same as the axes of rotation the gears, the axes of rotation of the gears may positioned such they need not bridge the distance between the axes of rotation of the hinge members but instead bridge a smaller distance. Thereby the gears may be smaller and the thickness of the hinge frame may be smaller than the thickness of the sections connected to the hinge.

The first and second sections may each be provided with a first guide member extending transversely to the first and second axis of rotation, respectively, the first and second intermediate members may on a first side each be provided with a second guide member extending transversely to the first and second axis of rotation and on a second side each be provided with a third guide member extending transversely to the first and second axis of rotation and transversely to the second guide member, and the gears may each be non-rotatably connected to a fourth guide member extending transversely to the third and fourth axis of rotation, respectively, whereby the two first guide members each engage a second guide member and the two third guide members each engage a fourth guide member.

With this design the intermediate members will slide along the first and fourth guide members depending on the orientation of the sections and still be able to transmit the rotation from the hinge members to the gears with an offset of the axes of rotation of the hinge members and the axes of rotation of the gears.

In accordance with an aspect of the inventive mobile communications device it further comprises a locking mechanism comprising a first locking member being non-rotatably connected to the first section and provided with one or more indentations positioned at predetermined angular positions in relation to the first axis of rotation and a second locking member being non-rotatably connected to the hinge and provided with one or more protuberances positioned at predetermined angular positions in relation to the first axis of rotation.

With this design the user will experience a number of distinct positions where the mobile communications device will be experienced as a fixed and stable unit. By introducing a number of indentations or protuberances at different angular positions it is possible to for the hinge of the device to be locked into a number of different positions.

The first locking member may comprise a disc non-rotatable attached to the first section as a wheel about the first axis of rotation and provided with indentation on at least one side surface, and the second locking member may comprise an elastically deformable plate provided with protuberances.

This makes it possible to form the locking mechanism in a simple and space effective manner. The design may further be robust and reliable in use. The plate may be formed from sheet metal and be provided with the protuberances by simply pressing or deep drawing a bulge in the metallic plate.

The first locking member may comprise a disc non-rotatable attached to the first section as a wheel about the first axis of rotation and provided with indentation on at least one side surface, and the second locking member may comprise an intermediate member provided with protuberances, wherein the intermediate member being biased against the disc by an elastically deformable plate.

This makes it possible to form the locking mechanism in a simple and space effective manner. The design may further be robust and reliable in use. The use of an intermediate member makes it possible to design the shape of the protuberances without any limitations imposed by the choice of material for the flexible plate. The intermediate member may e.g. be a block of a polymeric material and the plate may e.g. be made of sheet metal.

In accordance with an aspect of the inventive mobile communications device the synchronizing member comprises a flexible shaft being able to transfer a rotation and being able to be bent into a U-shape, wherein a first end of the flexible shaft is connected to the first section and a second end of the flexible shaft is connected to the second section, and wherein the shaft is bent into a U-shape.

Since the flexible shaft is bent into a U-shape the ends will face in the same direction. Thus, a rotation of the first section connected to the first end will result in a rotation of the second section connected to the second end in the opposite direction.

Since the U-shape of the flexible shaft bridges the distance between the first and second synchronizing axis it will be possible to form the hinge with small synchronizing members not interfering with the aim of making the hinge with a smaller thickness than the sections it is attached to.

In accordance with one embodiment the flexible shaft is basically formed of a screw spring, wherein the wire forming the spring is wound along a screw line about an axis of rotation. The axis of rotation is bent into a U-shape.

In accordance with another embodiment the flexible shaft is basically formed a flexible shaft of a polymeric material or the like. The torsional stiffness may be increased by winding threads or wires diagonally about the shaft.

In accordance with an aspect of the inventive mobile communications device the synchronizing members comprise a first gear rotatable with the first section about the first axis of rotation, a second gear rotatable with the second section about the second axis of rotation, a third gear being rotatable about a third axis of rotation offset the first axis of rotation and being via its inner surface in engagement with the first gear, a fourth gear being rotatable about a fourth axis of rotation offset the second axis of rotation and being via its inner surface in engagement with the second gear, wherein the outer surface of the third gear is in engagement with the outer surface of the fourth gear.

Since the gears on the third and fourth axes of rotation only need to be large enough to bridge the distance between the third and fourth axes of rotation and since the third and fourth axes of rotation may be closer to each other than the first and second axes of rotation, due to the contact of the inner surface of the gears on the third and fourth axes with the outside surfaces of the gears on the first and second axes, the gears may be smaller and the thickness of the hinge frame may be smaller than the thickness of the sections connected to the hinge.

The third axis of rotation and the fourth axis of rotation may, along the direction defined by the distance between the first and second axis of rotation, be positioned between the first and second axis of rotation.

As long as the distance between the third and fourth axis small enough it is conceivable that the third and fourth axes of rotation are offset in the transverse direction in relation to a line between the first and second axes of rotation.

It should also be noted that the gears may be provided with teeth meshing into each other or with relatively smooth surfaces contacting each other with friction being high enough to transmit the torque required for the synchronizing mechanism to be experienced as stable.

BRIEF DESCRIPTION OF THE DRAWINGS

The invention will be described in more detail with reference to the appended schematic drawings, which shows examples of presently preferred embodiments of the invention.

FIG. 1 is a perspective view of a mobile communications device in a first closed position incorporating features of the present invention;

FIG. 2 is a perspective view of the mobile communications device shown in FIG. 1 with housing components moved to an intermediate flipped open position;

FIG. 3 is a perspective view of the mobile communications device shown in FIG. 1 with housing components moved to a 360 degree fully flipped open and folded position;

FIG. 6 is a perspective view of an alternative embodiment of the hinge used in the mobile communications device shown in FIG. 1 with the hinge shown at a first closed position corresponding to the position shown in FIG. 1;

FIG. 7 is a perspective view of an alternative embodiment of the hinge shown in FIG. 6 moved to a second intermediate position corresponding to the position shown in FIG. 2;

FIG. 8 is a perspective view of an alternative embodiment of the hinge shown in FIG. 6 moved to a third position corresponding to the position shown in FIG. 3;

FIG. 18 is a schematic view of an alternative embodiment of the hinge incorporating two queues of spheres arranged in a path shaped as an 8.

FIG. 19 is a shows a design of involving the principle of FIG. 18.

FIG. 22 is an exploded view showing a complete mobile communications device with a synchronizing mechanism in accordance with FIG. 21a-b.

DETAILED DESCRIPTION OF PREFERRED EMBODIMENTS

Figure 4A:
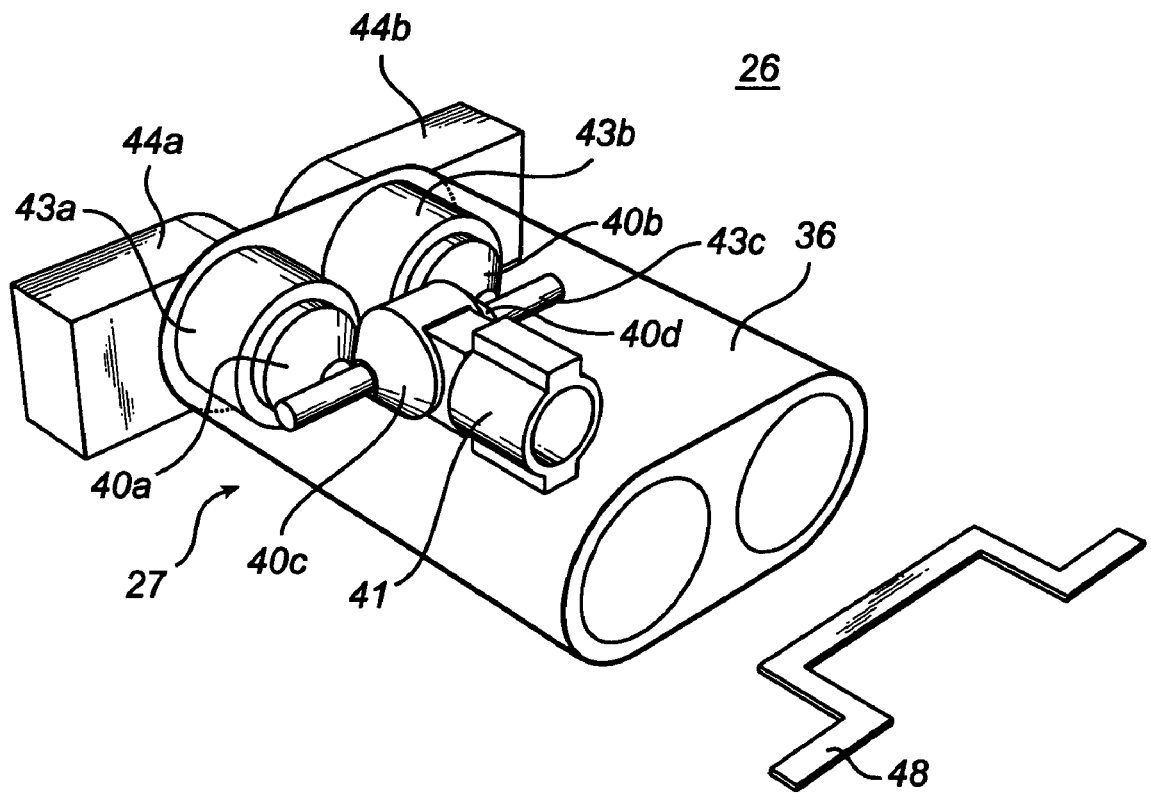
FIG. 4a is an perspective view of a hinge for the mobile communications device shown in FIG. 1 according to a preferred embodiment of the present invention.

Referring to FIG. 1, there is shown a perspective view of an mobile communications device 10 incorporating features of the present invention. Although the present invention will be described with reference to the exemplary embodiments shown in the drawings, it should be understood that the present invention can be embodied in many alternative forms of embodiments. In addition, any suitable size, shape or type of elements or materials could be used.

In the embodiment shown, the mobile communications device 10 generally comprises a mobile communicator, such as a mobile telephone. In alternative embodiments, the mobile communications device could comprise any suitable type of mobile communicator, such as a device which comprises a pager function or a text transmission function.

Referring also to FIG. 2, the mobile communications device 10, in the embodiment shown, generally comprises a housing 12, a keypad 14, a display 16, a transceiver 18, a battery 20 and other components conventional to a mobile telephone, such as a microprocessor and an antenna. The housing 12 generally comprises a first section 22, a second section 24, and a connection 26 which movably connects the second section 24 to the first section 22. In the embodiment shown, the keypad 14 is connected to the first section 22 of the housing. The display 16 is connected to the second section 24 of the housing. In alternative embodiments, the various mobile communications components of the telephone 10 could be located in any one of the housing sections.

Referring particularly to FIGS. 1-3, the housing 12 is movable into at least three different configurations. FIG. 1 shows the housing 12 in a closed, folded first configuration. In this closed, folded first configuration the first and second sections 22, 24 are located adjacent each other with the display 16 and keypad 14 facing each other. This provides a compact folded configuration wherein the keypad 14 and display 16 are not readily accessible to the user. In an alternative embodiment, the first section 22 could comprise the display 16.

FIG. 2 shows the housing 12 in the first open position. More specifically, the connection 26 allows the second section 24 of the housing to be flipped open about 180 degrees relative to the first section 22 of the housing as indicated by arrow 32. In the embodiment shown, the second section 24 is substantially aligned with the first section 22 and the connection 26. However, in alternative embodiments, the first open position could comprise the second section 24 being located at an angle of less than 180 degrees, such as about 160 degrees for example. This first open position allows the user to locate a speaker or sound transducer 28 at the user's ear and a microphone 30 proximate the user's mouth.

FIG. 3 shows the housing 12 in a second open position. More specifically, the connection 26 allows the second section 24 of the housing to be folded over about another 180 degrees relative to the first section 22 of the housing as indicated by arrow 34. In this fully open 360 degree flipped position, the first and second sections 22, 24 are collapsed against each other in the open folded position shown, but in a reverse orientation relative to the closed, folded position shown in FIG. 1. In this second open position, the keypad 14 is located at the exterior facing side of the first section 22 and the display 16 is located at the opposite exterior facing side of the second section 24. In the folded fully open position shown in FIG. 3 a user can use the mobile communications device 10 in a collapsed, folded configuration, for example such as when the mobile communications device comprises a feature which could comprise use of keys on the second section 24, or when the display 16 comprises a touch screen display.

Referring to FIG. 4a, an outlined perspective view of a first embodiment of the connection 26 of the mobile communications device 10 is shown. The connection 26 generally comprises a synchronized rotation, multi-axis hinge 27 and an electrical flex conductor 48. The hinge 27 generally comprises a hinge frame 36, synchronizing gears 40a-d, and locking means 41 for allowing the housing 12 to be locked in different fixed positions as mentioned above.

Figure 4B:
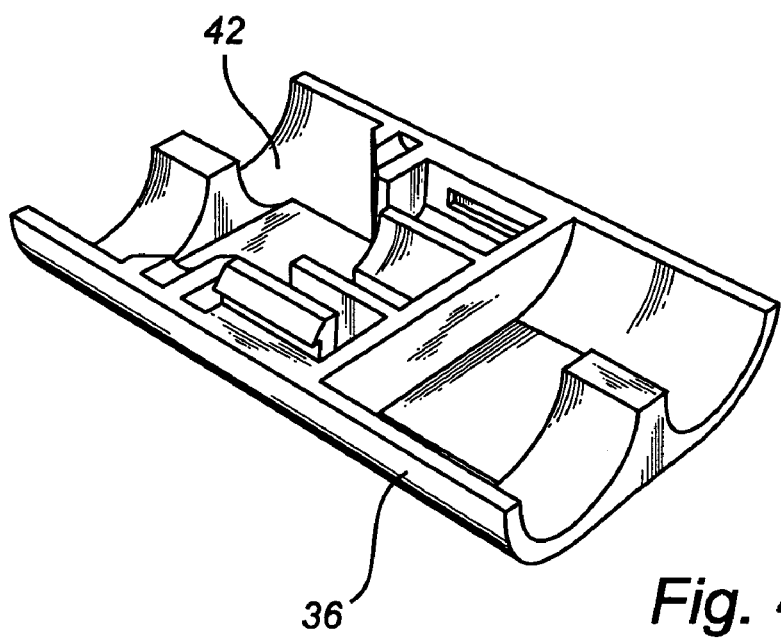
FIG. 4b is an exploded perspective view of a portion of the hinge.
Figure 4C:
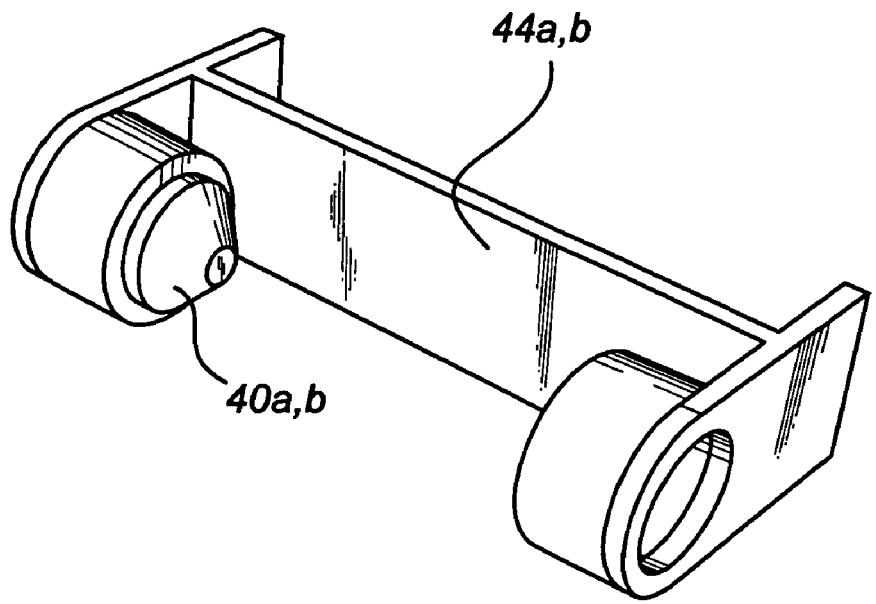
FIG. 4c is a perspective view of a frame member adapted to be connected to the hinge.

The hinge frame 36 has a generally oval side profile. The hinge frame 36 has a recess 42, shown in the exploded view in FIG. 4b, for receiving two hinge members in form of hinge pins 43a, 43b with synchronizing gears 40a, 40b attached thereto, and a third hinge pin 43c with two synchronizing gears 40c, 40d attached thereto. The gears 40a-d have a conical or truncated conical shape and are interlockingly connected to each other by their teeth and grooves (not shown for the sake of clarity) in a manner known per se. The two hinge pins 43a, 43b are attached to a first and second frame member 44a, 44b, shown in more detail in FIG. 4c. The frame members 44a, 44b are preferably arranged to cover the entrance to the recess 42, wherein the frame members 44a, 44b will prevent dust from entering the recess, which otherwise could imperil the function of the hinge 27 by interfering with the interlocking engagement of the teeth and grooves of the gears 40a-d. The first frame member 44a is fixedly attached to the first section 22 of the housing. The second frame member 44b is fixedly attached to the second section 24 of the housing.

With the gears 40a, 40b mounted on the hinge pins 43a, 43b, the gears 40a, 40b are fixedly attached to the frame members 44a, 44b for synchronized rotation of the frame members 44a, 44b relative to each other. It is appreciated in this context that the hinge pins 43a, 43b may be attached directly to the first and second sections 22, 24 of the housing, wherein the frame members 44a, 44b may be omitted.

The gears 40a-d hence form synchronization members to assist in synchronizing movement of the first and second sections 22, 24 relative to each other.

Because the hinge frame 36 comprises a general oval shaped side profile, the hinge frame 36 is able to span the gap between the connection areas with the frame members 42, 44 when the first and second sections 22, 24 are configured in their folded, thicker configuration shown in FIGS. 1 and 3. However, the hinge frame 36 is able to vertically align with the first and second sections 22, 24 when they are reconfigured into the smaller thickness intermediate flipped open position shown in FIG. 2. This provides the mobile communications device with a slimmer thickness profile at the hinge 27 when the device is arranged in an intermediate flipped open position. This helps to match the thickness of the repositioned hinge frame with the thicknesses of the housing sections 22, 24; or at least prevents the hinge from significantly stand out. This provides for a better appearance of the device when flipped open to the intermediate flipped open position. Alternatively, the hinge frame 36 can provide a relatively innocuous hinge transition between the first and second sections 22, 24 if the intermediate flipped open position is less than 180 degrees.

Figure 4D:
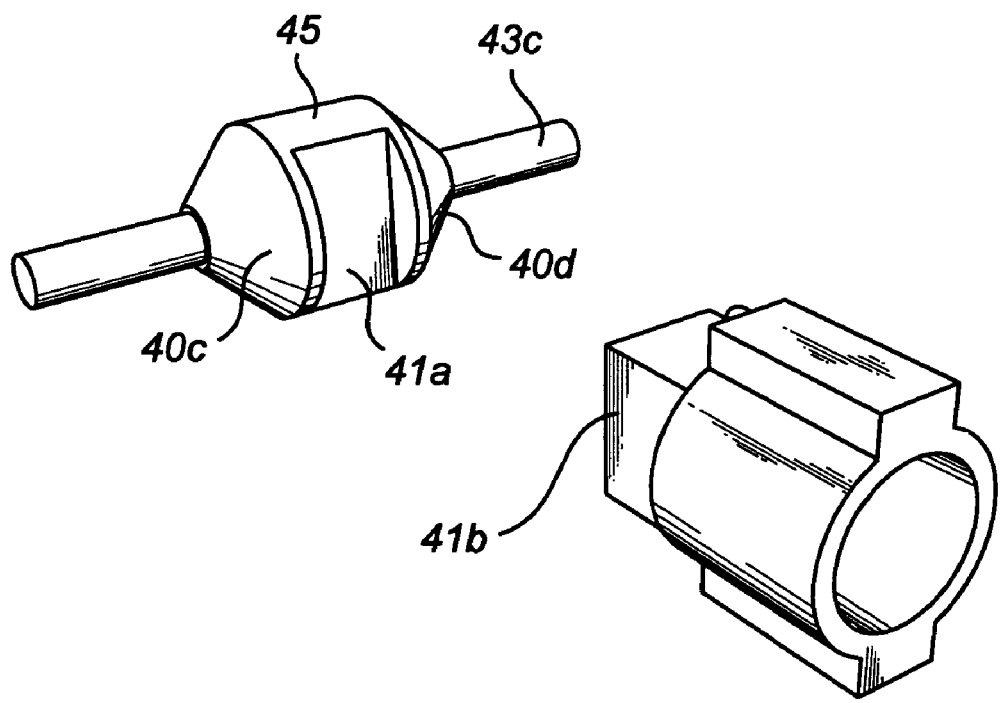
FIG. 4d is perspective view of a lock used in the hinge for locking the hinge at predetermined angles.

FIG. 4d is a perspective exploded view of the locking means 41 according to a preferred embodiment of the present invention. As can be seen from the figure the locking means 41 is preferably formed by one or more planar cut-outs 41a on an otherwise cylindrical thickened portion 45 of the hinge pin 43c, and a spring loaded control part 41b which is pressed against the thickened portion 45. The friction between the thickened portion 45 and the control part 41b provides a controlled torsional resistance in the hinge 27, wherein the folding and unfolding of the mobile communications device 10 will be perceived by a user as firm and not flimsy (which might be perceived from e.g. a flip phone which opens and closes too easily). In order to achieve the desired torsional resistance between the thickened portion 45 and the control part 41b, the material used for the contact surface of the control part 41b may be rubber, plastic, or any other suitable polymer material, or natural material such as cork. The thickened portion 45 may be integral with the hinge pin 43c or arranged on the surface thereof, and may be made of plastic or any other suitable material such as rubber or metal.

When the control part 41b, during rotation of the thickened portion 45, engages one of the planar cut-outs 41a, the spring-loaded control part 41b will protrude into the recess formed by the planar cut-out 41a in the otherwise cylindrical surface. The force needed to push the control part 41b out of the planar cut-out 41a when the thickened portion is rotated is greater than the force needed to overcome the friction between the control part 41b and the surface of the thickened portion 45. Hence a distinct locking of the first and second section 22, 23 at predetermined angles relative each other is achieved by providing one or more planar cut-outs at predetermined locations on the periphery of the thickened portion 45.

Figure 4E:
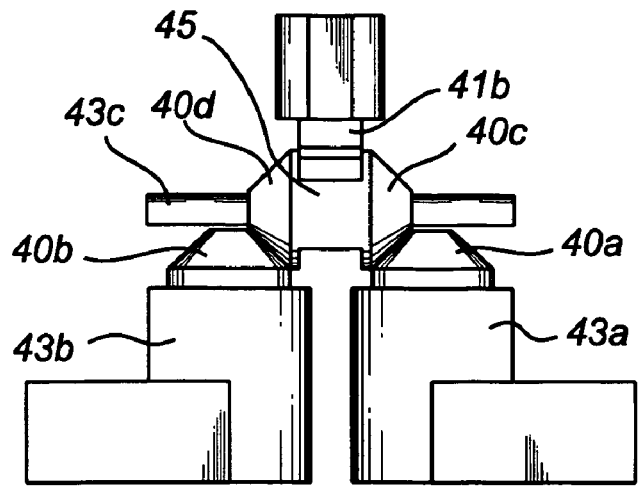
FIG. 4e is a view of a conical gear system used for transferring rotational movement from a fist axis to a second axis.
Figure 4F:
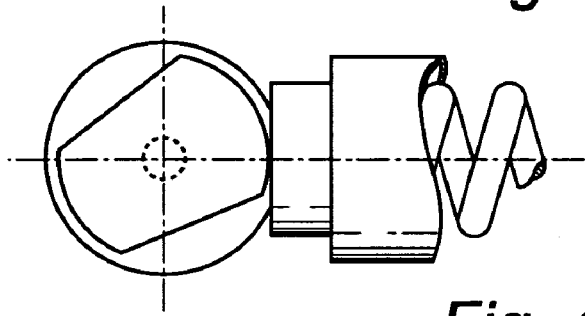
FIG. 4f is a side view of the lock in a friction controlled position.
Figure 4G:
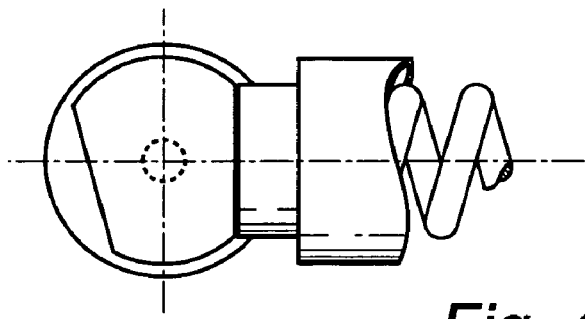
FIG. 4g is a side view of the lock in a locked predetermined position.
Figure 4H:
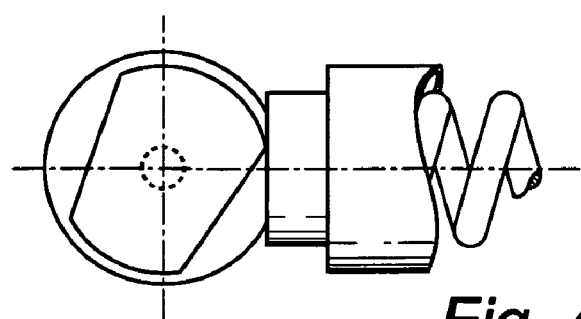
FIG. 4h is a side view of the lock in a flip-over position.

FIGS. 4f-4j is a more detailed illustration of the function of the locking means 41. In FIG. 4e the locking means 41 is in a friction controlled position, wherein the control part 41b engages the thickened portion 45 and provides a controlled frictional resistance of the hinge 27. FIG. 4g illustrates the lock in a locked position, wherein the control part 41b engages the planar cut-out in the thickened portion 45. FIG. 4h illustrates the lock in a position between the locked position and the friction controlled position.

Figure 4I:
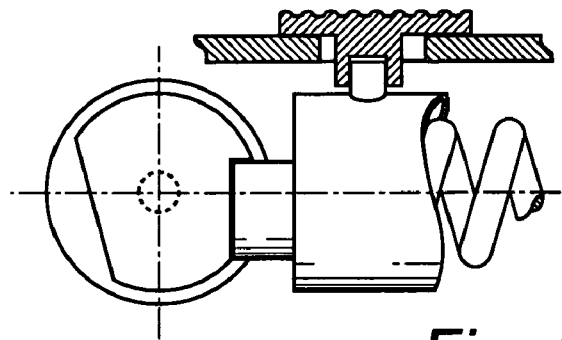
FIG. 4i is a side view of the lock in a locked predetermined position, wherein the lock comprises a release key for enabling further rotation beyond the locked position.
Figure 4J:
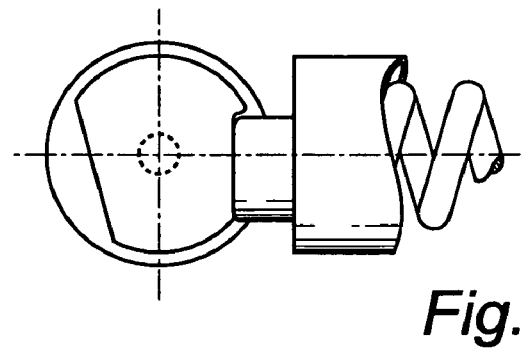
FIG. 4j is a side view of the lock in a locked position with a physical stop for providing increased torque when rotating past the locked position.

FIG. 4i illustrates yet an embodiment of the lock, wherein a release key is added to the construction in order to provide a firm stop at a predetermined angle, e.g. 165 degrees, and at the same time enabling a user of the mobile communications device 10 to continue the rotation of the two sections 22, 24 beyond the lock position. In order to do so the user of the mobile communications device 10 pushes the release key to the right in the figure for withdrawing the control part 41b from the planar cut-out 41a. A further rotation is then possible. FIG. 4j illustrates yet another embodiment for providing a firm stop at a predetermined angle. A shoulder formed at the junction between the planar cut-out 41a and the cylindrical portion of the thickened portion 45 provides an increased torque when a user tries to rotate the first 22 and second 24 sections beyond the locking position. No release key is hence needed in this embodiment.

FIG. 4e is a more detailed view of the hinge according to the present invention. The hinge pin 43a is connected to the frame member 44a or directly to the first section 22 of the mobile communications device 10. The conical gear 40a, arranged on the first hinge pin 43a, engages the conical gear 40c which is arranged on the third hinge pin 43c. If the first section 22 is rotated, the rotational movement will consequently be transferred from the first hinge pin 43a to the third hinge pin 43c by means of the mechanical coupling between the gears 40a and 40c. The conical gear 40d, which also is arranged on the third hinge pin 43c, will rotate together with the conical gear 40c. The conical gear 40d engages the conical gear 40b which is arranged on the second hinge pin 40b and hence transfers any rotational movement from the third hinge pin 43c to the second hinge pin 43b. The rotational movement initiated by the turning of the first hinge pin 43a is hence transferred to the second hinge pin 43b via the third hinge pin 43c.

The first section 22 of the mobile communications device 10 is by the arrangement disclosed above adapted to rotate relative to the hinge substantially in unison with rotation of the second section 24 relative to the hinge 27. In a preferred embodiment the gears 40a-d are of the same size, wherein the two sections 22, 24 are rotated by the same amount relative to the hinge 27. It is, however, equally possible to provide gears 40a-d of different sizes, wherein the first and second sections 22, 24 will rotate an unequal amount relative to the hinge 27.

Figure 5:
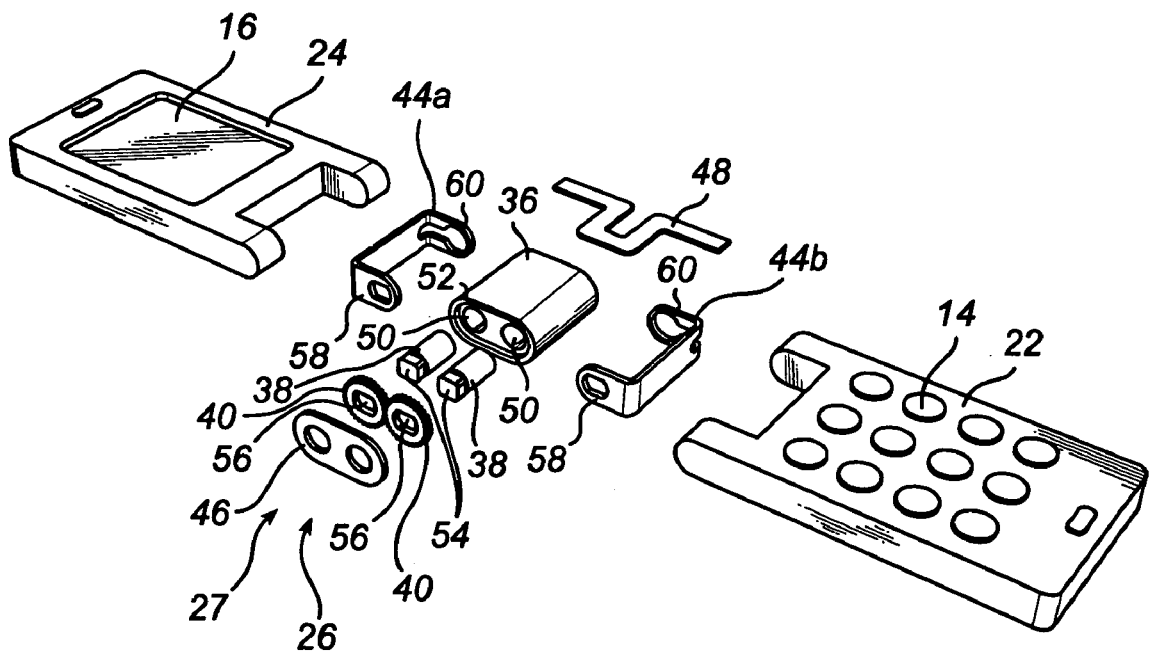
FIG. 5 is an exploded perspective view of an alternative embodiment of the mobile communications device shown in FIG. 1.

Referring to FIG. 5, an exploded perspective view of an alternative embodiment of the mobile communications device 10 is shown. The connection 26 generally comprises a synchronized rotation, multi-axis hinge 27 and an electrical flex conductor 48. The hinge 27 generally comprises a hinge frame 36, two hinge modules or pins 38, synchronizing gears 40, two frame members 44a, 44b, and a dust cover 46. The hinge frame 36 has a general oval side profile. The hinge frame 36 comprises two parallel pin receiving areas 50. The hinge frame 36 also comprises a recess 52 at the entrance to the pin receiving areas 50.

The hinge modules 38 are rotatably located in the receiving areas 50. Front portions 54 have a keyed shape to be received in key shaped apertures 56 of the gears 40. The gears 40 are interlockingly connected to each other by their teeth and grooves. With the gears 40 mounted on the front portions 54 of the hinge modules 38, the gears 40 are fixedly attached to the hinge modules 38 for synchronized rotation of the hinge modules 38 relative to each other. The gears 40 are located in the recess 52 of the hinge frame 36. The gears 40 form synchronization members to assist in synchronizing movement of the hinge frame 36 relative to movement of the first and second sections 22, 24 relative to each other. The hinge modules could be commercially available products. The hinge modules could comprise an internal detent system.

The front portions 54 of the hinge modules 38 are also connected to ends 58 the frame members 44a, 44b. Specifically, a first one of the hinge modules 38 is fixedly and stationarily connected to the front portion 54 of the first frame member 44a and, a second one of the hinge modules 38 is fixedly and stationarily connected to the front portion 54 of the second frame member 44b. The dust cover 46 is preferably located between the gears 40 and the frame members 42, 44. The dust cover 46 helps to prevent dust or debris from entering into the receiving areas 50 of the hinge frame 36 and interfered with the interlocking engagement of the teeth and grooves of the gears 40. In the embodiment shown, opposite ends 60 of the frame members 42, 44 are pivotably connected to pivot sections 66 (see FIGS. 11 and 12) extending from the hinge frame 36.

The first frame member 44a is fixedly and stationarily attached to the first section 22 of the housing. The second frame member 44b is fixedly and stationarily attached to the second section 24 of the housing.

FIG. 6 shows the hinge 27 at a first position corresponding to the closed position of the mobile communications device shown in FIG. 1. The dust cover 46 is not shown in FIGS. 6-8 for the sake of clarity. The discussion below will be made with reference to the embodiment of the present invention shown in FIG. 5, but it is appreciated that the same reasoning is applicable to the embodiment shown in FIG. 4a. As can be seen, the second frame member 44b is located adjacent the front side of the first frame member 44a.

When the second section 24 of the housing is moved from the closed position shown in FIG. 1 to the intermediate flipped open position shown in FIG. 2 the two frame members 44a, 44b are repositioned relative to each other as shown in FIG. 7. Because the hinge modules 38 are stationarily connected to respective ones of the frame members 44a, 44b and the gears 40 are stationarily connected to the hinge modules 38, the hinge frame 36 rotates about 90 degrees from the position shown in FIG. 6 to the positions shown in FIG. 7. The hinge modules 38 also rotating about 90 degrees relative to each other, but the two frame members 44a, 44b rotate about 180 degrees relative to each other.

Because the hinge frame 36 comprises a general oval shaped side profile, the hinge frame 36 is able to span the gap between the connection areas with the frame members 44a, 44b when the first and second sections 22, 24 are configured in their folded, thicker configuration shown in FIGS. 1 and 3. However, the hinge frame 36 is able to vertical align with the first and second sections 22, 24 when they are reconfigured into the smaller thickness intermediate flipped open position shown in FIG. 2. This provides the mobile communications device with a slimmer thickness profile at the hinge 27 when the device in at the intermediate flipped open position. This helps to match the thickness of the repositioned hinge frame with the thicknesses of the housing sections 22, 24; or at least not significantly stand out. This provides for a better appearance of the device when flipped open to the intermediate flipped open position. Alternatively, the hinge frame 36 can provide a relatively innocuous hinge transition between the first and second sections 22, 24 if the intermediate flipped open position is less than 180 degrees.

When the second section 24 of the housing is moved from the intermediate flipped open position shown in FIG. 2 to the 360 degree fully flipped open and folded position shown in FIG. 3, the two frame members 44a, 44b are reposition relative to each other as shown in FIG. 8. The second frame member 44b is located against the rear side of the first frame member 44a. Because the hinge modules 38 are stationarily connected to respective ones of the frame members 44a, 44b and the gears 40 are stationarily connected to the hinge modules 38, the hinge frame 36 rotates another 90 degrees from the position shown in FIG. 7 to the position shown in FIG. 8. The hinge modules 38 also rotating another 90 degrees relative to each other, but the two frame members 44a, 44b rotate about 180 degrees relative to each other. The two frame members 44a, 44b are rotated about 360 degrees from the position shown in FIG. 6 to the position shown in FIG. 8. Thus, the mobile communications device 10 can be reconfigured from the folded closed position shown in FIG. 1 to the 360 degree fully flipped open and folded position shown in FIG. 3.

Referring back to FIG. 4a or 5, as noted above the connection 26 comprises a flex conductor 48, such as a flexible printed circuit. The flex conductor 48 connects electronic circuitry in the first section 22 with electronic circuitry in the second section 24. The flex conductor 48 extends across the hinge connection. In one embodiment, the hinge frame 36 could comprise a receiving area for receiving a portion of the flex conductor 48. In an alternative embodiment, the flex conductor 48 could be mounted on an exterior side of the hinge frame 36.

The present invention provides for a totally new concept for a different type of a flip phone. A mobile telephone incorporating features of the present invention can comprise a 360 degree turn of one housing section relative to another housing section. The present invention can provide a 360 degree hinge and, more specifically, a new synchronizing mechanism which can be integrated into the hinge of the foldable device. One housing section of the device can be turned 360 degrees around another housing section of the device smoothly and synchronized with movement of the hinge frame.

The hinge synchronization mechanism can consist of a hinge frame, two or four synchronizing gears, two hinge modules or pins, and a dust shield. When turning the hinge from a closed start position, the synchronizing gears are connected to each other and both hinge axes are rotating similar angles. Both axes are rotated equally about 180 degrees. The present invention provides a controlled and synchronized 360 degree hinged movement. With the present invention, the usability of the product is approved. The present invention provides a robust and compact construction, and dust and particles are prevented entry to the mechanism.

Figure 9:
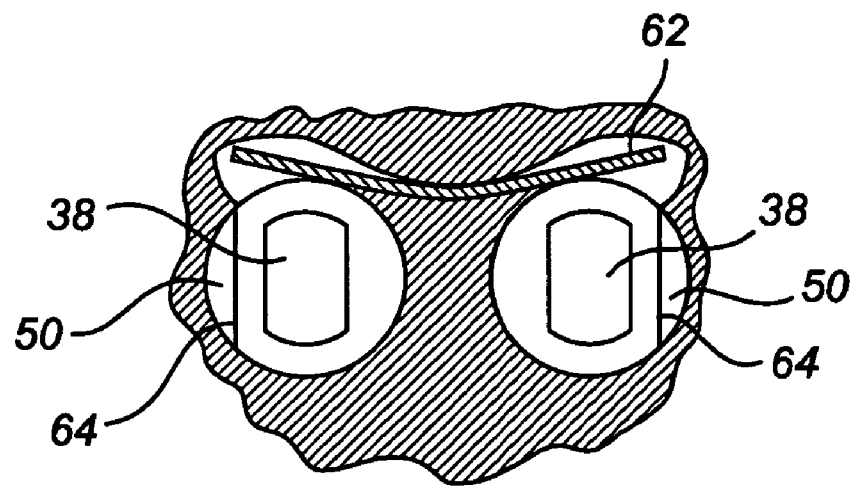
FIG. 9 is a partial cross sectional view of a lock system of an alternative embodiment of the hinge with the lock system shown in a position corresponding to the positions shown in FIGS. 1 and 6.
Figure 10:
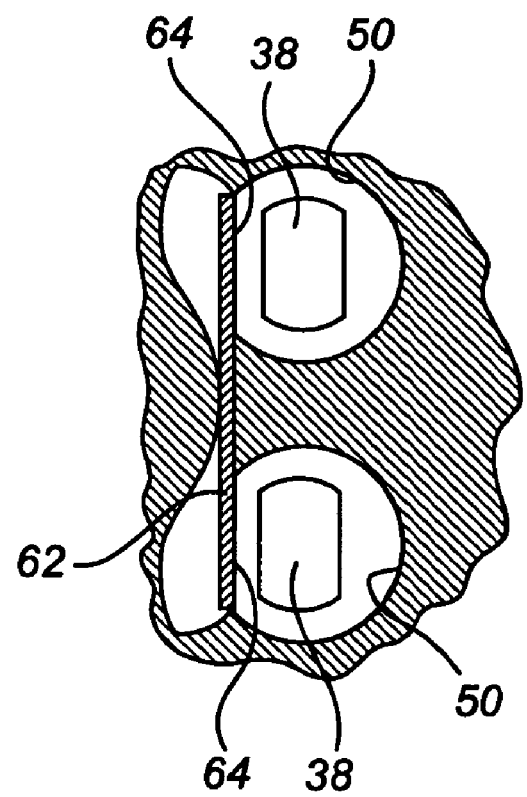
FIG. 10 is a partial cross sectional view of the lock system as in FIG. 9 shown in a position corresponding to the positions shown in FIGS. 2 and 7.

In order to maintain relative position of the first and second sections 22, 24 relative to each other, the hinge 27 could comprise sufficient frictional resistance to movement as is known in the art, such as a friction pack. Referring also to FIGS. 9 and 10, an alternative embodiment of a system for detent locating of the first and second sections relative to each other is shown. In this embodiment, the hinge comprises a leaf spring 62. The hinge modules 38 include exterior flat surfaces 64. FIG. 9 shows the interaction between the spring 62 and the exterior surfaces of the hinge on modules 38. In this position, the detent spring 62 is deflected by contact with the exterior surfaces of the hinge modules 38.

The position shown in FIG. 9 corresponds to the configuration of the mobile communications device as shown in FIG. 1. The flat surfaces 64 are spaced from the spring 62. When the mobile communications device is reconfigured to the position shown in FIG. 2, as shown in FIG. 10 the flat surfaces 64 comes into registration with the detent spring 62. The detent spring 62 returns to an undeflected position to form a biasing detent to hold the first and second sections 22, 24 at the intermediate flipped open position shown in FIG. 2. In alternative embodiment, any suitable type of detent configuration positioning system could be provided. For example, in one type of alternative embodiment, the hinge modules 38 could comprise an internal detent system, such as when the hinge modules each comprise more than a single member.

Figure 11:
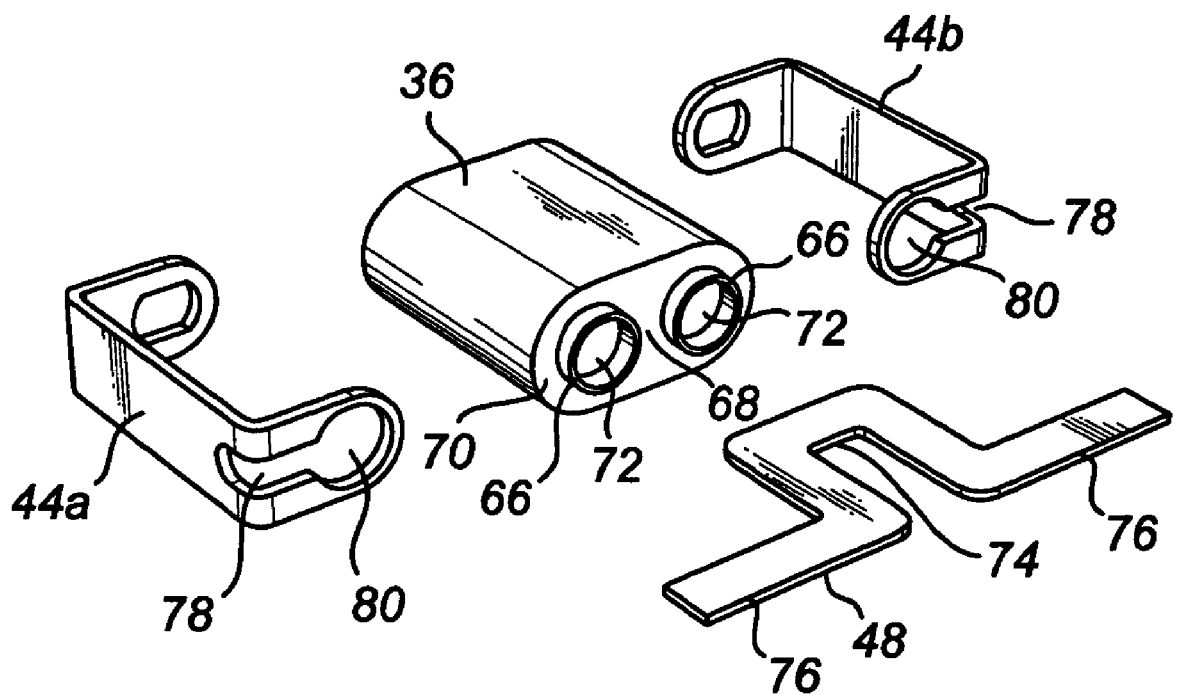
FIG. 11 is an exploded view of the hinge as shown in FIG. 6 from an opposite side.
Figure 12:
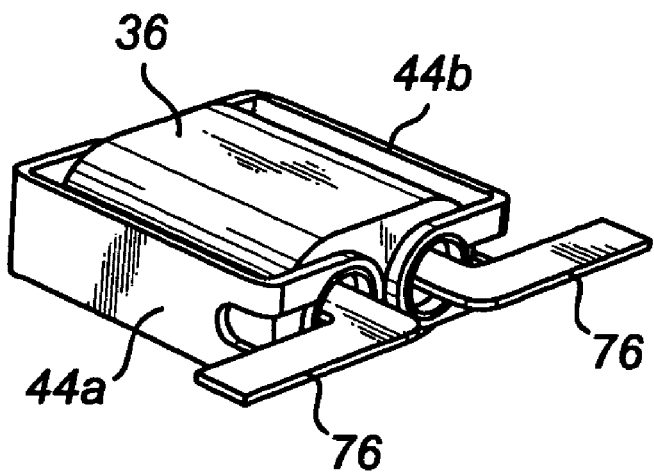
FIG. 12 is an assembled view of the hinge as shown in FIG. 11.

Referring now to FIGS. 11 and 12, a view of the hinge 27 of FIGS. 4-8 is shown from the opposite side. In this embodiment the flex conductor 48 is mounted to the interior side of the hinge frame. The hinge frame 36 has the two pivot sections 66 extending from the opposite side 70. Each pivot section 66 has a centre channel 72. The hinge frame 36 includes a slot 68 into the side 70. The slot extends through the pivot sections 66 and connects the two centre channels 72 to each other. The flex conductor 48 has a centre portion 74 and two end portions 76. The centre portion is inserted into the slot 68 and extends out of the two centre channels 72. The end portions 76 extend in opposite directions once exiting the centre channels 72. The two end portions 76 of the flex conductor are attached to circuitry in the first and second sections 22, 24. The flex conductor 48 is bendable as the first and second sections 22, 24 move relative to each other. The relatively long length of the flex conductor 48 helps to prevent metal fatigue of the conductors and failure of the flexible insulating substrate in the flex conductor 48.

The flex conductor 48 is inserted into the slot 68 before the frame members 42, 44 are attached to the pivot sections 66. In the embodiment shown, the frame members 44a, 44b have slots 78 from the mounting apertures 80 which help to mount the frame members 44a, 44b over the flex conductor 48 as shown in FIG. 11. Once assembled, the frame members 44a, 44b block exit of the centre portion 74 from the centre of the slot 68 to thereby keep the assembly together. However, in alternative embodiments, any suitable type of assembly retainment system could be provided.

Frame members 44a, 44b are very useful when assembling and for robust construction. However, in an alternative embodiment the frame members 44a, 44b might not be provided. As mentioned above, it is possible to mount the hinge frame and synchronizing mechanism directly to the housing sections 22, 24. The present invention can be adapted to provide further electronic circuitry; such as a camera, a Mp3-player, a radio or the like, in the hinge frame 36. A power plug and/or other external connector can alternatively or additionally be integrated into the hinge frame 36. In alternative embodiments, electrical connection through the hinge between the folds to the housing sections 22, 24 can be provided by any suitable electrical connection, such as done by a metal slide connection or by pin connectors. Both solutions can be based on the metal connection pads being on the two folds and a spring connector which touches the connection pads.

The electric device according to the invention may comprise a first section having a keypad, a second section having a display, and a connection movably connecting the second section with the first section, wherein the connection comprises a first axis of rotation with the first section, an offset second axis of rotation with the second section, and synchronizing members which rotate the first section relative to the connection in unison with rotation of the second section relative to the connection. The mobile communications device may have a transceiver located in one of the first or second sections. The first and second sections may comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the mobile communications device.

The connection may comprises a hinge frame having a general oval side profile and two parallel pin receiving holes and the hinge frame may comprise a recess for receiving the synchronizing members. The synchronizing members comprises two gears connected to each other. The connection may comprise two hinge pins rotatably mounted in the pin receiving holes, each hinge pin having one of the gears connected thereto, and each hinge pin being stationarily connected to a respective one of the first and second sections.

The mobile communications device may further comprise a flex circuit extending across the connection and electrically connecting electronic circuitry in the first section to electronic circuitry in the second section.

The connection may comprise a detent locating system for locking position of the second section relative to the first section at an intermediate position between a fully closed position and a 360 degree fully open position.

According to an embodiment of the invention a mobile communications device may comprise a housing, a transceiver in the housing, a keypad connected to the housing, and a display connected to the housing, wherein the housing may comprise a first section movably connected to a second section of the housing by a multi-axis hinge, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees.

The first and second sections of the mobile communications device may comprise a first position with the keypad and display being closed by the first and second sections, a second position with the second section rotated about 180 degrees relative to the first section such that the first section is substantially inline with the second section and a hinge frame of the hinge, and a third position with the second section rotated about 360 degrees relative to the first section and having the keypad and display located on opposite exterior facing sides of the mobile communications device.

The hinge of the mobile communications device may comprise a hinge frame having a general oval side profile and two parallel pin receiving holes. The means for synchronizing rotation of the first and second sections relative to the hinge in the mobile communications device may comprise gears connected to each other. The hinge of the mobile communications device may comprise two hinge pins rotatably mounted in the pin receiving holes, each hinge pin having one of the gears connected thereto, and each hinge pin being stationarily connected to a respective one of the first and second sections.

The mobile communications device may further comprise a flex circuit extending across the hinge and electrically connecting electronic circuitry in the first section to electronic circuitry in the second section.

The connection in the mobile communications device may comprise a detent locating system for locking position of the second section relative to the first section at an intermediate position between a fully closed position and a 360 degree fully open position.

The mobile communications device may comprise a housing having a first section, a second section, and a synchronized rotation multi-axis hinge connection connecting the first section with the second section; a transceiver located in the housing; a key pad connected to the housing; a display connected to the housing; and a flex conductor extending across the hinge connection and coupling electronic circuitry in the first section of the housing with electronic circuitry in the second section of the housing, wherein the synchronized rotation multi-axis hinge connection may comprise a hinge frame; two hinge pins rotatably mounted in the hinge frame; synchronizing gears connecting the hinge pins to each other; a first frame member fixedly connecting a first one of the hinge pins to the first section of the housing; a second frame member fixedly connecting a second one of the hinge pins to the second section of the housing, and wherein the second section of the housing may be adapted to rotate about 360 degrees relative to the first section of the housing.

The connection of the mobile communications device may comprise a detent locating system for locking position of the second section relative to the first section at an intermediate position at about 180 degrees of rotation between a fully closed position and a 360 degree fully open position.

The first and second sections of the mobile communications device may comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the mobile communications device. The hinge frame of the mobile communications device may have a general oval side profile and two parallel pin receiving holes.

Figure 13:
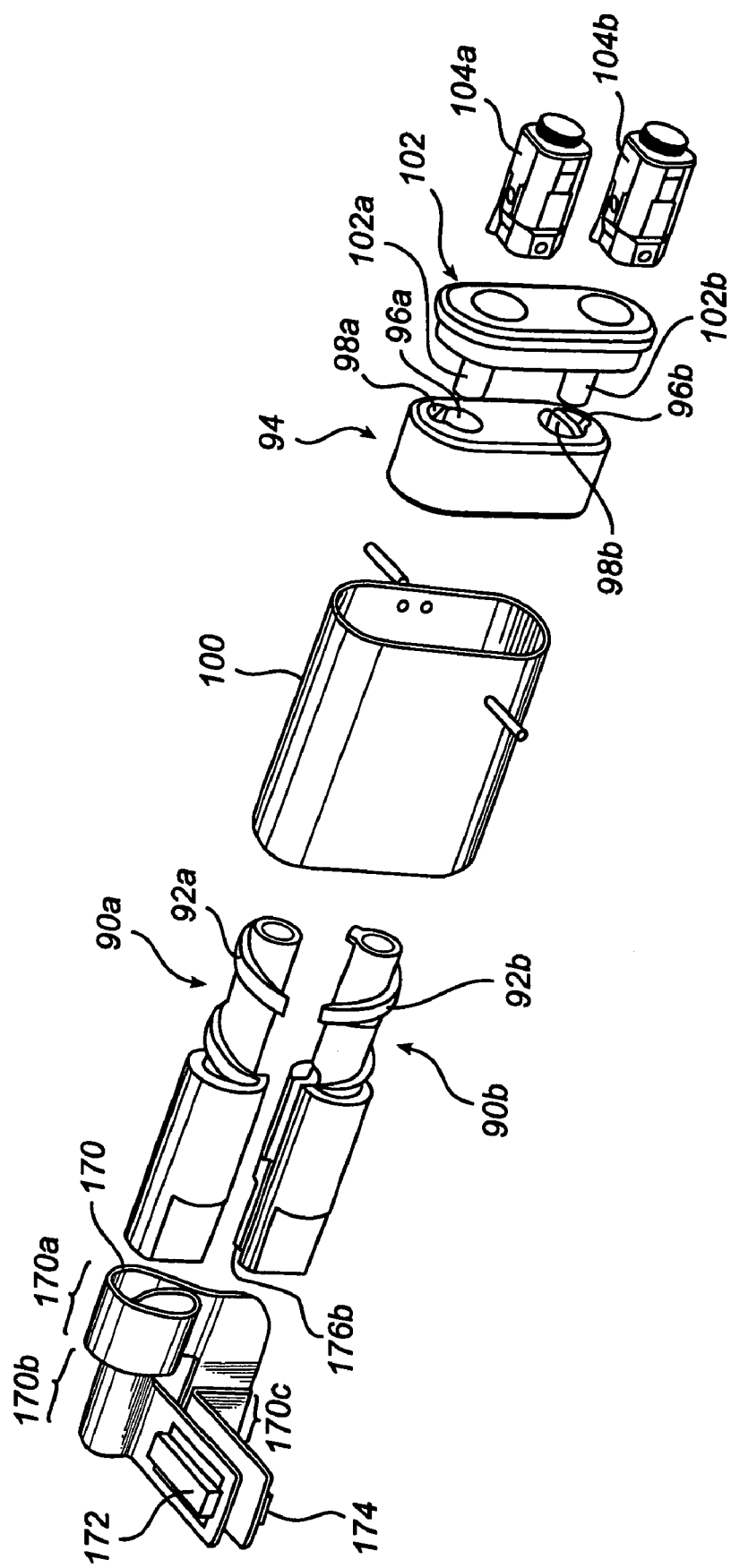
FIG. 13 is an exploded view of an alternative embodiment of the hinge incorporating screws in engagement with a moving block.

As shown in FIG. 13, the hinge according to this aspect basically comprises two screw gears 90a, 90b and a block 94 in engagement with the two screw gears 90a, 90b. Each of the two screw gears 90a, 90b is provided with a protrusion 92a, 92b extending along a screw line about the envelope surface. One of the screw gears 90a is provided with a protrusion 92a extending along a left handed screw line and the other 90b is provided with a protrusion 92b extending along a right handed screw line. One of the screw gears 90a extends along the axis of rotation one of the elements connected to the hinge and the other screw gear 90b extends along the axis of rotation of the other of the elements connected to the hinge. The two screw gears 90a, 90b are non-rotatably fastened to respective one of the two elements. Thus, the first screw gear 90a is adapted to rotate with the first element and the second screw gear 90b is adapted to rotate with the second element.

The block 94 forms a synchronizing member. The block 92 is provided with through-going openings 96a, 96b. Each of the openings 96a, 96b is provided with an internal thread 98a, 98b. The screw gears 90a, 90b extend through the openings 96a, 96b such that the protrusions 92a, 92b of the screw gears 90a, 90b engage the internal threads 98a, 98b of the block 94.

When the user of the device being provided with the hinge moves the two elements towards or away from each other the two screw gears are forced to experience a relative rotation to each other in opposite directions. Since the block 94 engages both of the two screw gears this relative rotation will force the block 94 to move along the screw gears 90a, 90b. Since the movement of the block 94 along a screw gear 90a, 90b is determined by the rotation of the screw gear 90a, 90b relative to the block 94, the screw gears 90a, 90b will, since they have the same pitch, experience the same amount of rotation, but in opposite directions, relative to the block 94 when they are moved towards or away from each other. The result is that the relative rotation between the two elements connected to the hinge is divided into two equal rotations; one half being the rotation of the first element relative to the hinge and the second half being the rotation of the second element relative to the hinge.

The hinge further comprises a casing 100 in which the block 94 is adapted to slide along the screw gears 90a, 90b as they are rotated. The hinge further comprises a guide member 102 and hinge locks 104a, 104b. The guide member 102 is provided with two shafts 102a, 102b extending concentrically with the screw gears 90a, 90b and being adapted to extend a portion into holes along the axes of rotation of the screw gears 90a, 90b. The hinge locks 104a, 104b are adapted to engage the screw gears 90a, 90b and provide a number of distinct rotational positions in which the hinge may be locked. Preferred positions may e.g. be 0°, about 135°, 180°, about 225° and 360°.

Figure 14:
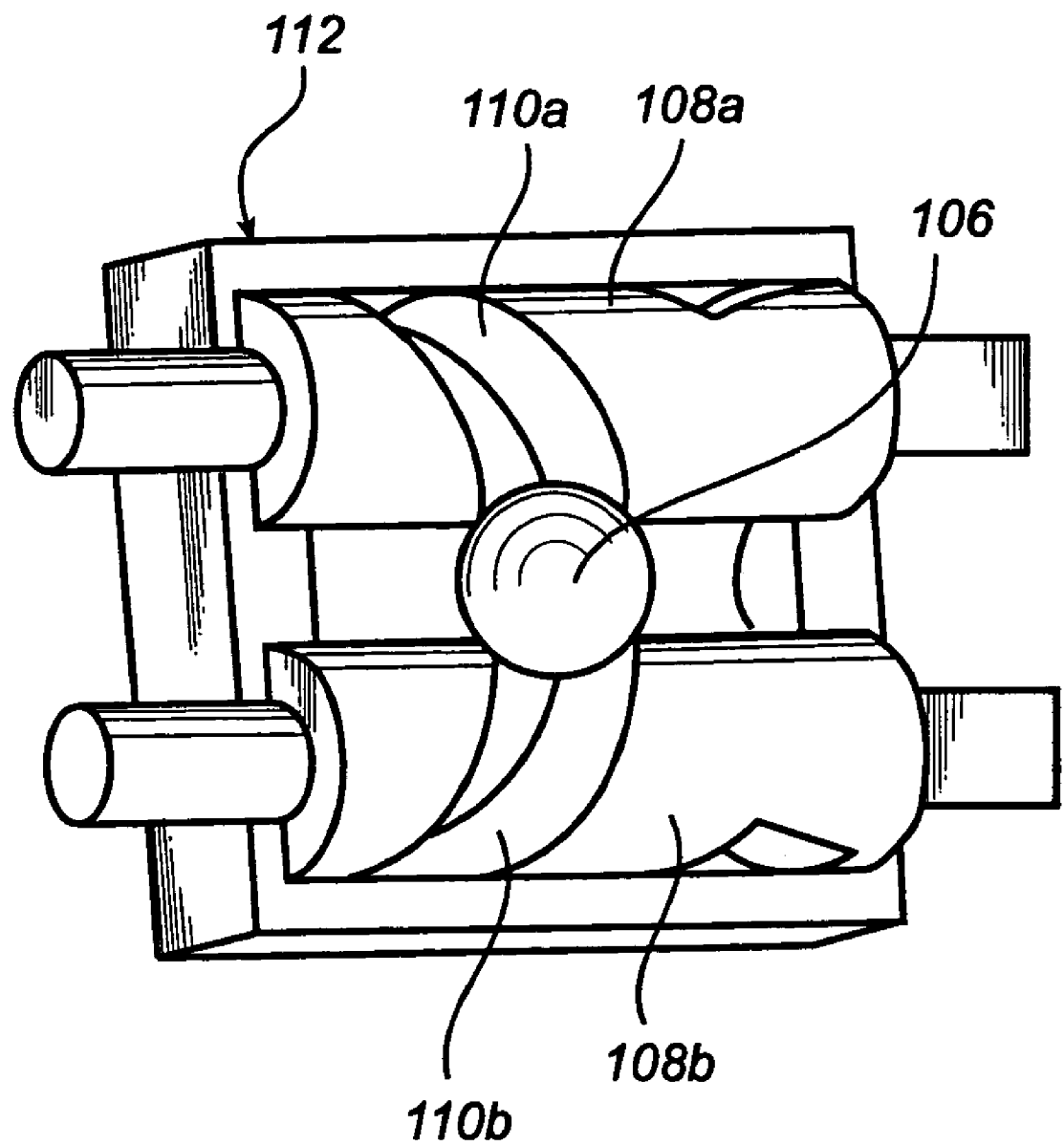
FIG. 14 is a view of an alternative embodiment of the hinge incorporating screws in engagement with a moving ball.

In accordance with another embodiment the moving member is, as shown in FIG. 14, shaped as a sphere 106. The screw gears 108a, 108b are each provided with a groove 110a, 110b extending along a screw line about the envelope surface of respective screw gear 108a, 108b. The sphere shaped member 106 is caught between the screw gears 108a, 108b and rests partly in a groove 110a of the first screw gear 108a and partly in a groove 110b of the second screw gear 108b. When the screw gears 108a, 108b are rotated in relation to each other, the sphere will move along longitudinal direction of the screw gears 108a, 108b. The grooves. 110a, 110b will engage the sphere 106 and will, since they have the same pitch force the two screw gears 108a, 108b to rotate the same amount in relation to the sphere 106 and thus also the same amount in relation to the hinge body 112.

Figure 15:
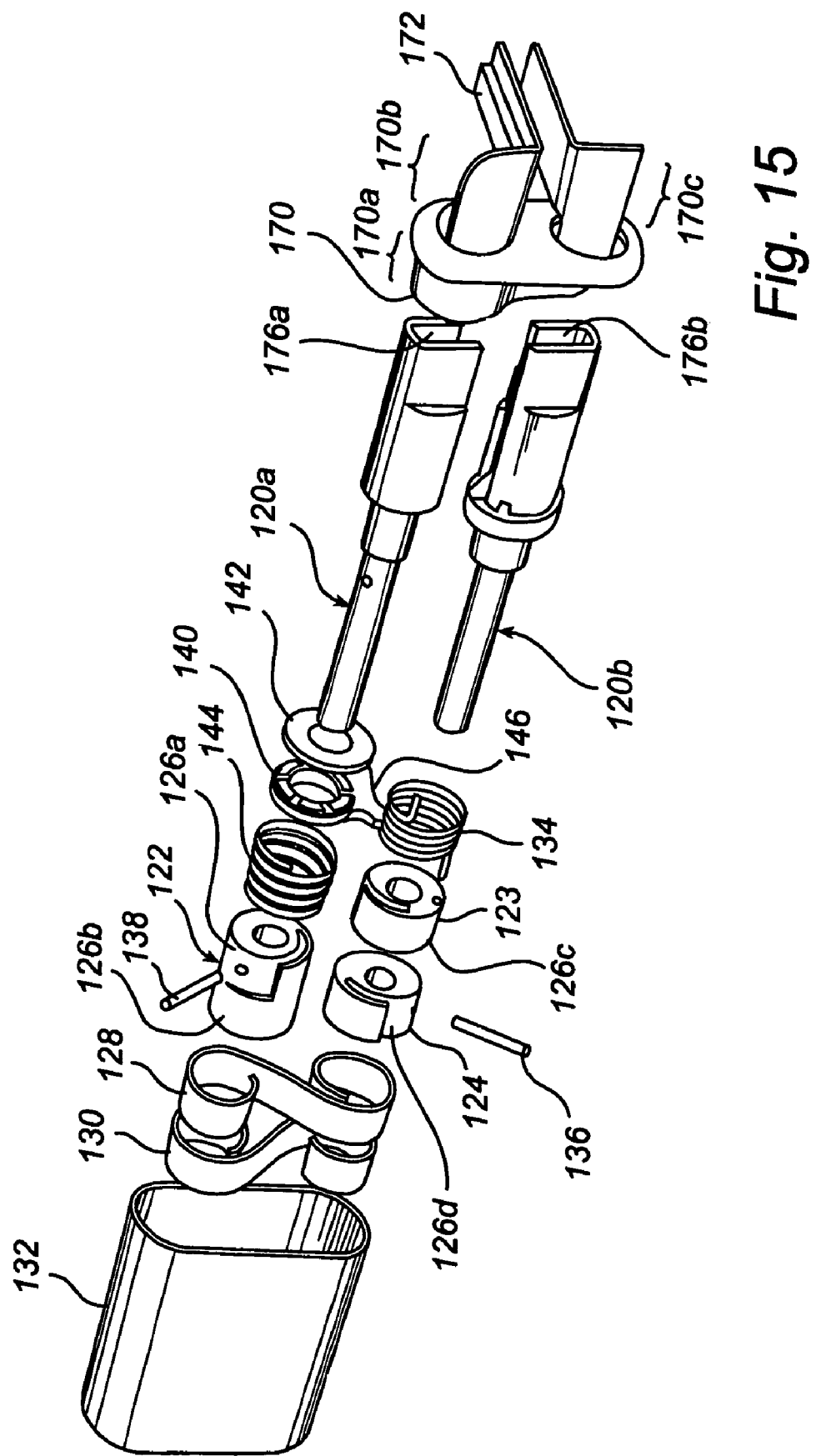
FIG. 15 is an exploded view of an alternative embodiment of the hinge incorporating two belts wound in opposite directions about the axes of rotation of the hinge.

As shown in FIG. 15, the hinge according to this aspect basically comprises two pins or shafts 120a, 120b, which each are adapted to be non-rotatably connected to a section of a mobile communications device. The first shaft 120a supports a first sleeve 122. The second shaft 120b supports a second and a third sleeve 123, 124. The first sleeve 122 is provided with a first and a second reel-up surface 126a, 126b. The second sleeve 123 is provided with a third reel-up surface 126c. The third sleeve 124 is provided with a fourth reel-up surface 126d.

A first belt 128 is wound up onto the first and third reel-up surfaces 126a, 126c. The belt 128 is wound up onto the first reel-up surface 126a in a first direction such that counter-clockwise rotation of the first sleeve 122 will wound up the belt 128 onto the first reel-up surface 126a. The belt 128 is further wound up onto the third reel-up surface 126c in the first direction such that counter-clockwise rotation of the second sleeve 123 will wound up the belt 128 onto the third reel-up surface 126c. Rotation of the first or the second sleeve 122, 123 in the clockwise direction will result in the first belt 128 being wound off that sleeve.

A second belt 130 is would up onto the second and fourth reel-up surfaces 126b, 126d. The belt 130 is wound up onto the second reel-up surface 126b in a second direction such that clockwise rotation of the first sleeve 122 will wound up the belt 130 onto the second reel-up surface 126b. The belt 130 is further wound up onto the fourth reel-up surface 126d in the second direction such that clockwise rotation of the third sleeve 124 will wound up the belt 130 onto the fourth reel-up surface 126d. Rotation of the first or the third sleeve 122, 124 in the counter-clockwise direction will result in the second belt 130 being wound off that sleeve.

The sleeves 122, 123, 124 are connected to respective shaft 120a, 120b such that the sleeves 122, 123, 124 will rotate with the shafts 120a, 120b.

Consequently, when an user pull the sections of the mobile communications device apart or push them towards each other, the shafts 120a, 120b will rotate with the sections. The belts 128, 130 will force the shafts 120a, 120b to experience the same amount of rotation.

When the first shaft 120a is rotated in relation to the hinge body 132 in the counter-clockwise direction, the first sleeve 122 will be rotated with the first shaft 120a in the counter-clockwise direction and the first belt 128 will be further wound onto the first reel-up surface 126a. The second belt 130 will at the same time be wound off the second reel-up surface 126b. The first belt 128 will be pulled by the wounding up onto the first reel-up surface 126a. The amount of the first belt 128 being wound up onto the first reel-up surface 126a need to be compensated for. The first belt 128 will consequently force the second sleeve 123 to rotate in the clockwise direction such that a portion of the belt 128 wound up onto the third reel-up surface 126c is wound off to compensate for the amount or portion of the belt 128 being wound up onto the first reel-up surface 126a. The second shaft 120b will rotate with the second sleeve 123. Consequently, any rotation of the first shaft 120a in the counter-clockwise direction will be translated to a clockwise rotation of the second shaft 120b of the same magnitude or angular amplitude. Moreover, any rotation of the second shaft 120b in the counter-clockwise direction will be translated to a clockwise rotation of the first shaft 120a of the same magnitude or angular amplitude.

The second belt 130 is in a similar manner wound onto the second and fourth reel-up surfaces 126b, 126d on the first and third sleeve 122, 123, respectively. The second belt 130 is wound onto the second reel-up surface 126b such that it will be wound further onto the second reel-up surface 126b when the first sleeve 122 is rotated in the clockwise direction and be wound off the second reel-up surface 126b when the first sleeve 122 is rotated in the counter-clockwise direction. Correspondingly, the second belt 130 is wound onto the third sleeve 124 such that it will be wound further onto the fourth reel-up surface 126d when the third sleeve 124 is rotated in the clockwise direction and be wound off the fourth reel-up surface 126d when the third sleeve 124 is rotated in the counter-clockwise direction. The second shaft 120b will rotate with the third sleeve 124. Consequently, any rotation of the first shaft 120a in the clockwise direction will be translated to a counter-clockwise rotation of the second shaft 120b of the same magnitude or angular amplitude. Moreover, any rotation of the second shaft 120b in the clockwise direction will be translated to a counter-clockwise rotation of the first shaft 120a of the same magnitude or angular amplitude.

The first belt 128 is wound about the first and second reel-up surfaces 126a, 126b such that in any circumstances there is always at least 180° of total angle of contact or winding angle for the first belt 128 about the first reel-up surface 126a and about the third reel-up surface 126c, at least 180° of total angle of contact of winding angle for the second belt 130 about the second reel-up surface 126b and about the fourth reel-up surface 126d. If the belts are wound about the reel-up surfaces such that the first belt 128 is wound 180° about the first reel-up surface 126a when the second belt is wound 180° about the fourth reel-up surface 126d, each belt need only have a total contact angle of 180°. It is preferred to wound the belts 128, 130 such that they always are wound to some extent about every single one of the reel-up surfaces 126a-d. This design will allow for errors in mounting of the sleeves 122, 123, 124 and will facilitate fastening of the belts 128, 130 to the sleeves 122, 123, 124. Consequently, the belts 128, 130 will at least display a total angle of contact being 180° plus the additional angles of contact suitable for easy fastening to the sleeves at both ends of respective belt. When the sections of the mobile communications device, such as mobile communications device, is rotated 360° in relation to each other, in a direction with a rotation of the first shaft 120a in the clockwise direction, the first belt 128 will have decreased its angle of contact about the first reel-up surface 126a with 180° and the it will have increased its angle of contact about the third reel-up surface 126c with 180°. At the same time the second belt 130 will have increased its angle of contact about the second reel-up surface with 180° and the it will have decreased its angle of contact about the fourth reel-up surface 126d with 180°.

The second sleeve 123 is rotationally tensioned by a torsion spring 134 in relation to the second shaft 120b in the counter-clockwise direction, i.e. the direction in which the first belt 128 is wound further onto the third reel-up surface 126b of the second sleeve 123. The third sleeve is fixed relative to the second shaft 120b using a pin 136, a spline joint, a wedge joint or the like. The sleeve 122 is fixed relative to the first shaft 120a using a pin 138, a spline joint, a wedge joint or the like. The position of the first shaft 120a may be locked in a number of predetermined positions. The design of the locking mechanism will be disclosed in more detail below. The second sleeve 123 will due to the tensioning from the spring 134 be urged to rotate in the counter-clockwise direction and the and the second shaft 120b will be urged to rotate in the clockwise direction. The rotation of the second sleeve 123 will be stopped when there is no slack in the first belt 128. The rotation of the second shaft 120b will be stopped when there is no slack in the second belt 130. Thus, the second shaft 120b will experience a rotation in relation to the first shaft 120a corresponding to the slack of the second belt 130. The second sleeve 123 will experience a rotation in relation to the second shaft 120b corresponding to the total slack in the belts (the slack in the first belt 128 will be compared with the nominal position of the second shaft 120b plus the slack of the second belt 130 giving the actual position of the second shaft 120b).

In order to lock the first and second shaft 120a, 120b in relation to each other in certain predetermined angular positions, the hinge is provided with a locking mechanism. The locking mechanism comprises two rings 140, 142 which are mounted onto one of the shafts 120a. The rings 140, 142 are provided with protrusions and indentations extending in the axial direction, such that protrusions of the first ring 140 is adapted to engage with indentations of the second ring 142, and vice versa. The protrusions and/or indentations are wedge-shaped by slanting the walls extending in the axial direction such that the circumferential extension of an indentation is larger at the opening than at the bottom and/or such that the protrusions have larger circumferential extension at the base than at the top. The locking mechanism further comprises a compression spring 144 adapted to push the two rings 140, 142 towards each other in axial direction and a ring retaining arm 146 adapted to rotationally fix one of the rings 140 in relation to the hinge body. The other ring 142 is rotationally fixed to the first shaft 120a. The retaining arm 146 is provided with an through-going opening through which the second shaft 120b extends. Since the shafts 120a, 120b does not translate in relation to each other, the retaining arm 146 will thus prevent the first ring 140 from rotating in relation to the hinge body. When the user rotates the two shafts 120a, 120b in relation to each other the protrusions and indentations of the two rings 140, 142 will due to its angle of wedge force the first ring 140 to move axially counteracting the force of the compression spring until the rings are pushed apart such that the protrusions and indentations no longer engage each other. It will require a certain force to counteract the compression spring. The protrusions of the first ring 140 will thereafter abut the protrusions of the second ring 142 and the shafts 120a, 120b may be rotated without any significant resistance. When the shafts 120a, 120b are rotated such that the are close to a desired locking position protrusions of the first ring 140 will begin to engage the indentations of the second ring 142 and vice versa and will due to the angle of wedge of protrusions and the indentations and the compression spring slide towards the second ring 142 and at the same time force the two shafts 120a, 120b to be placed in a rotational position where the indentations and protrusions fully engage each other.

With this design the user will experience that the mobile communications device have certain predetermined positions in which the device is stable. The device will furthermore have a tendency to enter a stable position if it is positioned in close proximity of this position.

Figure 16:
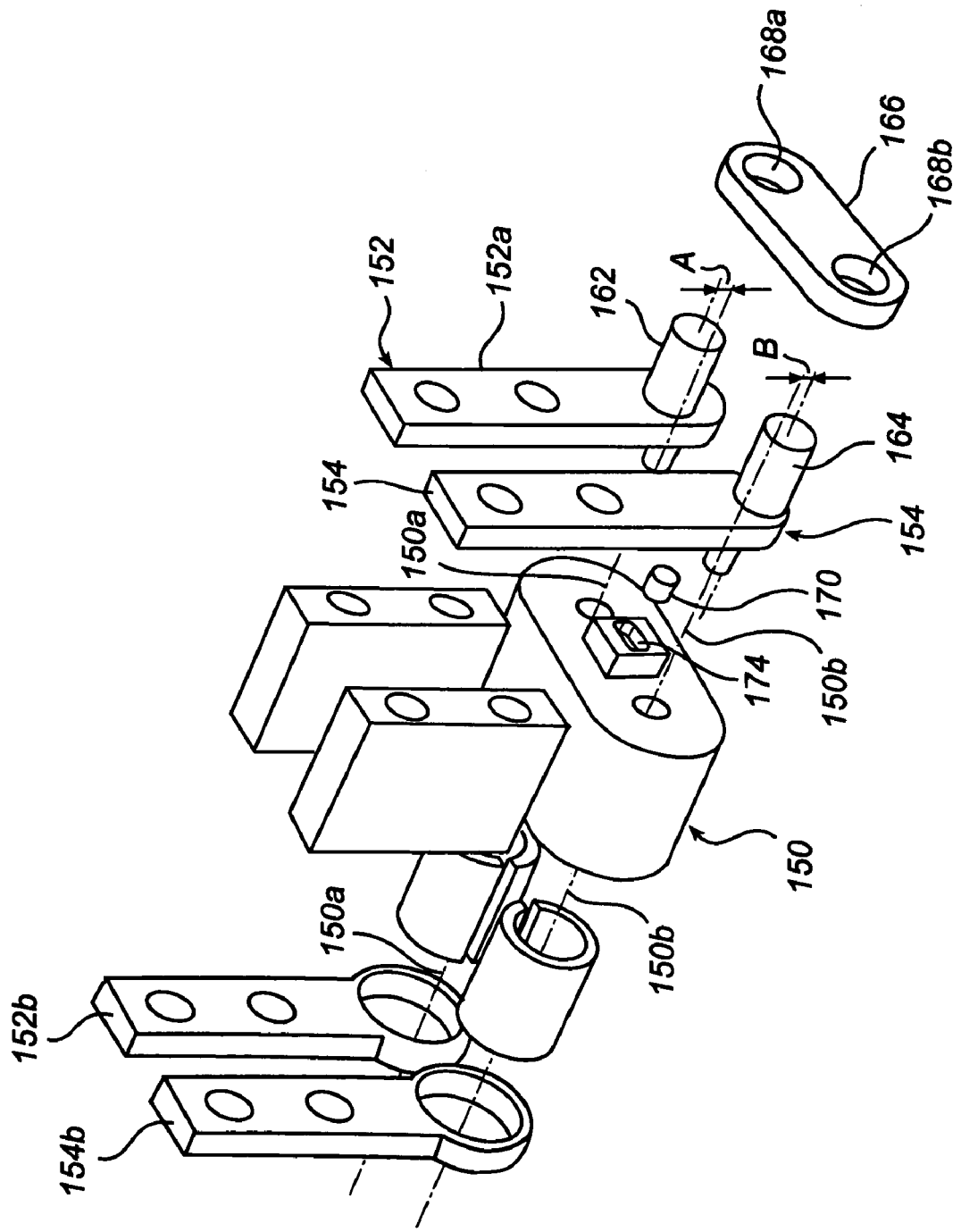
FIG. 16 is an exploded view of an alternative embodiment of the hinge incorporating two offset synchronizing axes and a connecting link.
Figure 17:
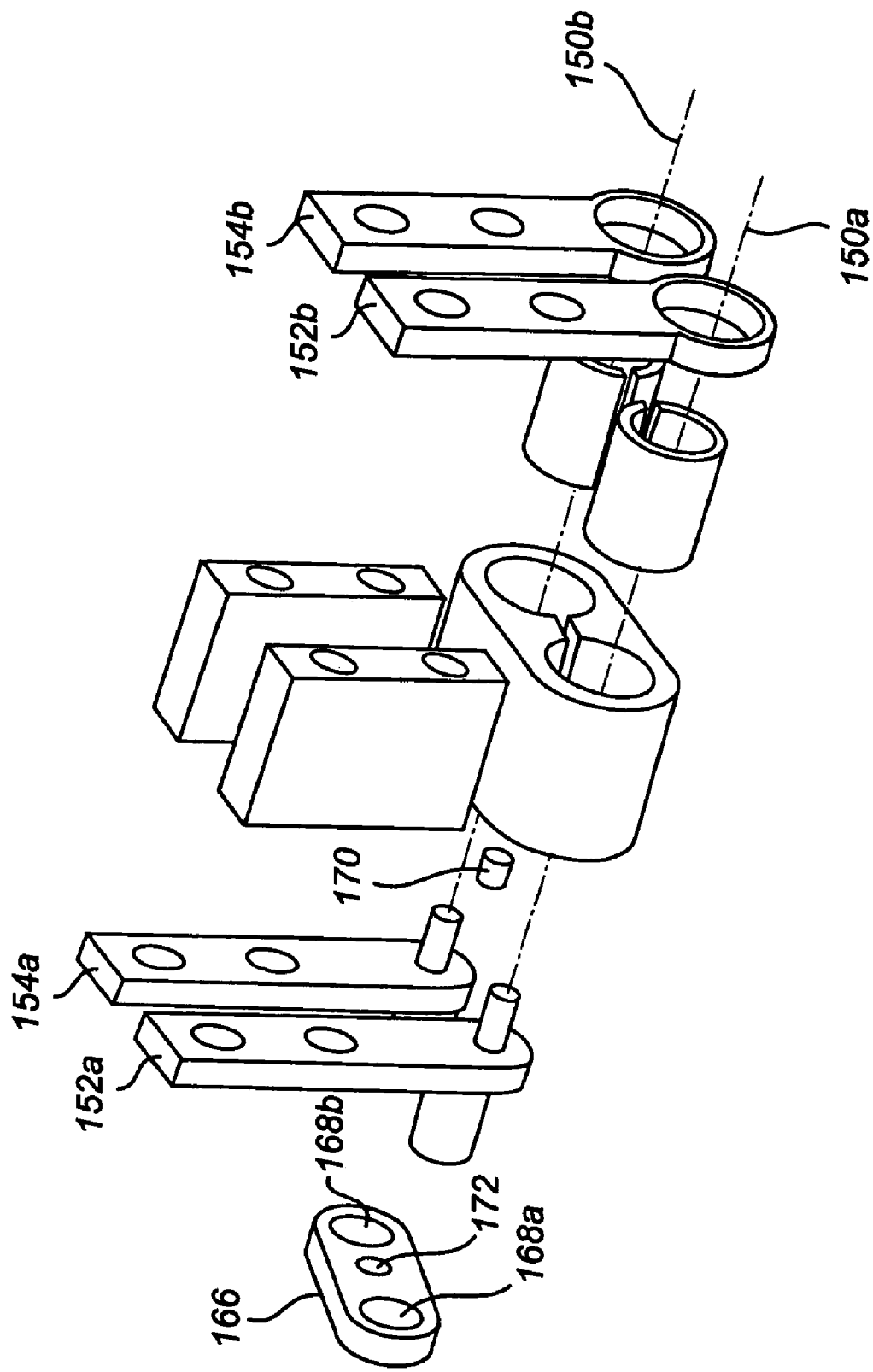
FIG. 17 is an exploded view of the embodiment of FIG. 16 as view from the opposite direction.

As shown in FIG. 16 and FIG. 17, the hinge comprises a hinge body defining a first axis of rotation 150a for the first hinge member 152 and a second axis of rotation 150b for the second hinge member 154. Each hinge 152, 154 member is formed by two elements 152a, 152b; 154a, 154b on either side of the hinge body 150.

The first hinge member 152 is provided with a first shaft 162 defining a first synchronizing axis. The second hinge member 154 is provided with a second shaft 164 defining a second synchronizing axis. The first shaft 162 is arranged offset the first axis of rotation a distance A. The second shaft 164 is arranged offset the second axis of rotation a distance B. The distance B is the same as distance A but is directed in the opposite direction.

A connecting link 166 adapted to connect the first and second synchronizing axes with each other. The connecting link 166 is provided with two openings 168a, 168b into which the first and second shafts 162, 164 are adapted to extend. The connecting link 166 is adapted to maintain a fixed offset distance between the first and second synchronizing axes 162, 164 along the connecting link 166.

The hinge body 150 is be adapted to maintain a fixed offset distance between the first and second axes of rotation 150a, 150b.

Since any rotation of any of the hinge members (e.g. the first hinge member 15) will give a translation of the synchronizing axis (i.e. the first synchronizing axis 162) the link 166 will force the other synchronizing axis (i.e. the second synchronizing axis 164) to translate the same distance and in the same direction. The link 166 will assure a fixed distance between the synchronizing axes 162, 164 and since the translation is produced by rotation about two offset axis 150*a*, 150*b* and since the offset distance A, B of each hinge member is the same, the translation of the second synchronizing axis 164 is forced to the same amount and in the same direction. Since the synchronizing axes 162, 164 are offset in opposite directions in relation to respective axis of rotation 150*a*, 150*b* the translation of the latter synchronizing axis (i.e. the second synchronizing axis 164) will force the associated hinge member (i.e. the second hinge member 154) to rotate in the direction opposite the direction compared to the first hinge member 152.

The hinge is further provided with a central guiding pin 170 adapted to be partly inserted into a circular opening 172 in the connecting link 166 and into a long hole 174 in the hinge body 150.

The mobile communications device is provided with an electric wiring electrically connecting the two sections of the device. An embodiment of this electric wiring is shown in FIG. 13 and FIG. 15.

The electric wiring is formed by a flex circuit 170 extending across the hinge and electrically connecting electronic circuitry in the first section to electronic circuitry in the second section. The electronic circuitry in the first and second sections are connected to the flex circuit using suitable conventional connections 172, 174.

The flex circuit 170 wound about the first axis of rotation 90*a*; 120*a* in a first direction and about the second axis of rotation 90*b*; 120*b* also in the first direction. The flex circuit 170 is wound about the first and second axis of rotation 90*a*, 90*b*; 120*a*, 120*b* in a total winding angle of at least 180°. Thereby there will always be enough circuit to allow a total mutual rotation of 360° of the hinge members and the axes of rotation. When the first axis rotates 180° and wound off 180° flex circuit, the second axis will rotate 180° and wound up the corresponding amount of flex circuit, thus allowing a total of 360° mutual rotation of the hinge members.

The flex circuit 170 is provided with a winding portion 170*a* in which the flex circuit 170 displays the above described windings. The ends of the winding portion 170*a* of the flex circuit 170 enters into longitudinal slots 176*a*, 176*b* in the screw gears 90*a*, 90*b* or the shafts 120*a*, 120*b*. The longitudinal slots 176*a*, 176*b* extend radially into the screw gears 90*a*, 90*b* or the shafts 120*a*, 120*b*. The flex circuit 170 is further provided with two connector portions 170*b*, 170*c* extending longitudinally, i.e. along the winding axes, from the ends of the winding portion 170*a*. The connector portions 170*b*, 170*c* extend outside the winding portion 170*a* to allow the above mentioned connections 172, 174 to be connected to the flex circuit 170 outside the winding portion 170*a*, such that they will not interfere with the winding function of the flex circuit 170.

As shown in FIG. 18 a first set of spheres (denoted with a dot at respective centre point) are arranged side by side along a first path 181 and a second set of spheres (denoted with a + at respective centre point) are arranged side by side along a second path 182.

The hinge is provided with a first cylinder 185*a* non-rotatably connected to the first section of the mobile communications device and rotatably about the first axis of rotation 180*a* and a second cylinder 185*b* non-rotatably connected to the second section of the mobile communications device and rotatably about the second axis of rotation 180*b*.

The first path 181 extends in a groove 186*a* in the envelope surface of the first cylinder 185*a* in clockwise direction, bridges the distance to the second cylinder 185*b* and continues in a groove 186*b* in the envelope surface of the second cylinder 185*b* in counter-clockwise direction.

The second path 182 extends in a groove 187*a* in the envelope surface of the first cylinder 185*a* in counter-clockwise direction, bridges the distance to the second cylinder 185*b* and continues in a groove 187*b* in the envelope surface of the second cylinder 185*b* in clockwise direction.

The grooves 185*a*-*b*, 186*a*-*b* extends not all the way around respective cylinder 185*a*, 185*b*. Thus, the first path 181 extends from a stop 183*a* in the groove 186*a* to a stop 183*b* in the groove 186*b* and the second path 182 extends from a stop 184*a* in the groove 187*a* to a stop 184*b* in the groove 187*b*.

When a user starts to change the position of the sections relative each other in a first direction the spheres in one of the paths will transfer a pressing force between the two sections such that they both are rotated the same angle about respective axis of rotations and thereby the same angle relative to the hinge frame oriented by the positions of the two axes of rotation. When changing the positions of the sections relative to each other the spheres in the other path will correspondingly transfer a pressing force between the two sections.

When the first section is rotated in the clockwise direction about the first axis of rotation 180*a* as indicated by the arrow the stop 183*a* of the first cylinder 185*a* will push the queue of spheres in the first path 181 in front of it. The queue of spheres in the first path 181 will thereby exert a pressure onto the stop 183*b* of the second cylinder 185*b* and it will be rotated in the counter-clockwise direction about the second axis of rotation 180*b*. If the second section is rotated in the counter-clockwise direction about the second axis of rotation 180*b* as indicated by the arrow the stop 184*b* of the second cylinder 185*b* will push the queue of spheres in the second path 182 in front of it. The queue of spheres in the second path 182 will thereby exert a pressure onto the stop 184*a* of the first cylinder 185*a* and it will be rotated in the clock-wise direction about first axis of rotation 180*a*. If first section is rotated in the counter-clockwise direction the spheres in the second path 182 will be pushed towards and rotate the second cylinder 185*b* and if the second section is rotated in the clockwise direction the spheres in the first path 181 will be pushed towards and rotate the first cylinder 185*a*.

The paths 181 and 182 extend about the first and second cylinder to an extend enough for each cylinder to be turned 180° in relation to the hinge frame. In one end position one of the grooves of each cylinder displays its maximum and the other displays it minimum of winding angle and in the opposite end position it is the opposite. If each of the grooves displays 180° between the maximum and minimum active winding angle the synchronizing members allow a synchronized movement over a path of 360° of relative motion between the first and second section of the mobile communications device. As shown in FIG. 19, the two paths 181 and 182 are offset each other in the axial direction in order to form a FIG. 8 without interfering with each other.

As shown in FIG. 19, the synchronizing mechanism is provided with a locking mechanism. The cylinders 185*a* and 185*b* are provided with a number of indentations in a surface facing in the axial direction. The indentations are positioned at predetermined angular positions in relation to respective axis of rotation. As mentioned above the cylinders 185*a* and 185*b* are non-rotatably connected to respective axis of rotation and respective section of the mobile communications device.

Two discs 190*a*, 190*b* are fixed to the frame. The two discs 190*a*, 190*b* are each provided with two through-going holes. The discs 190*a*, 190*b* are arranged parallel to the surfaces of the cylinders 185*a*, 185*b* being provided with the indentations and at a distance from said surfaces.

The locking mechanism is further provided with two pressure discs 192*a*, 192*b* arranged in parallel with the above discs 190*a*, 190*b*. Spheres 193 are arranged in the through-going holes of the discs 190*a*, 190*b* and pressured against the cylinders 185*a*, 185*b* by the pressure discs 192*a*, 192*b*. The discs 190*a*, 190*b* and spheres 193 do not rotate with the cylinders 185*a*, 185*b*. When the user rotates the sections of the mobile communications device, the cylinders 185*a*, 185*b* are rotated in relation to the hinge frame. Thus, a sphere 193 located in an indentation in the cylinder 185*a* will since it is retained in the through-going hole keep its angular position in relation to the hinge frame. The sphere 193 will thereby be forced out of the indentation and move slightly away from the cylinder 185*a*, 185*b*. This movement will be counteracted by the pressure disc 192*a*, 192*b* but at a given torque the sphere 193 will leave the indentation. The pressure discs 192*a*, 192*b* are biased against the spheres 193 towards the cylinders 185*a*, 185*b* by a compression spring 194*a*, 194*b* or the like. The pressure discs 192*a*, 192*b* may as complement or as substitute to the indentations in the cylinders 185*a*, 185*b* be provided with indentations or holes 195 having a diameter less than the spheres 193. Since the pressure discs rotate with the cylinders 185*a*, 185*b* the spheres 193 will similarly engage the indentations of the pressure discs 192*a*, 192*b* when the angular positions coincide. It may be noted that which disc is rotatable with the section and which is fixed to the hinge frame may be varied in a number of ways.

Figure 20:
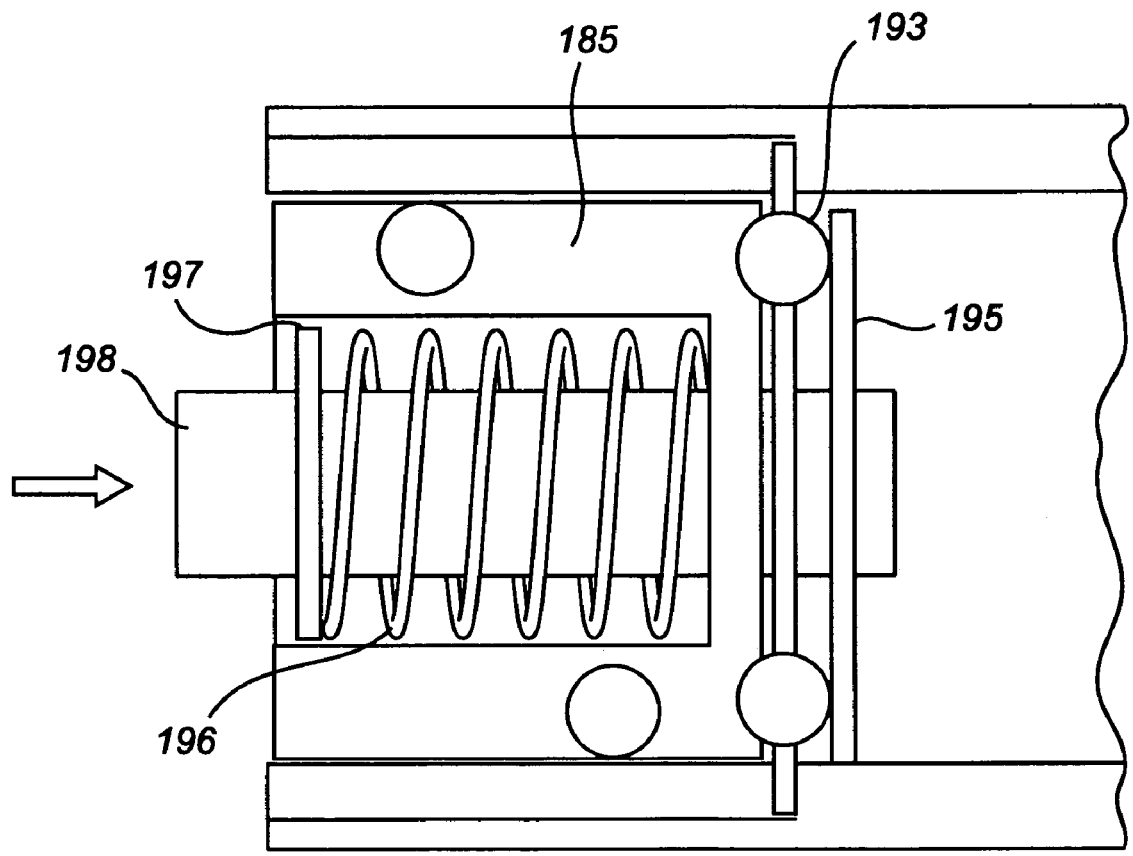
FIG. 20 is an enlargement of an alternative to the locking mechanism shown in FIG. 19.
Figure 21A:
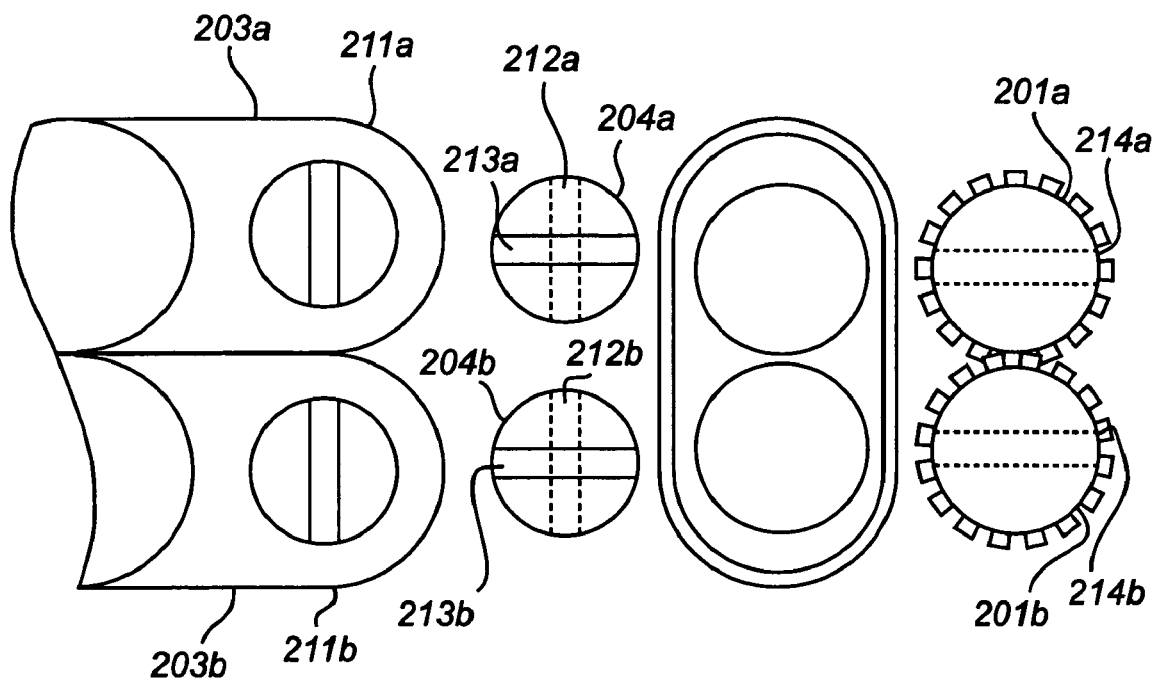
FIG. 21a is an exploded view of the synchronizing mechanism showing the synchronizing members in plane view.
Figure 21B:
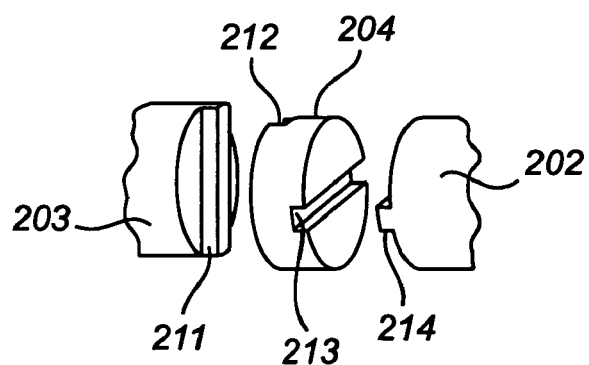
FIG. 21b is an exploded view showing part of the synchronizing members in perspective.

FIG. 20 discloses an alternative embodiment of the basic locking mechanism discussed above. The pressure disc 195 is attached to a manoeuvring pin 198 and is biased against the spheres 193 by a compression spring 196 acting between an inner surface of the cylinder 185 and a stop disc 197 attached to the manoeuvring pin 198. The compression spring 196 pushes the stop disc to the left in FIG. 20 and the pin 198 pulls the pressure disc 195 towards the spheres 193. The manoeuvring pin 198 is accessible from the outside such that an user may push the pin 198 as indicated by the arrow to the right in FIG. 20. Thereby the pressure disc 195 is pushed to the right and the biasing of the spheres is released. In this state the user may change rotate the sections of the mobile communications device without being forced to overcome the resistance when the spheres leaves the indentations and simultaneous counteracts the biasing of the pressure disc. This design might be useful for cases where it is desired to form one or more of the locking positions extraordinary strong or distinct, i.e. with extraordinary deep or steep indentations. With this design such a locking position may be released by activating the pressure pin, whereas the ordinary locking positions with more shallow indentations may be released by just overcoming the biasing force of the pressure disc.

The synchronizing mechanism of FIG. 21-25 comprises a first gear 201*a* and a second gear 201*b* in engagement with each other. The first gear 201*a* is non-rotatably connected to a first gear shaft 202*a* and the second gear 201*b* is non-rotatably connected to a second gear shaft 202*b*.

The first section of the mobile communications device is non-rotatably connected to a first shaft 203*a* and a second section is non-rotatably connected to a second shaft 203*b*. The shafts 203*a*, 203*b* are offset the first and second gear shafts 202*a*, 202*b*. The distance between the first and second shafts 203*a*, 203*b* is determined by the thickness of the sections of the mobile communications device. The distance between the first and second gear shafts 202*a*, 202*b* is determined by the first and second gear 201*a*, 201*b*.

A pair of intermediate members 204*a*, 204*b* are positioned between said shafts 203*a*, 203*b* and said gear shafts 202*a*, 200*b*.

The shafts 203*a*, 203*b* are each provided with a rib 211*a*, 211*b* on the surface facing the intermediate members 204*a*, 204*b*. The ribs 211*a*, 211*b* extends transversely to the axes of rotation and extends radially in both directions from the centre axis.

The intermediate members 204*a*, 204*b* are on a surface facing the first and second shafts 203*a*, 203*b* each provided with a groove 212*a*, 212*b* adapted to receive the ribs 211*a*, 211*b* of the shafts 203*a*, 203*b*. The grooves 212*a*, 212*b* extend transversely to the axes of rotation of the shafts 203*a*, 203*b* and extends radially in both directions from the centre axis of the intermediate members 204*a*, 204*b*.

The intermediate members 204*a*, 204*b* are each further, on a surface facing the gears 201*a*, 201*b*, provided with a groove 213*a*, 213*b* extending transversely to the axes of rotation of the shafts 203*a*, 203*b* and transversely to the grooves 212*a*, 212*b* on the other side of the intermediate members 204*a*, 204*b*. The grooves 213*a*, 213*b* also extends radially in both directions from the centre axis of the intermediate members 204*a*, 204*b*.

The gear shafts 202*a*, 202*b* are each provided with a rib 214*a*, 214*b* on the surface facing the intermediate members 204*a*, 204*b*. The ribs 214*a*, 214*b* extends transversely to the gear shafts and extends radially in both directions from the centre axis. The ribs 214*a*, 214*b* are received in the grooves 213*a*, 213*b* of the intermediate members 204*a*, 204*b*.

Figure 23:
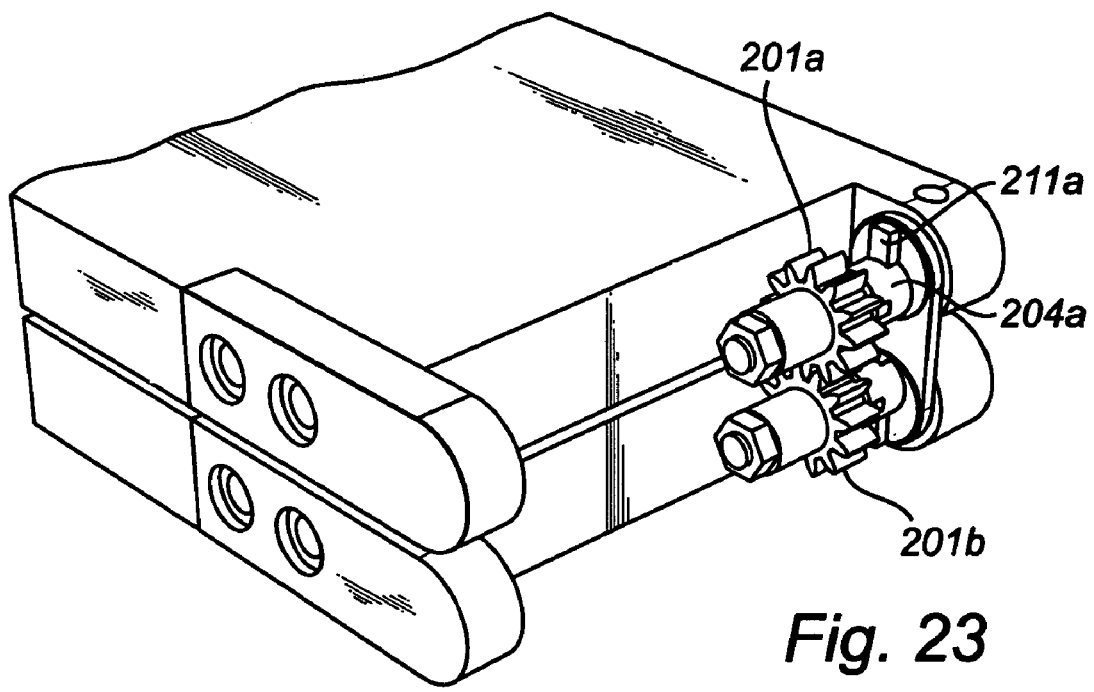
FIG. 23-25 show three different positions of the device in FIG. 22.
Figure 24:
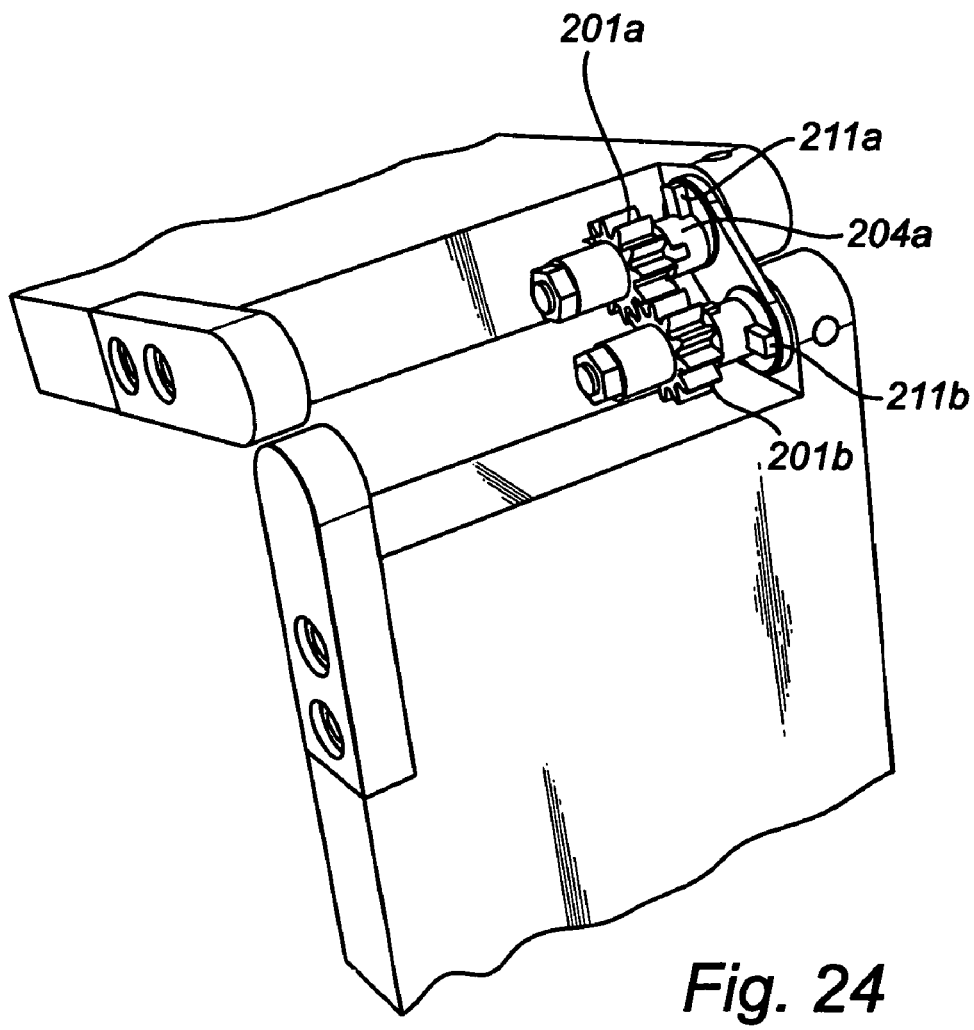
Figure 25:
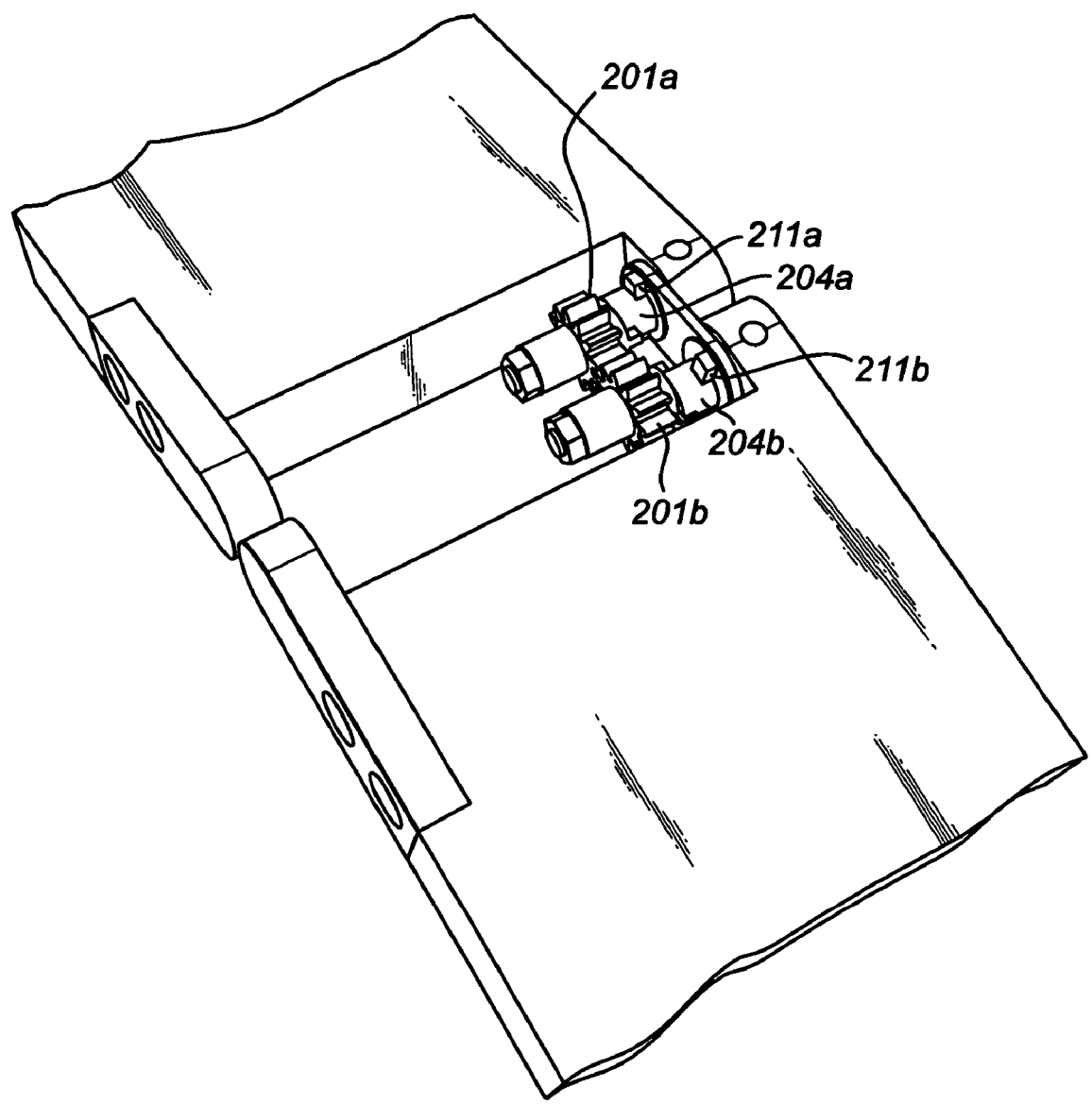

As shown in FIG. 23-25, the ribs and grooves will slide in relation to each other and the intermediate members 204*a*, 204*b* will be translated back and forth in relation to the shafts and gear shafts. At certain angular positions of the shafts and gear shafts the intermediate members will be aligned with the shafts and at other angular positions they will be aligned with the gear shafts. In the end positions one set of rib and groove on one side of the intermediate member will be oriented transversely to the offset distance and the other set of rib and groove will be oriented along the offset distance. The set of rib and groove being transverse to the offset distance will not allow any offset distance between the axis of rotation of the shaft and the axis of rotation of the intermediate member, whereas the set of rib and groove being oriented along the offset distance will allow the necessary offset distance by a relative displacement of the groove of the intermediate member and the rib of the gear shaft. When rotated 90°, the rib and groove-engagement of the intermediate member and gear shaft will not allow any offset distance, whereas the rib and groove-engagement between the intermediate member and the shafts will be directed along the offset distance and allow the necessary displacement of the intermediate member in relation to the axes of rotation of the shafts.

In FIG. 23-25 it is shown how the intermediate members 204*a*, 204*b* move from one end position on the ribs 211*a*, 211*b* towards a centre position (when the sections are completely flat laid as almost reached in FIG. 25). Note how the free portion of the ribs 211*a*, 211*b* are becomes shorter and shorter in FIG. 24-25 compared to in FIG. 23.

The choice of providing the shafts with ribs and the intermediate members with grooves may interchanged such that the intermediate members is formed with ribs and the shafts are formed with grooves or such that the intermediate members are formed with a groove on one side and a rib on the other side and respective shaft is provided with a corresponding rib or groove.

The locking mechanisms of FIG. 26-29 comprises two discs 220a, 220b each being non-rotatably connected to a respective shaft 221a, 221b. The shafts 221a, 221b are arranged to be rotated with respective section of the mobile communications device.

The discs 221a, 221b are provided with a number of indentations 222 positioned on the side surfaces of the discs 221a, 221b and at different angular positions.

Figure 26:
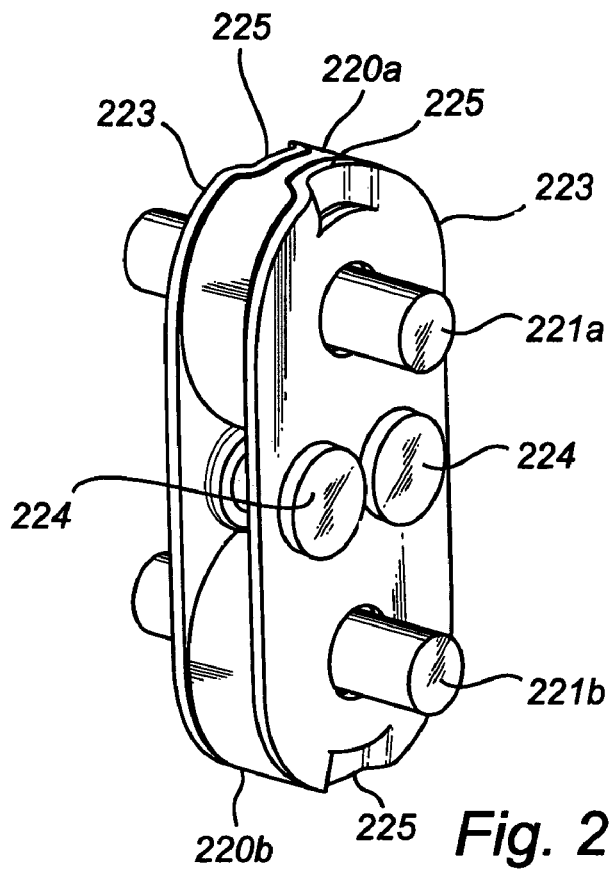
FIG. 26 is a view showing a locking mechanism in a locked position.
Figure 27:
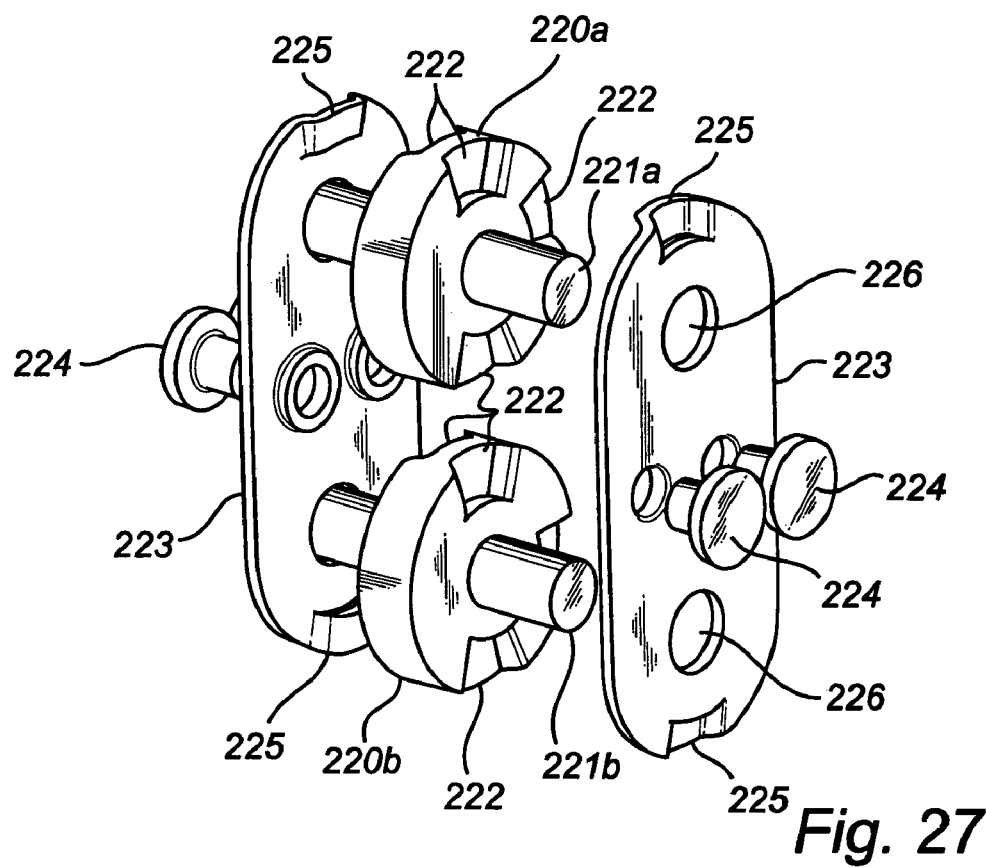
FIG. 27 is an exploded view of the locking mechanism in FIG. 26.

In the embodiment of FIG. 26-27, the locking mechanism is further provided with two plates 223 held together by a pair of rivets, bolt-and-nut-joints, or the like 224. The plates 223 are provided with protuberances formed by bulges 225 pressed in the plate. The bulges 225 are positioned at a distance from the joints 224 in order to allow the plates to elastically flex to allow disengagement of the indentations 222 from the bulges 225.

As shown in FIG. 26-27, the indentations 222 are formed symmetrically such that an indentation 222 on one side of the disc is paired with an indentation 222 on the other side of the disc. The plates 223 are also symmetrically shaped such that a protuberance 225 on one of the plates 223 is paired with a protuberance 225 on the other plate 223.

The plates 223 are provided with through-going holes 226 through which the shafts 221a, 221b extend. The principal inner surface of the plates 223 and the principal surface of the discs 221a, 221b essentially abut each other. This last two features contribute to the stability of the locking mechanism.

When the user rotates one of the sections of the mobile communications device relative to the hinge, the other section will due to a synchronizing mechanism (not shown) also be rotated to the same extent but in the opposite direction in relation to the hinge. The indentations 222 of the discs 221a, 221b will thereby be displaced (by rotation of the discs) out of register with the bulges 225 of the plates 223. The sloping surfaces of the indentations 222 and bulges 225 will wedgingly force the end portions of the plates 223 to flex outwardly such that the discs 221a, 221b will fit between the bulges 225 even when there is no indentation 222 in register with the bulges 225. When the user continues to rotate the sections in relation to the hinge, another indentation 222 will at a certain angular position start to receive the bulge 225. Due to the sloped sides of the bulges 225 and the indentations 222 and the biasing achieved by the elastic deformation of the plates 223, the engagement will by itself be forced to a locked position.

Figure 28:
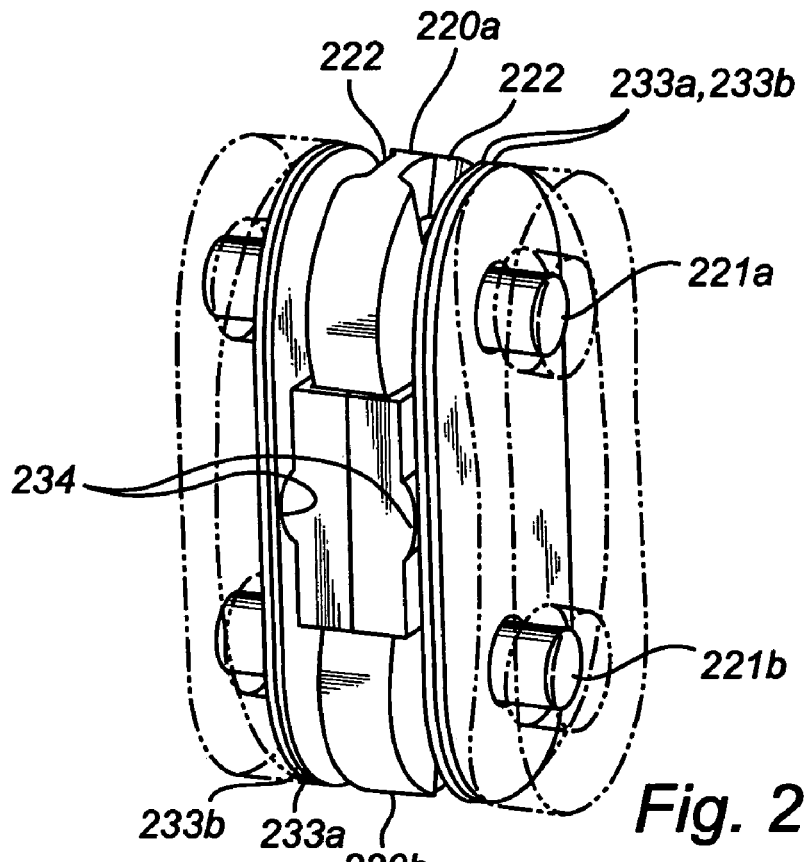
FIG. 28 is a view showing a locking mechanism of an alternative embodiment of the locking mechanism of FIG. 26.
Figure 29:
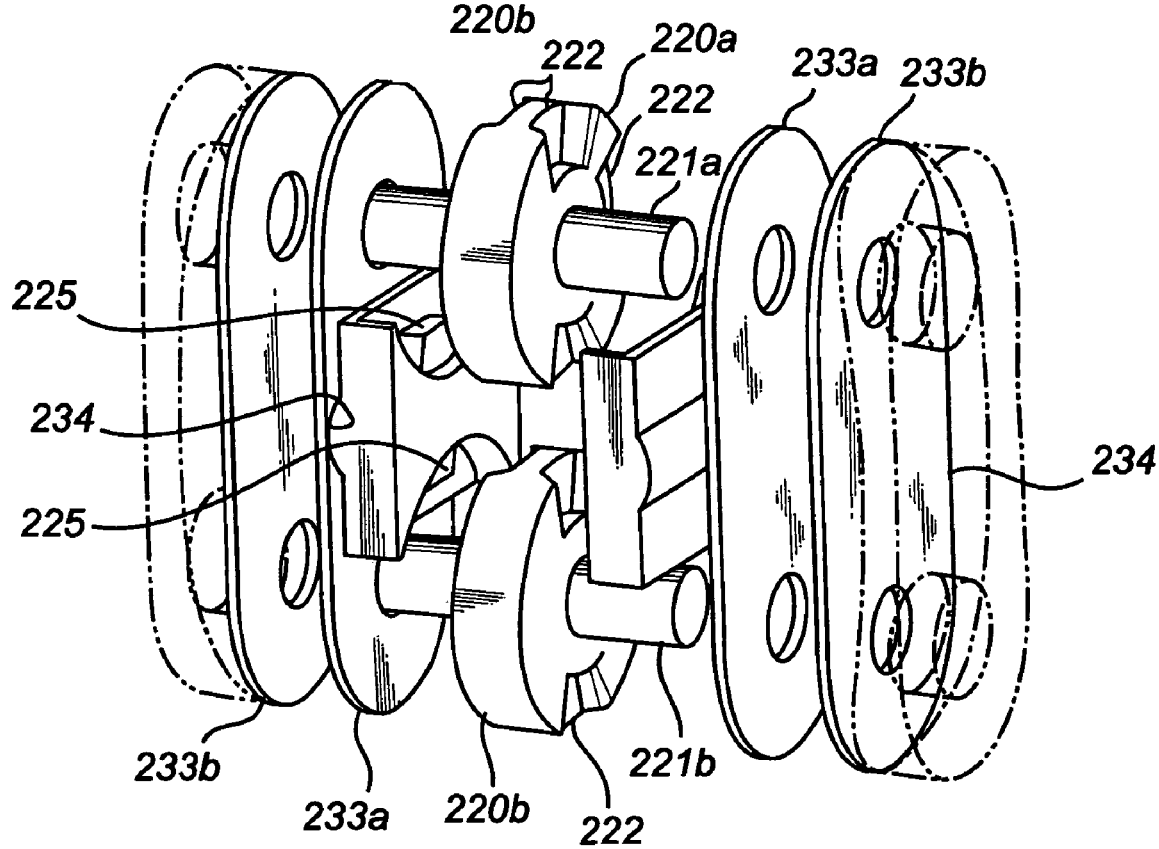
FIG. 29 is an exploded view of the locking mechanism in FIG. 28.

In the embodiment of FIG. 28-29, the locking mechanism is further provided with two intermediate members 230 and two plates 233. The plates 233 are in this embodiment furthermore arranged in pairs of plates 233a, 233b, one inner plate 223a and one outer plate 223b.

The intermediate members 230 are provided with protuberances formed as bulges 225. The intermediate members 230 are positioned between the plates 223 and between the shafts 221a, 221b such that a first intermediate member 230 abuts one side of the two discs 220a, 220b and a second intermediate member 230 abuts the other side of the two discs 220a, 220b. In the embodiment of FIG. 28-29, the protuberances 225 of the intermediate members 230 are formed inside recesses in the intermediate members 230, which recesses are adapted to receive a portion outside a chord of the discs 220a, 220b, which portion is provided with the indentations 222 at given angular positions.

As shown in FIG. 28-29, the indentations 222 are formed symmetrically such that an indentation 222 on one side of the disc is paired with an indentation 222 on the other side of the disc. The intermediate members 230 are also symmetrically shaped such that a protuberance 225 on one of the intermediate members 230 is paired with a protuberance 225 on the other intermediate member 230.

When the user rotates one of the sections of the mobile communications device relative to the hinge, the other section will due to a synchronizing mechanism (not shown) also be rotated to the same extent but in the opposite direction in relation to the hinge. The indentations 222 of the discs 221a, 221b will thereby be displaced (by rotation of the discs) out of register with the bulges 225 of the intermediate members 230. The sloping surfaces of the indentations 222 and bulges 225 will wedgingly the intermediate members 230 outwardly. This in turn forces the centre portions of the plates 233 to flex outwardly such that the discs 221a, 221b will fit between the bulges 225 even when there is no indentation 222 in register with the bulges 225. When the user continues to rotate the sections in relation to the hinge, another indentation 222 will at a certain angular position start to receive the bulge 225. Due to the sloped sides of the bulges 225 and the indentations 222 and the biasing achieved by the elastic deformation of the plates 233, the engagement will by itself be forced to a locked position.

The intermediate members 230 are each provided, on its outer surfaces, with a ridge 234 extending transversely to the distance between the discs 220a, 220b. The ridge 234 thus extend along the line about which the plates 233 are curved when they flex outwardly due to the disengagement of the indentations 222 and bulges 225.

As indicated by double-dot-dashed lines the surroundings may be formed with a curvature essentially corresponding to the curvature the plates 233 will reach when the indentations and bulges are disengaged.

Figure 30:
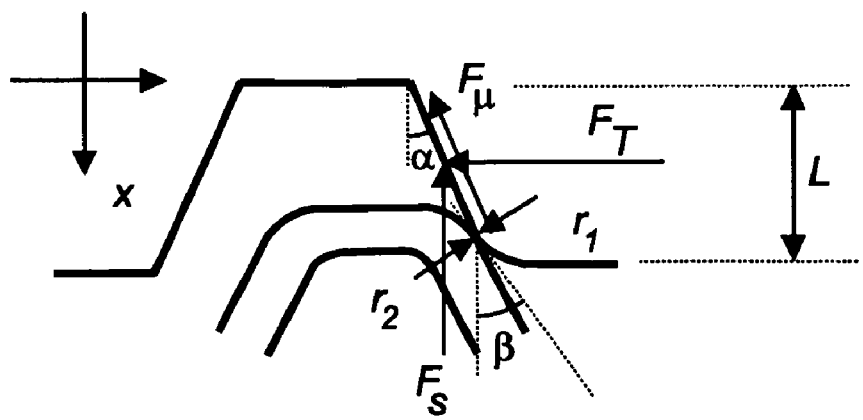
FIG. 30 is schematic drawing showing forces and the sloped surfaces of the indentations and protuberances of the locking mechanism of FIG. 26-29.
Figure 31:
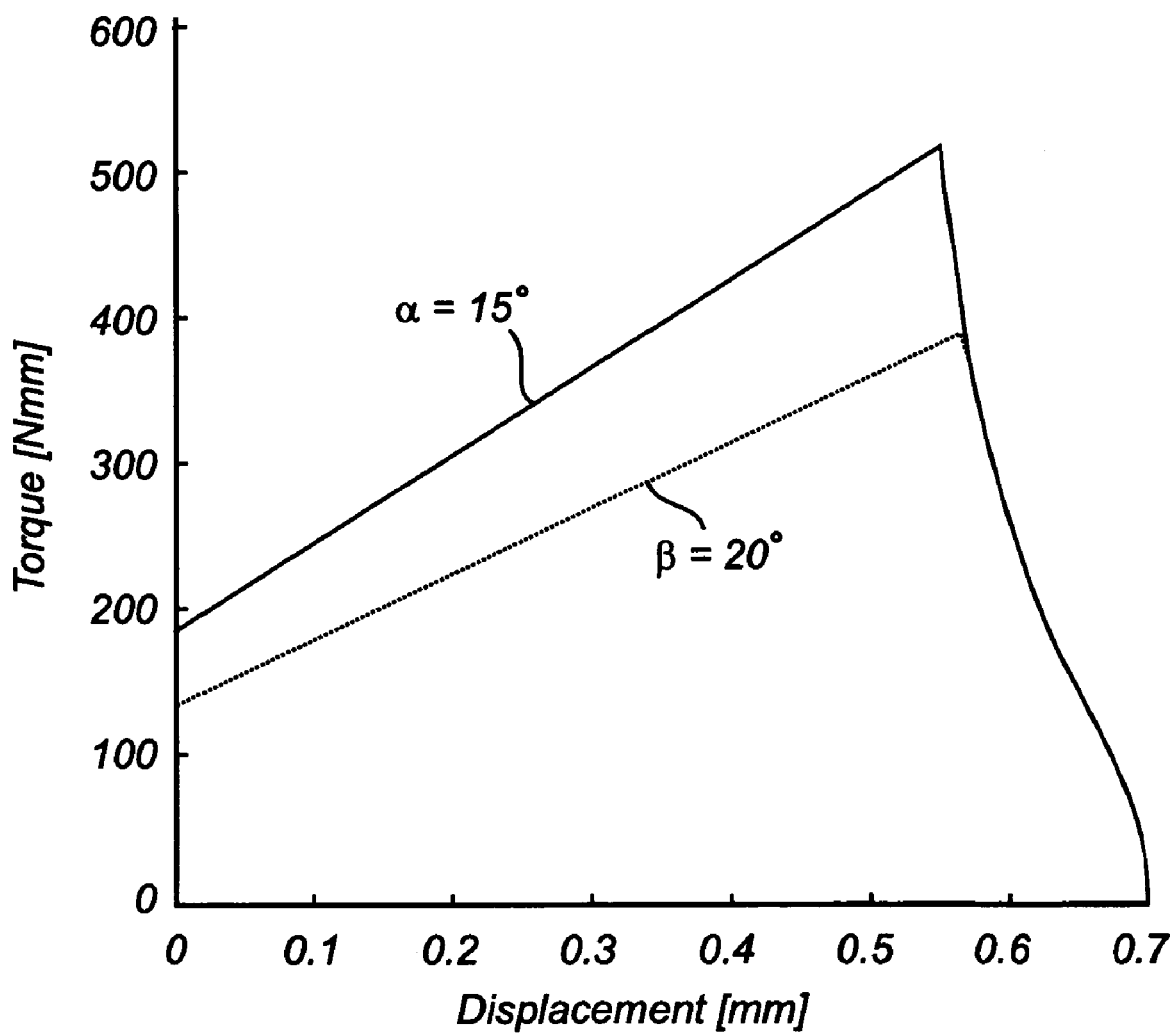
FIG. 31 is a graph showing the torque as a function of the displacement when the indentations and protuberances is forced to be disengaged.

In FIG. 30 the angles of the indentations and protuberances is shown in detail. For easy understanding of the disclosure of FIG. 30, compare FIG. 30 with the mechanism of FIG. 26 as viewed from above. The indentation 222 of the disc 220a is sloped an angle $\alpha$. The protuberance 225 of the plate 223 is sloped an angle $\beta$. As mentioned above the sloped surfaces will provide a wedging motion of the protuberance 225 in relation to the indentation 222. When the user starts to rotate section in relation to the hinge the necessary torque will rise (as shown in FIG. 31) since the plates 223 will need to be bent more and more. A change in this increasing torque will occur when the corner radius of the protuberance contacts the corner radius of the indentation. At the final stages of the protuberance leaving the indentation the torque will decrease to the value necessary to overcome the friction of the non-locked locking mechanism (e.g. the friction between the sides of the discs and the surfaces of the plates). The torque to overcome in the disengagement will rise steeper for a smaller slope angle (see FIG. 31).

Figure 32:
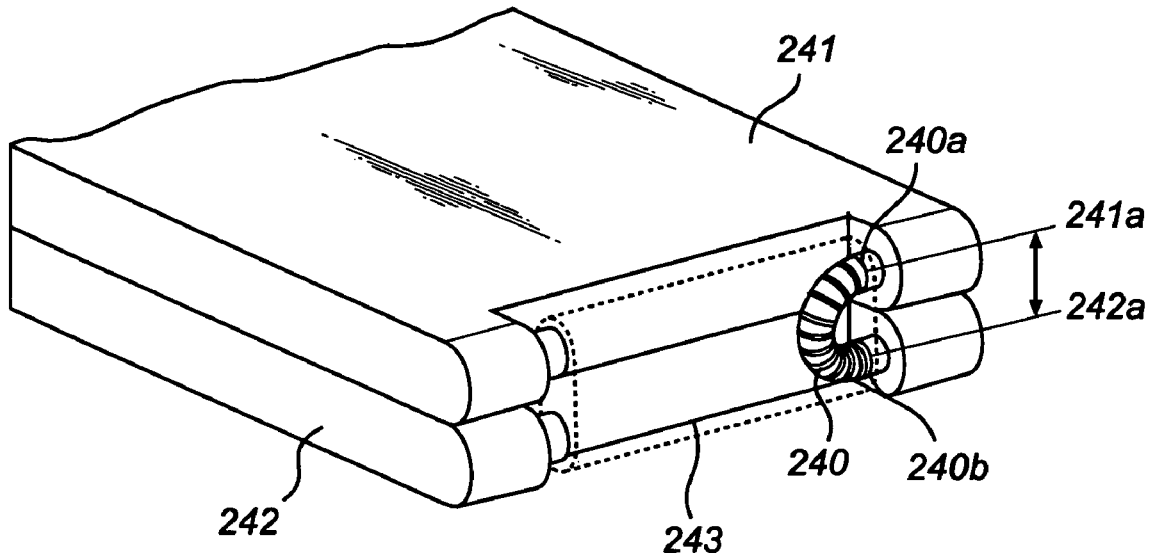
FIG. 32 is a view in perspective showing a synchronizing member comprising a U-shaped flexible shaft.

As shown in FIG. 32 the synchronizing member generally comprises a flexible shaft 240 bent into a U-shape. The first end 240a of the flexible shaft 240 is connected to the first axis of rotation of the first section 241 in relation to the hinge 243. The second end 240b of the flexible shaft 240 is connected to the second axis of rotation of the second section 242 in relation to the hinge 243.

The U-shape of the flexible shaft 240 bridges the distance between the first and second synchronizing axis 241a, 242a. The diameter of the flexible shaft 240 may thus be formed substantially smaller than said distance and it will therefore not interfere with the aim of making the hinge thinner than the sections of the mobile communications device.

In accordance with one embodiment the flexible shaft 240 is basically formed of a screw spring (see FIG. 32), wherein the wire forming the spring is wound along a screw line about an axis of rotation. The axis of rotation is bent into a U-shape.

In accordance with another embodiment (not shown) the flexible shaft is basically formed a flexible shaft of a polymeric material or the like. The torsional stiffness may be increased by winding threads or wires diagonally about the shaft.

It may be noted that although FIG. 32 only discloses a singe U-shaped flexible shaft 240 it is conceivable to use further flexible shafts, e.g. another one directed the other way around and connected to the first and second section at the other end of the hinge 243.

Figure 33:
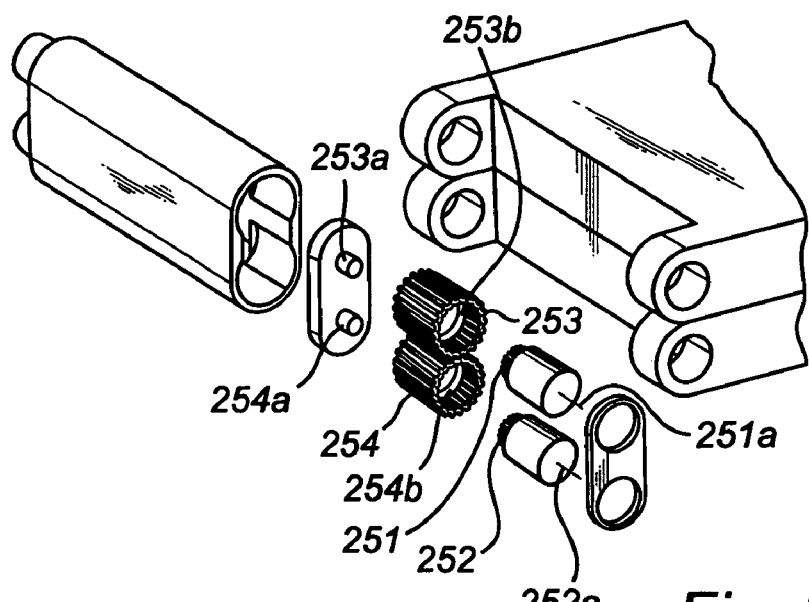
FIG. 33 is an exploded view showing a synchronizing mechanism comprising two gears provided with internal and external teeth.
Figure 34:
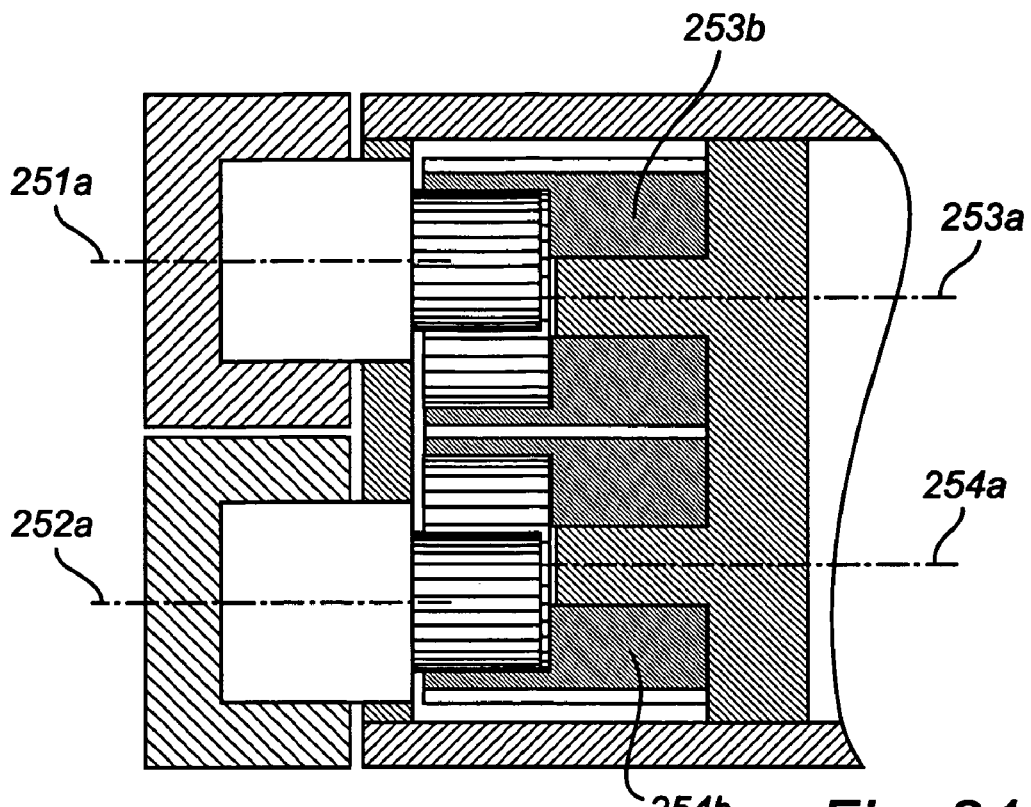
FIG. 34 is a cross-section showing the different axes of rotation and gears of the synchronizing mechanism of FIG. 33 as assembled.
Figure 35:
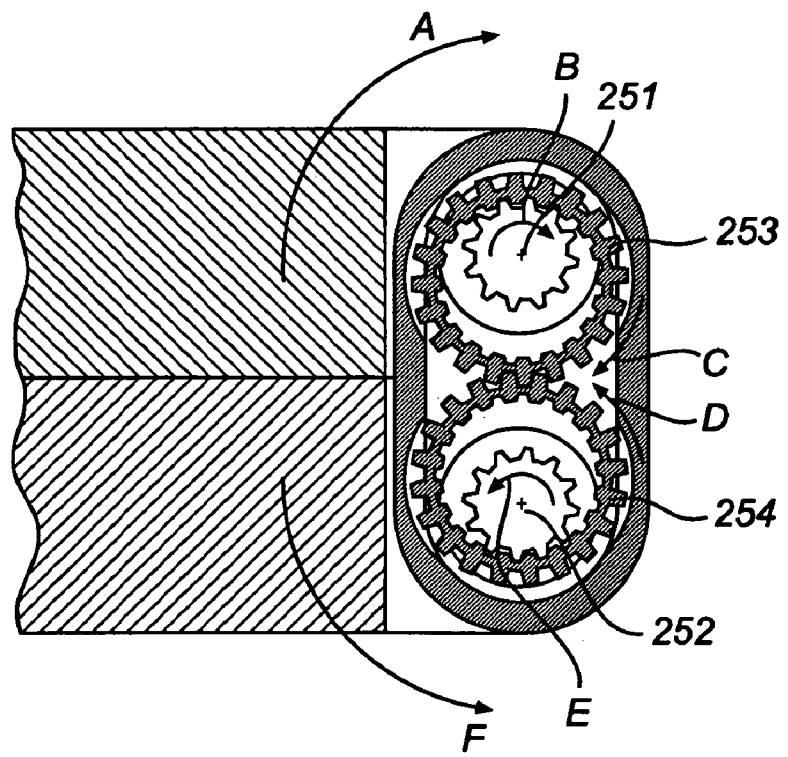
FIG. 35 is a plan view showing the synchronizing mechanism of FIG. 33 and FIG. 34.

As shown in FIG. 33-35 this embodiment of the synchronizing mechanism comprises a first gear 251 rotatable with the first section about a first axis of rotation 251*a*, a second gear 252 rotatable with the second section about a second axis of rotation 252*a*.

The synchronizing mechanism further comprises a third gear 253 rotatable about a third axis of rotation 253*a* offset the first axis of rotation 251*a* and a fourth gear 254 rotatable about a fourth axis of rotation 254*a* offset the second axis of rotation 252*a*.

The third gear 253 is via its inner surface in engagement with the outside of the first gear 251. The fourth gear 254 is via its inner surface in engagement with the outside of the second gear 252. The outer surface of the third gear 253 is in engagement with the outer surface of the fourth gear 254.

The third axis of rotation 253*a* and the fourth axis of rotation 254*a* are positioned between the first and second axis of rotation 251*a*, 252*a*.

The first and second gears 251, 252 are non-rotatably connected to the first and second section of the mobile communications device via two shafts 251*a*, 252*a*. The third and fourth gears 253, 254 are freely rotatably connected to the hinge via two shafts 253*a*, 254*a* having fixed positions relative to the hinge. As shown in FIGS. 33 and 34 the third and fourth gears 253, 254 are provided with teeth on its inner surface only along a portion of the width of the gear (width along the axis of rotation) and are along a portion of the width provided with a coupling portion 253*b*, 254*b*. The coupling portions 253*b*, 254*b* engage the shafts 253*a*, 254*a* and achieve the desired free rotatability of the gears 253, 254.

As shown in FIG. 35, the first gear 251 will rotate with the first section of the mobile communications device as indicated by the arrows A and B. Due to the engagement of the outside of the first gear 251 with the inside of the third gear 253, the third gear 253 will also rotate in the same direction C as the first gear 251. It will however have a different rotational speed due to the gear ratio. The fourth gear 254 will be rotated by the third gear 253 (both having the same rotational speed) in the opposite direction D. The fourth gear 254 will rotate the second gear 252 in the same direction E as the fourth gear 254. It will however have a different rotational speed due to the gear ratio. Since the gear ratio of the first/third gears and the second/fourth gears are the same and since the two gear ratios are mirrored the second gear 252 will rotate with the same rotational speed as the first gear 251 but in opposite directions. The second section of the mobile communications device will rotate with the second gear 252 in with the same rotational speed as the first section but in the opposite direction F. Thus, when a user starts to change the angular orientation of one of the sections in relation to the hinge, the other section will change its angular orientation in relation to the hinge the corresponding amount but in the opposite direction F. Alternatively it may be put as when a user change the angular orientation of one section in relation to the other section the hinge will change half this change in angular position in relation to the first section and the other half in relation to the second section.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

Especially it should be noted that there are disclosed on one hand several different designs for accomplishing the synchronizing of the two sections of the mobile communications device or the two members of the hinge and on the other hand there is disclosed several different designs for accomplishing the locking of the two sections or members in certain positions. It is contemplated that the designs relating to the synchronizing may be combined with the different designs of locking mechanisms and vice versa in addition to the combinations explicitly disclosed in the different embodiments.

It may also be noted that the different aspects of usability has been discussed in detail in respect of some embodiments and only briefly in respect of others. It should in this context be understood that the basic objectives of usability are applicable to all different embodiments even if not explicitly discussed in relation to every embodiment.

It should also be noted that the discloses locking mechanism are provided in respect of both axes of rotation of the hinge members or sections of the mobile communications device. When both axes of rotation are provided with locking mechanisms, the user will experience a distinct lock in respect of both sections in relation to the hinge frame. However, since the rotation of the hinge members or sections are synchronized, one locking mechanism in respect of one of the axes of rotation will suffice to get a locking functionality of the hinge as such. With only one locking mechanism there is however a higher demand on the synchronization to be free from any play or flimsiness.

What is claimed is:

1. A hinge comprising:
   a first hinge member having a first axis of rotation with a first element connected to the hinge;
   a second hinge member having a second axis of rotation offset from said first axis of rotation with a second element connected to the hinge; and
   synchronizing members configured to transfer rotational movement of the first element relative to the hinge to rotational movement of the second element relative to the hinge; and
   wherein the synchronizing members comprise four conical or truncated conical gears connected to each other.

2. A hinge according to claim 1, wherein
   the synchronizing members are configured to transfer rotational movement of the first element relative to the hinge to rotational movement of the second element relative to the hinge through a path of about 360 degrees of rotational movement of the first element in relation to the second element.

3. A hinge as in claim 1, wherein the hinge is arranged in an mobile communications device comprising a first and a second section, wherein the first section of the mobile communications device comprises the first element of the hinge and the second section of the mobile communications device comprises the second element of the hinge.

4. A hinge as in claim 3, wherein the hinge has a thickness smaller than the thickness of the first and second section.

5. A hinge as in claim 1, wherein the first and second elements are frame members rigidly attached or attachable to a first and second section of a mobile communications device.

6. A hinge as in claim 5, wherein the hinge has a thickness smaller than the thickness of the first and second section.

7. A hinge as in claim 1, wherein the hinge comprises a hinge frame having a generally oval side profile and two parallel pin receiving holes.

8. A hinge as in claim 7, wherein the hinge frame comprises a recess for receiving the synchronizing members.

9. A hinge as in claim 7, further comprising a locking mechanism comprising a first locking member being non-rotatably connected to the first hinge member and provided with one or more indentations or protuberances positioned at predetermined angular positions in relation to the first axis of rotation and a second locking member being non-rotatably connected to the hinge frame and provided with one or more protuberances or indentations positioned at predetermined angular positions in relation to the first axis of rotation.

10. A hinge as in claim 9, wherein a respective protuberance is formed by a sphere shaped member positioned at a predetermined angular position in relation to the first axis of rotation.

11. A hinge as in claim 9, wherein the first locking member is movable in a direction allowing the indentations and protuberances to engage and disengage each other and is biased against the second locking member, or vice versa.

12. A hinge as in claim 9, wherein the first locking member comprises a disc non-rotatably attached to the hinge member as a wheel about the first axis of rotation and provided with indentation on at least one side surface, and the second locking member comprises an elastically deformable plate provided with protuberances.

13. A hinge as in claim 9, wherein the first locking member comprises a disc non-rotatable attached to the hinge member as a wheel about the first axis of rotation and provided with indentation on at least one side surface, and the second locking member comprises an intermediate member provided with protuberances, wherein the intermediate member is biased against the disc by an elastically deformable plate.

14. A hinge as in claim 1, wherein the hinge comprises a hinge lock for locking the position of the second element relative to the first element at an intermediate position between a fully closed position and a 360 degree fully open position.

15. A hinge as in claim 1, wherein the hinge comprises
a first and second hinge pin rotatably mounted in a pin receiving holes, each of the first and second hinge pins having one conical or truncated conical gear connected thereto, and each of the first or second hinge pins being rigidly connected to a respective one of the first and second elements;
a third, transverse hinge pin having two conical or truncated conical gears connected thereto and rotatably mounted in connection to the conical or truncated conical gears of the first and second hinge pins so that rotational movement of the first hinge pin is transferred to the second hinge pin via the conical or truncated conical gears.

16. A hinge as in claim 15, wherein a hinge lock comprises planar cut-outs on a partially cylindrical surface arranged between the two conical or truncated conical gears on the third hinge pin, said partial cylindrical surface being arranged in contact with a spring-loaded lock control part.

17. A hinge as in claim 1, wherein synchronizing members define
a first synchronizing axis on the first hinge member,
a second synchronizing axis on the second hinge member, and
further comprise a connecting link adapted to connect the first and second synchronizing axes with each other,
wherein the first synchronizing axis is offset from the first axis of rotation in a first direction and the second synchronizing axis is offset from the second axis of rotation in a second, opposite the first, direction.

18. A hinge as in claim 17, wherein the connecting link is adapted to maintain a fixed offset distance between the first and second synchronizing axes.

19. A hinge as in claim 1, further comprising a flex circuit extending across the hinge being adapted to electrically connecting electronic circuitry in a first section attached to the first hinge member to electronic circuitry in a second section attached to the second hinge member.

20. A hinge as in claim 19, wherein the flex circuit is partly wound about the first axis of rotation in a first direction and about the second axis of rotation also in the first direction.

21. A hinge as in claim 20, wherein the flex circuit is wound about the first and second axis of rotation in a total winding angle of at least 180°.

22. A hinge comprising:
a first hinge member defining a first axis of rotation with a first element connected to the hinge;
a second hinge member defining an offset second axis of rotation with a second element connected to the hinge; and
synchronizing members configured to transfer rotational movement of the first element relative to the hinge to rotational movement of the second element relative to the hinge; and,
wherein the first hinge member comprises a first screw gear extending along the first axis of rotation,
the second hinge member comprises a second screw gear extending along the second axis of rotation; and
the synchronizing members comprises a moving member in engagement with the first screw gear and the second screw gear.

23. A hinge as in claim 22, wherein the first screw gear is adapted to rotate with the first element and the second screw gear is adapted to rotate with the second element, whereby the moving member is in engagement with the first screw gear such that rotational movement of the first element relative to the hinge causes the moving member to move along the screw gears in a direction being the same as caused by rotational movement of the second element relative to the hinge in an direction opposite the rotational movement of the first element.

24. A hinge as in claim 22, wherein the hinge is arranged in an mobile communications device comprising a first and a second section, wherein the first section of the mobile communications device comprises the first element of the hinge and the second section of the mobile communications device comprises the second element of the hinge.

25. A hinge as in claim 22, wherein the synchronizing members are configured to transfer rotational movement of the first element relative to the hinge to rotational movement of the second element relative to the hinge through a path of about 360 degrees of rotational movement of the first element in relation to the second element.

26. A hinge comprising:
a first hinge member defining a first axis of rotation with a first element connected to the hinge;
a second hinge member defining an offset second axis of rotation with a second element connected to the hinge; and synchronizing members configured to transfer rotational movement of the first element relative to the hinge to rotational movement of the second element relative to the hinge; and, wherein the first hinge member comprises a first and a second reel-up surface extending about the first axis of rotation, the second hinge member comprises a third and a fourth reel-up surface extending about the second axis of rotation; and the synchronizing members comprises two belts, the first belt being wound about the first reel-up surface in a first direction and about the third reel-up surface in the first direction, and the second belt being wound about the second reel-up surface in a second, opposite the first, direction and about the fourth reel-up surface in the second direction.

27. A hinge as in claim 26, wherein the hinge comprises at least one tensioning element applying a torque on at least one of the reel-up surfaces in relation to the hinge member associated with said at least one reel-up surface in the wound up direction of said at least on reel-up surface.

28. A hinge as in claim 27, wherein the hinge comprises at least one tensioning element applying a torque on the first reel-up surface in relation to the first hinge member in the first direction or on the third reel-up surface in relation to the second hinge member in the first direction, and at least one tensioning element applying a torque on the second reel-up surface in relation to the first hinge member in the second direction or on the fourth reel-up surface in relation to the second hinge member in the second direction.

29. A hinge as in claim 26, wherein the first and second reel-up surfaces are formed on members being non-rotatably connected to each other or on portions of one member.

30. A hinge as in claim 29, wherein a tensioning element is connected to a member being provided with the third reel-up surface and is adapted to apply a torque in the first direction in relation to said member.

31. A hinge as in claim 26, wherein the hinge is arranged in an mobile communications device comprising a first and a second section, wherein the first section of the mobile communications device comprises the first element of the hinge and the second section of the mobile communications device comprises the second element of the hinge.

32. A hinge as in claim 26, wherein the synchronizing members are configured to transfer rotational movement of the first element relative to the hinge to rotational movement of the second element relative to the hinge through a path of about 360 degrees of rotational movement of the first element in relation to the second element.

33. A hinge comprising:
a first hinge member defining a first axis of rotation with a first element connected to the hinge;
a second hinge member defining an offset second axis of rotation with a second element connected to the hinge; and
synchronizing members configured to transfer rotational movement of the first element relative to the hinge to rotational movement of the second element relative to the hinge; and,
wherein a first synchronizing member extends or a first set of synchronizing members are arranged along a first path, extending about the first axis in a first direction, between the first and second axes, and about the second axis in a second direction, opposite the first direction, and a second synchronizing member extends or a second set of synchronizing members are arranged along a second path, extending about the first axis in the second direction, between the first and second axis and about the second axis in the first direction.

34. A hinge as in claim 33, wherein the first synchronizing member or the first set of synchronizing members are arranged to transfer a pressing power along the first path to synchronize a rotation of the first hinge member in the first direction with a rotation of the second hinge member in the second direction, and wherein the second synchronizing member or the second set of synchronizing members are arranged to transfer a pressing power along the second path to synchronize a rotation of the second hinge member in the second direction with a rotation of the first hinge member in the first direction.

35. A hinge as in claim 33, wherein the hinge is arranged in an mobile communications device comprising a first and a second section, wherein the first section of the mobile communications device comprises the first element of the hinge and the second section of the mobile communications device comprises the second element of the hinge.

36. A hinge as in claim 33, wherein the synchronizing members are configured to transfer rotational movement of the first element relative to the hinge to rotational movement of the second element relative to the hinge through a path of about 360 degrees of rotational movement of the first element in relation to the second element.

37. A hinge comprising:
a first hinge member defining a first axis of rotation with a first element connected to the hinge;
a second hinge member defining an offset second axis of rotation with a second element connected to the hinge; and
synchronizing members configured to transfer rotational movement of the first element relative to the hinge to rotational movement of the second element relative to the hinge; and,
wherein the synchronizing members comprises a first gear rotatable with the first hinge member about a third axis of rotation offset from the first axis of rotation, a second gear rotatable with the second hinge member about a fourth axis of rotation offset from the second axis of rotation and in engagement with the first gear, and a first intermediate member connecting the first hinge member with the first gear and a second intermediate member connecting the second hinge member with the second gear.

38. A hinge as in claim 37, wherein the first and second hinge members are each provided with a first guide member extending transversely to the first and second axis of rotation, respectively,
the first and second intermediate members are on a first side each provided with a second guide member extending transversely to the first and second axis of rotation and on a second side each provided with a third guide member extending transversely to the first and second axis of rotation and transversely to the second guide member, and
the first and second gears are each non-rotatably connected to a fourth guide member extending transversely to the third and fourth axis of rotation, respectively,
whereby the two first guide members each engage a second guide member and the two third guide members each engage a fourth guide member.

39. A hinge as in claim 37, wherein the hinge is arranged in an mobile communications device comprising a first and a second section, wherein the first section of the mobile communications device comprises the first element of the hinge and the second section of the mobile communications device comprises the second element of the hinge.

40. A hinge as in claim 37, wherein the synchronizing members are configured to transfer rotational movement of the first element relative to the hinge to rotational movement of the second element relative to the hinge through a path of about 360 degrees of rotational movement of the first element in relation to the second element.

41. A hinge comprising:
- a first hinge member defining a first axis of rotation with a first element connected to the hinge;
- a second hinge member defining an offset second axis of rotation with a second element connected to the hinge; and
- synchronizing members configured to transfer rotational movement of the first element relative to the hinge to rotational movement of the second element relative to the hinge; and,
- wherein the synchronizing members comprises a flexible shaft being able to transfer a rotation and being able to be bent into a U-shape, wherein a first end of the flexible shaft is connected to the first hinge member and a second end of the flexible shaft is connected to the second hinge member, and wherein the shaft is bent into a U-shape.

42. A hinge as in claim 41, wherein the hinge is arranged in an mobile communications device comprising a first and a second section, wherein the first section of the mobile communications device comprises the first element of the hinge and the second section of the mobile communications device comprises the second element of the hinge.

43. A hinge as in claim 41, wherein the synchronizing members are configured to transfer rotational movement of the first element relative to the hinge to rotational movement of the second element relative to the hinge through a path of about 360 degrees of rotational movement of the first element in relation to the second element.

44. A hinge comprising:
- a first hinge member defining a first axis of rotation with a first element connected to the hinge;
- a second hinge member defining an offset second axis of rotation with a second element connected to the hinge; and
- synchronizing members configured to transfer rotational movement of the first element relative to the hinge to rotational movement of the second element relative to the hinge; and,
- wherein the synchronizing members comprise a first gear rotatable with the first hinge member about the first axis of rotation, a second gear rotatable with the second hinge member about the second axis of rotation, a third gear being rotatable about a third axis of rotation offset from the first axis of rotation and third gear being, via an inner surface of said third gear, in engagement with the first gear, a fourth gear, being rotatable about a fourth axis of rotation offset from the second axis of rotation, and being, via an inner surface of said fourth gear, in engagement with the second gear, wherein an outer surface of the third gear is in engagement with an outer surface of the fourth gear.

45. A hinge as in claim 44, wherein the third axis of rotation and the fourth axis of rotation are, positioned between the first and second axis of rotation.

46. A hinge as in claim 44, wherein the synchronizing members are configured to transfer rotational movement of the first element relative to the hinge to rotational movement of the second element relative to the hinge through a path of about 360 degrees of rotational movement of the first element in relation to the second element.

47. A mobile communications device comprising:
- a housing;
- a transceiver in the housing;
- a keypad connected to the housing; and
- a display connected to the housing;
- wherein the housing comprises a first section movably connected to a second section of the housing by a multi-axis hinge, wherein a first axis of rotation of the multi-axis hinge is provided at the first section of the housing and a second offset axis of rotation of the hinge is provided at the second section of the housing, and
- synchronizing members in the multi-axis hinge, configured to transfer rotational movement of the first section relative to the multi-axis hinge to rotational movement of the second section relative to the hinge; and,
- wherein the synchronizing members define
- a first synchronizing axis at the first section,
- a second synchronizing axis at the second section, and
- further comprise a connecting link adapted to connect the first and second synchronizing axes with each other,
- wherein the first synchronizing axis is offset from the first axis of rotation in a first direction and the second synchronizing axis is offset from the second axis of rotation in a second direction, opposite the first direction.

48. A mobile communications device as in claim 47, wherein the connecting link is adapted to maintain a fixed offset distance between the first and second synchronizing axes.

* * * * *

UNITED STATES PATENT AND TRADEMARK OFFICE
CERTIFICATE OF CORRECTION

| | | |
|---|---|---|
| PATENT NO. | : 7,512,426 B2 | Page 1 of 1 |
| APPLICATION NO. | : 11/111485 | |
| DATED | : March 31, 2009 | |
| INVENTOR(S) | : Maatta et al. | |

It is certified that error appears in the above-identified patent and that said Letters Patent is hereby corrected as shown below:

Title page, column 1, after "Prior Publication Data", insert --(63) Related U.S. Application Data; This application claims priority to and the benefit of U.S. patent application Ser. No. 10/829,415, filed on April 21, 2004, now U.S. Pat. No. 7,155,266, issued Dec. 26, 2006; which claims priority to and the benefit of U.S. patent application Ser. No. 10/421,278, filed April 23, 2003, now U.S. Pat. No. 6,900,981, issued May 31, 2005, the disclosures of which are each incorporated herein by reference in their entirety.--

Signed and Sealed this

First Day of September, 2009

David J. Kappos
*Director of the United States Patent and Trademark Office*